United States Patent
Pengam et al.

(10) Patent No.: US 12,448,454 B2
(45) Date of Patent: Oct. 21, 2025

(54) HUMANIZED ANTI-CLEC-1A ANTIBODIES AND ANTIGEN-BINDING FRAGMENTS THEREOF

(71) Applicants: OSE IMMUNOTHERAPEUTICS, Nantes (FR); NANTES UNIVERSITE, Nantes (FR); INSTITUT NATIONAL DE LA SANTE ET DE LA RECHERCHE MEDICALE, Paris (FR)

(72) Inventors: Sabrina Pengam, St Luce S/ Loire (FR); Vanessa Gauttier, Reze (FR); Caroline Mary, Sainte-Pazanne (FR); Nicolas Poirier, Grandchamps des Fontaines (FR); Marion Drouin, Savenay (FR); Elise Chiffoleau, Nantes (FR)

(73) Assignees: INSERM (INSTITUT NATIONAL DE LA SANTE ET DE LA RECHERCHE MEDICALE), Paris (FR); UNIVERSITE DE NANTES, Nantes (FR); OSE IMMUNOTHERAPEUTICS, Nantes (FR)

( * ) Notice: Subject to any disclaimer, the term of this patent is extended or adjusted under 35 U.S.C. 154(b) by 0 days.

(21) Appl. No.: 18/566,391

(22) PCT Filed: Jun. 8, 2022

(86) PCT No.: PCT/EP2022/065600
§ 371 (c)(1),
(2) Date: Dec. 1, 2023

(87) PCT Pub. No.: WO2022/258714
PCT Pub. Date: Dec. 15, 2022

(65) Prior Publication Data
US 2024/0309096 A1  Sep. 19, 2024

(30) Foreign Application Priority Data

Jun. 8, 2021 (EP) .................................... 21305777

(51) Int. Cl.
*C07K 16/28* (2006.01)
*A61K 39/395* (2006.01)
(Continued)

(52) U.S. Cl.
CPC ...... *C07K 16/2851* (2013.01); *A61K 39/3955* (2013.01); *A61K 39/39558* (2013.01);
(Continued)

(58) Field of Classification Search
None
See application file for complete search history.

(56) References Cited

U.S. PATENT DOCUMENTS

| | | | | |
|---|---|---|---|---|
| 11,365,257 B2* | 6/2022 | Chiffoleau | ......... | C07K 16/2851 |
| 2023/0331852 A1* | 10/2023 | Chiffoleau | ......... | C07K 16/2851 |

FOREIGN PATENT DOCUMENTS

| | | |
|---|---|---|
| WO | WO2018073440 A1 | 4/2018 |
| WO | WO2021110990 A1 | 6/2021 |

OTHER PUBLICATIONS

Gauttier et al, 1636—CLEC-1 is a novel myeloid immune checkpoint for cancer immunotherapy limiting tumor cells phagocytosis and tumor antigen cross-presentation, AACR Annual Meeting 2021 Online, 2021, p. 1.
(Continued)

*Primary Examiner* — Claire Kaufman
(74) *Attorney, Agent, or Firm* — Arrigo, Lee, Guttman & Mouta-Bellum LLP

(57) ABSTRACT

The invention pertains to the field of immunotherapy. The present invention provides specific humanized anti-CLEC-1A antibodies, antigen-binding fragments thereof and
(Continued)

mimetics thereof, in particular antibodies. The compounds of the invention are able to specifically binds to CLEC-1A receptor and antagonize the binding of CLEC-1A to its endogenous ligand(s). The compounds of the invention can be used to treat deleterious conditions.

18 Claims, 11 Drawing Sheets

Specification includes a Sequence Listing.

(51) Int. Cl.
*A61P 35/00* (2006.01)
*A61K 39/00* (2006.01)

(52) U.S. Cl.
CPC ........ *A61P 35/00* (2018.01); *A61K 2039/505* (2013.01); *A61K 2039/507* (2013.01); *C07K 2317/24* (2013.01); *C07K 2317/73* (2013.01); *C07K 2317/76* (2013.01)

(56) References Cited

OTHER PUBLICATIONS

Lopez Robles et al., Cell-surface C-type lectin-like receptor CLEC-1 dampens dendritic cell activation and downstream Th17 responses, Blood Advances, 2017, 1(9), 557-568.

* cited by examiner

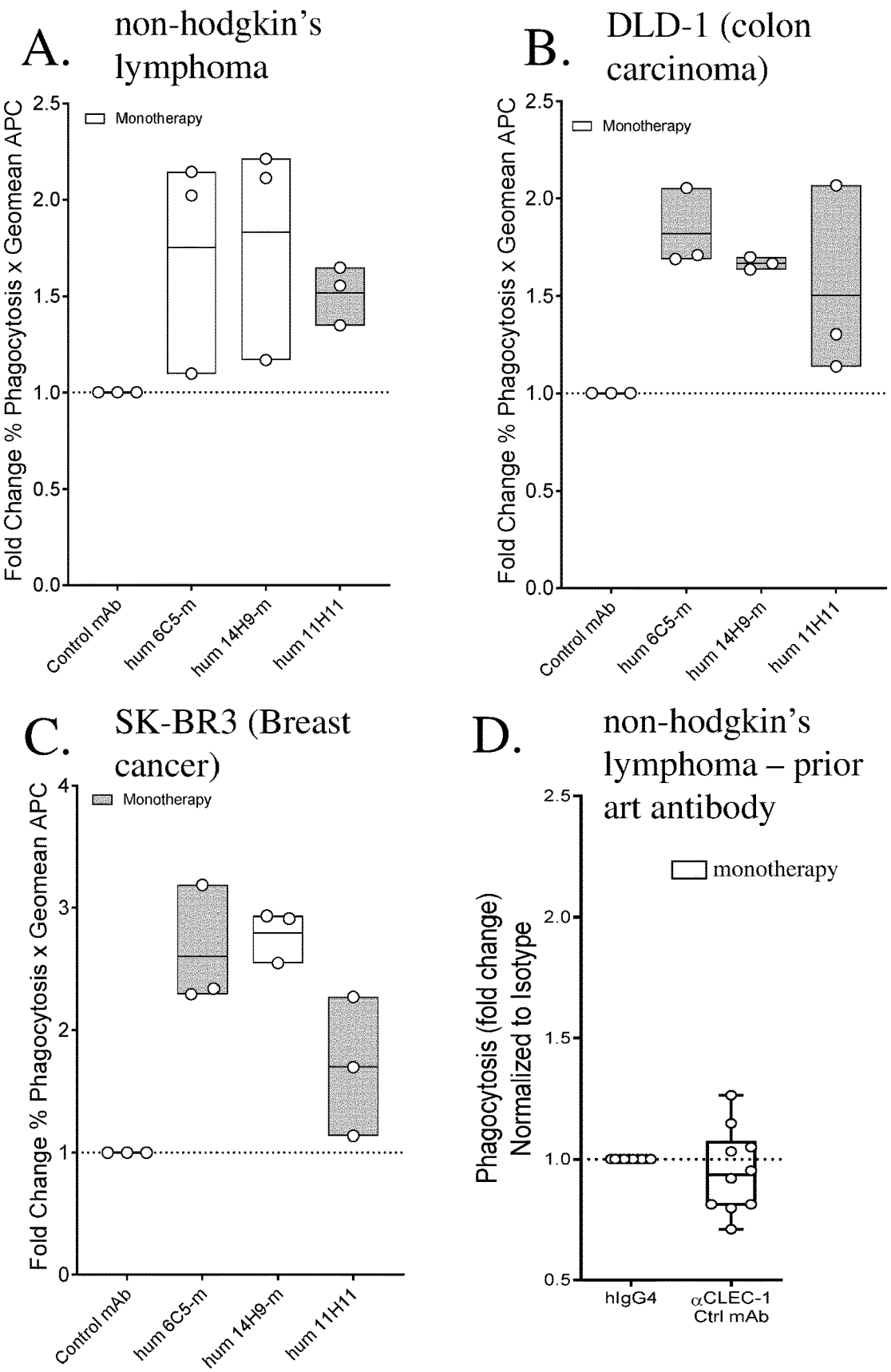
FIGURE 1 (start)

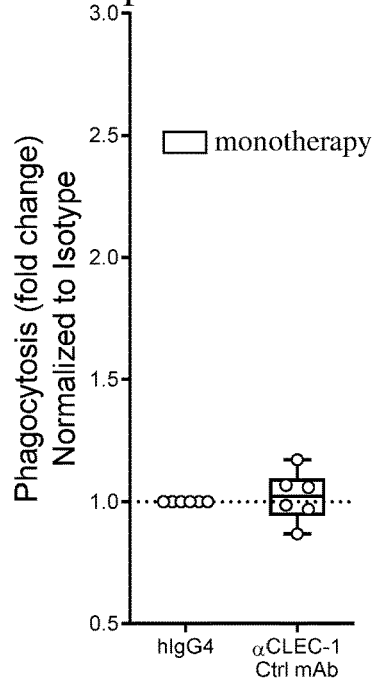
FIGURE 1 (end)
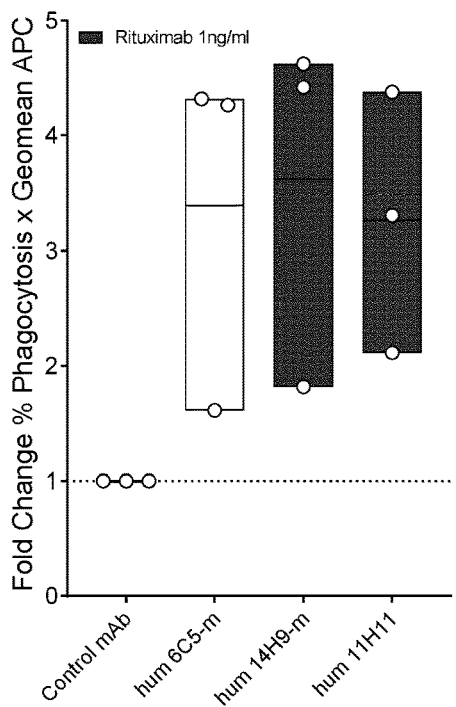 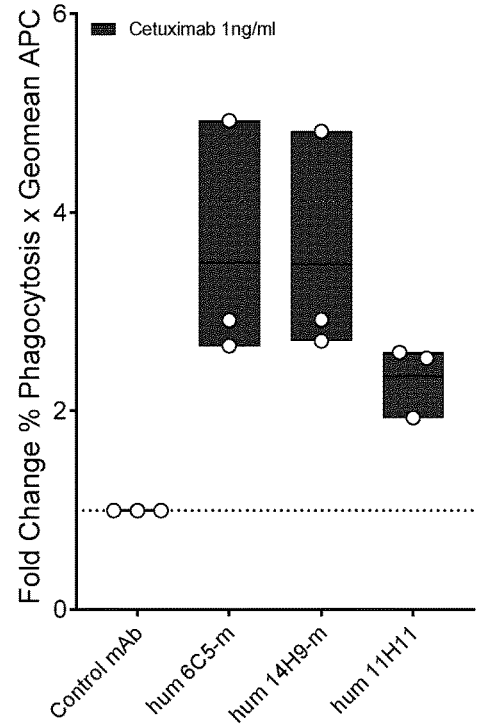
FIGURE 2 (start)

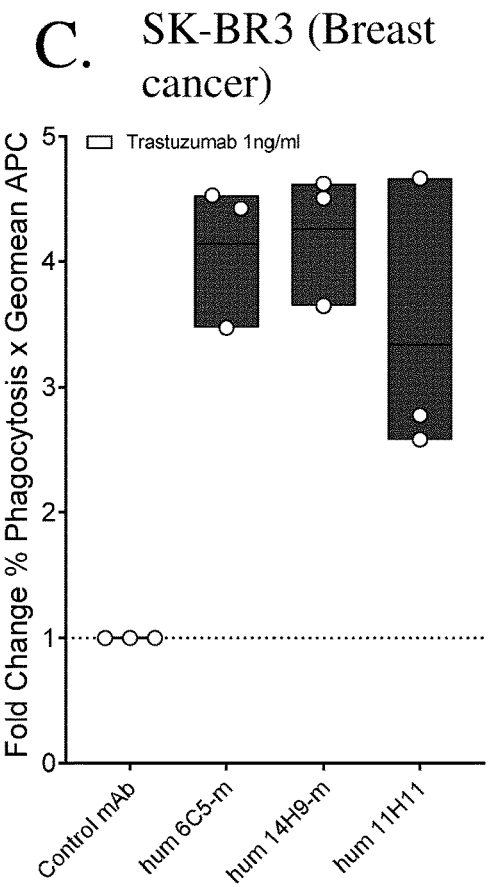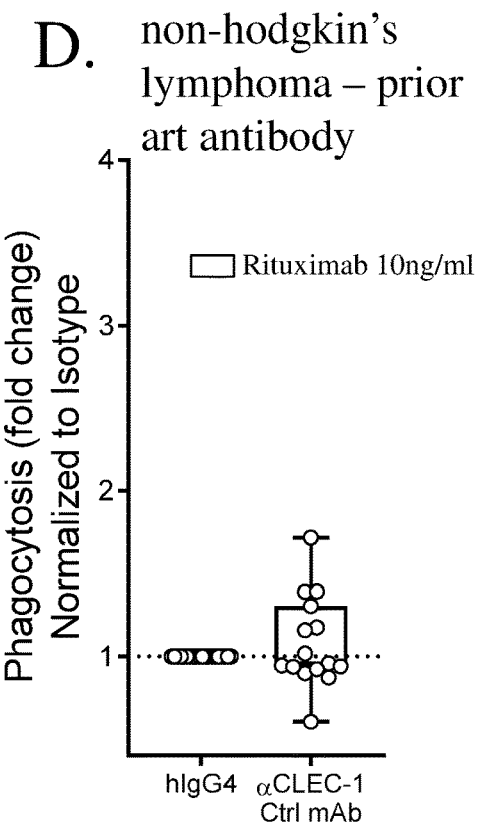
FIGURE 2 (end)
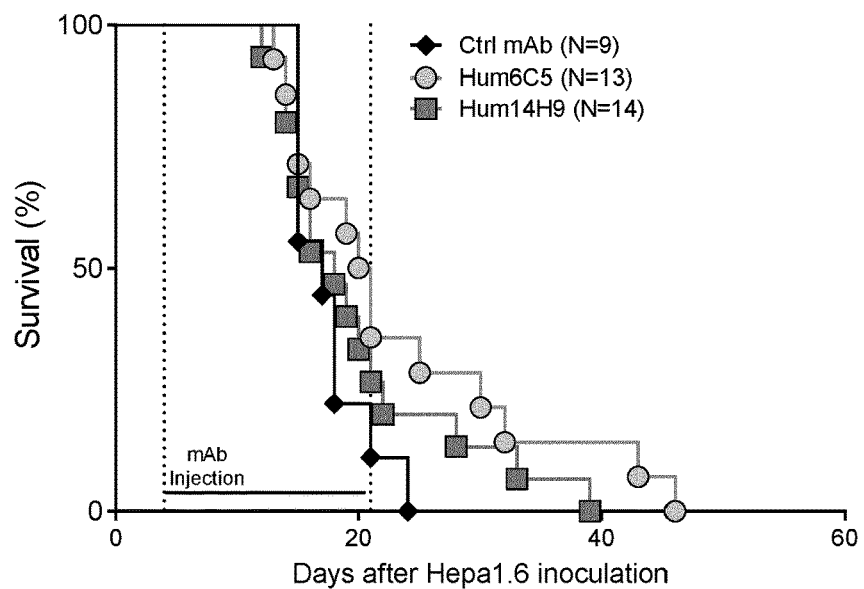
FIGURE 3

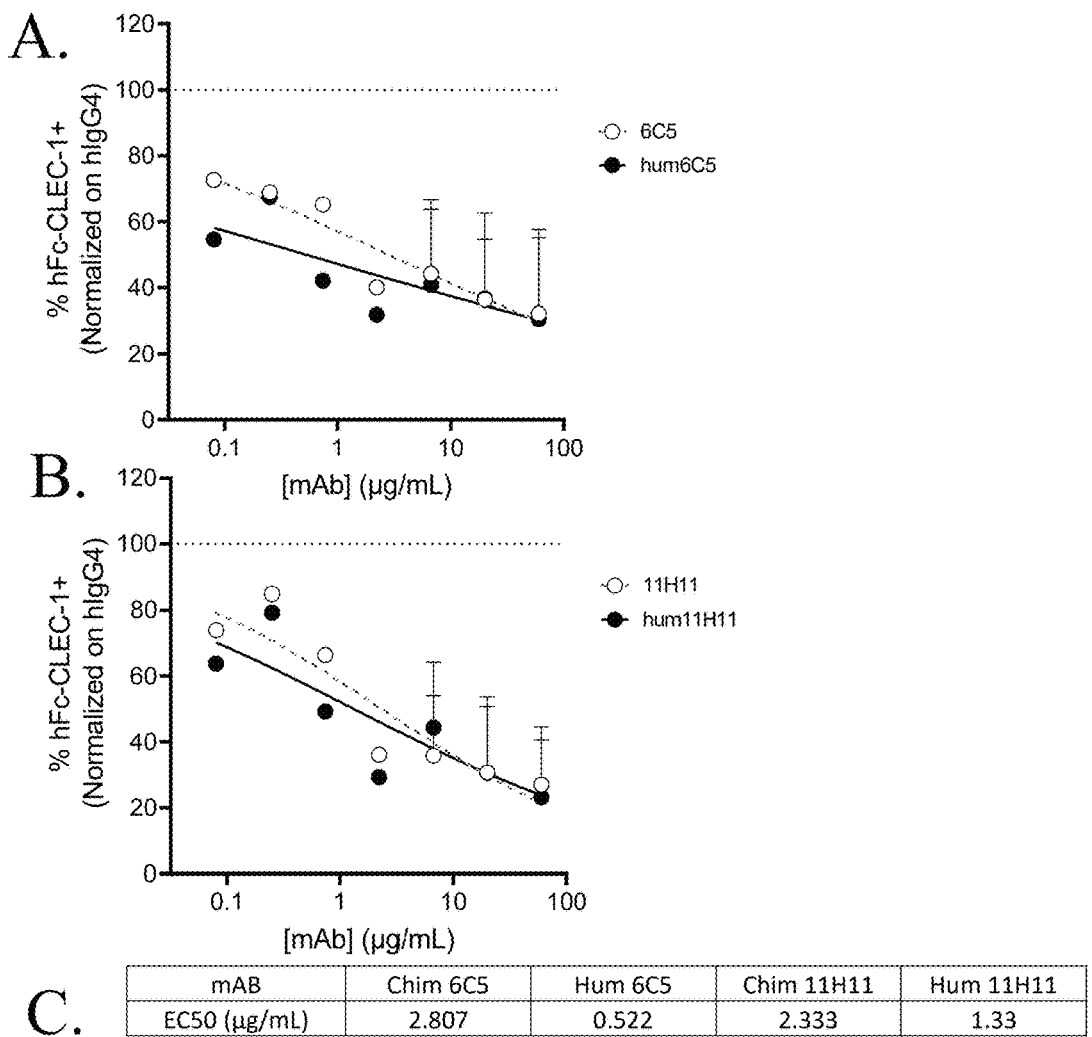
FIGURE 9
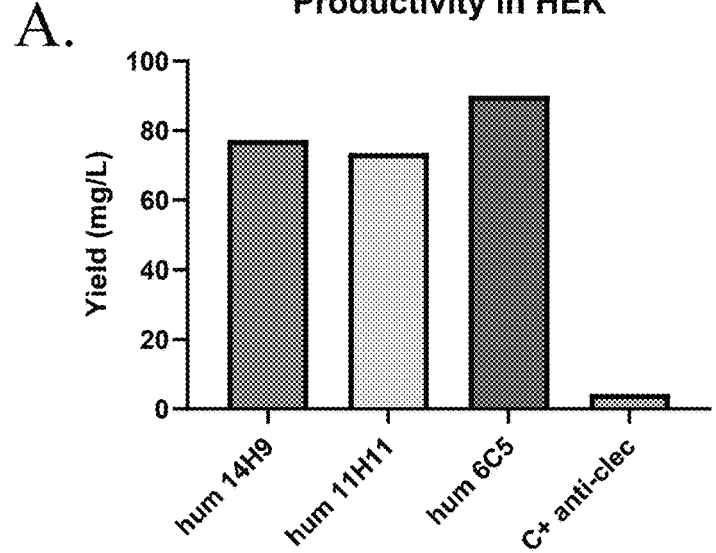
FIGURE 10 (start)

Productivity in CHO

| | Yield (mg/L) | |
|---|---|---|
| | in HEK cells | in CHO cells |
| hum 14H9 | 77.3 | 53 |
| hum 11H11 | 73.5 | 53 |
| hum 6C5 | 90 | 62.6 |
| C+ anti-CLEC | 4.4 | 29.3 |

FIGURE 10 (end)

| antibody | KD (M) | ka (1/Ms) | kd (1/s) |
|---|---|---|---|
| hum 14H9 | 5.40E-09 | 7.77E+04 | 4.19E-04 |
| hum 11H11 | 3.01E-10 | 2.39E+05 | 7.19E-05 |
| hum 6C5 | 5.69E-09 | 4.83E+04 | 2.75E-04 |
| C+ anti-Clec | 7.89E-09 | 3.64E+04 | 2.88E-03 |

A)
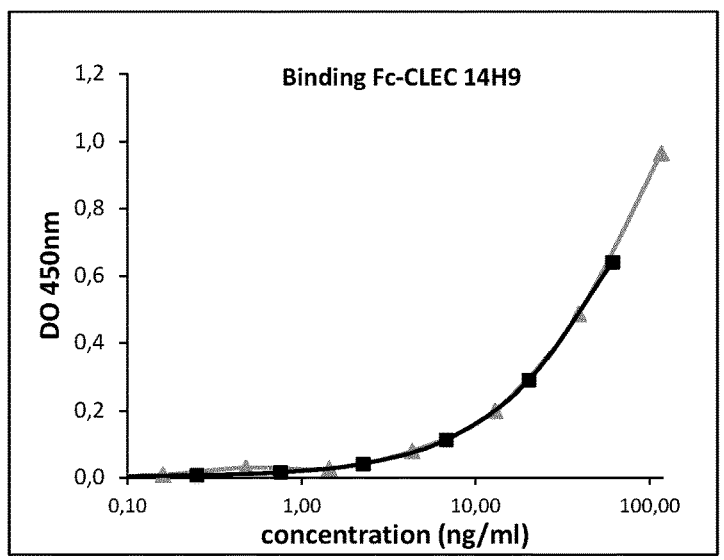
B)
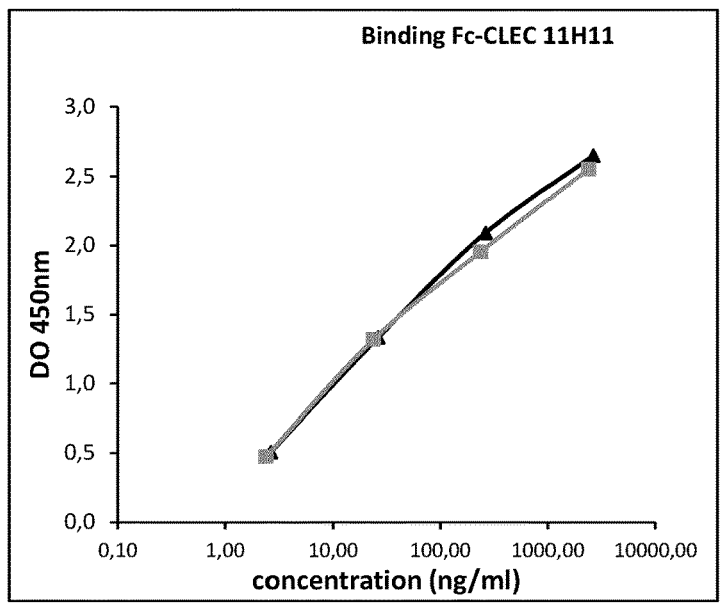
FIGURE 14 (start)

C) — 6C5
━ 6C5m1 (different framework in heavy chain)
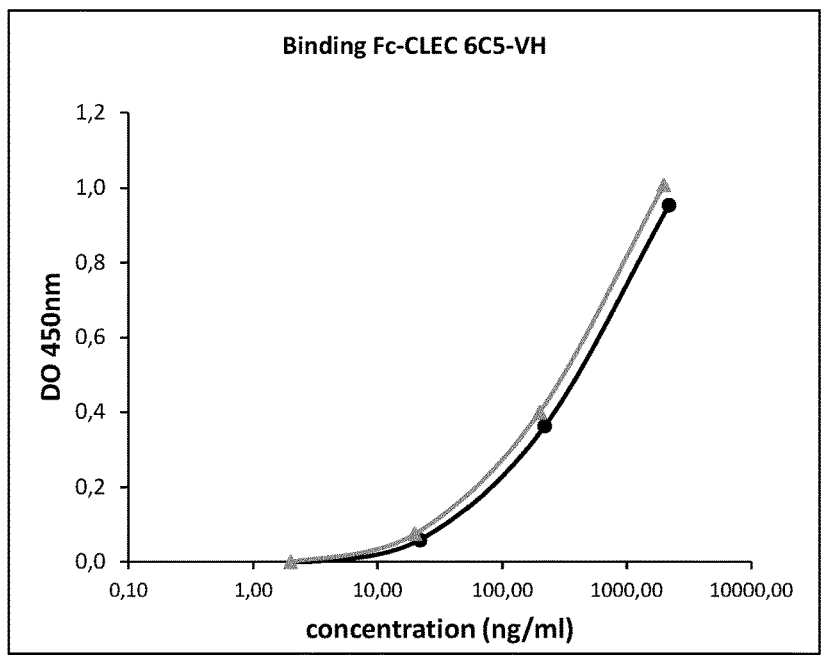
D) — 6C5
━ 6C5m2 (different framework in light chain)
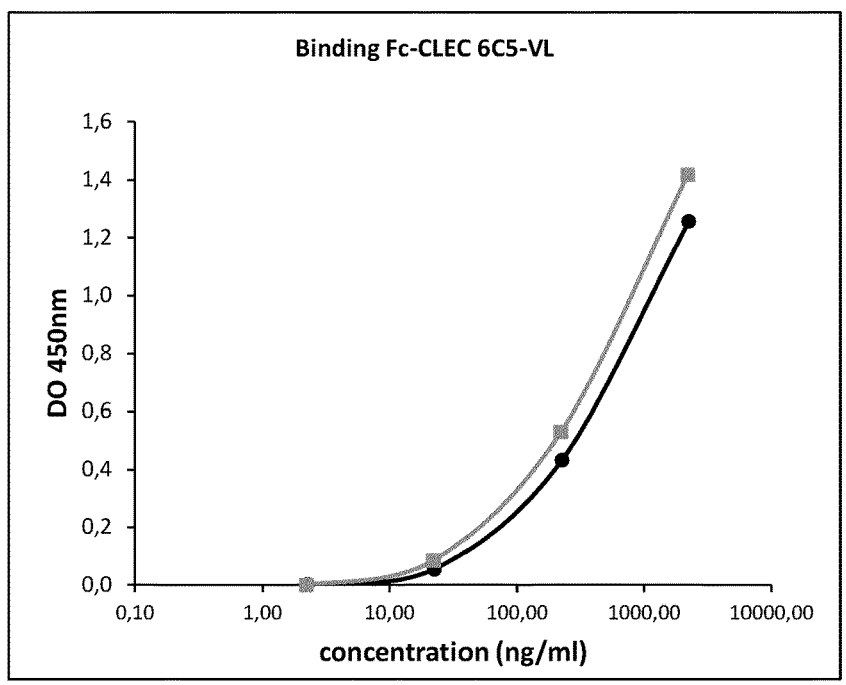
FIGURE 14 (end)

HUMANIZED ANTI-CLEC-1A ANTIBODIES AND ANTIGEN-BINDING FRAGMENTS THEREOF

FIELD OF THE INVENTION

The invention pertains to the field of immunotherapy. The present invention provides new specific humanized anti-CLEC-1A antibodies. The antibodies of the invention are able to specifically bind to CLEC-1A and are antagonists of human CLEC-1A, and in particular antagonize the binding of CLEC-1A to at least one of its ligand(s), particularly its endogenous ligand(s). The use of the compounds of the invention may be useful for treating deleterious conditions, including but not limited to cancers.

BACKGROUND OF THE INVENTION

Immunotherapy treatments harnessing the patient's immune system herald a new era of personalized medicine, offering hope for curative responses in patients with serious illnesses. Cell-mediated immunity can eliminate or prevent diseases, like but not limited to cancers, autoimmune disease and allergic diseases. Recent developments in therapies include cell engineering, disease targeting and modulation of the immune system of the patients to provide a more focused and effective response to diseases. Among these strategies, immunotherapy with immune checkpoint inhibitors or activators has become an essential weapon against these diseases, most particularly for the treatment against cancers. These molecules, often expressed by immune system cells, such as T cells or dendritic cells but also by some cancer cells, enhance the immune response to the patient and keep or initiate immune cell response against pathogenic cells. Immune checkpoints refer to a plethora of inhibitory pathways hardwired into the immune system that are crucial for maintaining self-tolerance and minimize collateral tissue damage.

C-type lectin receptors (CLRs) are a large family of transmembrane and soluble receptors. These receptors contain one or more carbohydrate-recognition domain able to recognize a wide variety of glycans on pathogens or on self-proteins. For these receptors, glycan recognition is dependent from $Ca^{2+}$. Many related-CLRs are nonetheless able to recognize carbohydrates but independently of $Ca^{2+}$; these receptors are referred to C-type lectin-like receptors (CTLRs). These receptors are of particular interest for their role in coupling both innate and adaptive immunity. CTLRs are expressed mostly by cells of myeloid lineage such as monocytes, macrophages, dendritic cells (DCs), and neutrophils. CTLRs not only serve as antigen-uptake receptors for internalization and presentation to T cells but also trigger multiple signalling pathways leading to NF-κB, type I interferon (IFN), and/or inflammasome activation. By their capacity to present antigen and ensure the balance between cellular activation and suppression, CTLRs have emerged as challenging pharmacological targets to treat a wide variety of diseases including cancers, autoimmune diseases or allergy. CTLR modulation seems to represent a promising strategy for disease management although attempts at identifying endogenous ligands as well as efforts to elucidate their role in immunity are still warrant.

Among these CTLRs, a particular member named CLEC-1, but also referenced under the acronyms CLEC1, CLEC1A, CLEC-1A, CLEC1 receptor, CLEC1A receptor and CLEC-1A receptor is of particular interest. Although the C-type lectin-like receptor-1 (CLEC-1) was identified several years ago, the downstream signalling and ligand(s) remain uncharacterized. In human and rodent, CLEC1 is expressed by myeloid cells such as monocytes, Dendritic Cells, and macrophages but also by endothelial cells. CLEC-1 expression is decreased by pro-inflammatory stimuli and is enhanced by TGFβ. Interestingly. CLEC-1 was found to be expressed mostly intracellular particularly in human endothelial cells and neutrophils, suggesting the requirement of particular conditions for cell-surface expression.

The present inventors showed for the first time that CLEC-1A is expressed at the cell-surface by conventional Dendritic Cells (cDCs) and by small subsets of monocytes and DCs in human blood and is enhanced by the immuno-suppressive cytokine TGFβ (see international application No. WO2018073440). The inventors showed that human CLEC-1A is expressed by M2-type pro-tumoral macrophages, by myeloid cells from pleural effusion mesothelioma and from ovarian tumor ascites. They demonstrated in both rodent and human that CLEC-1 acts as an inhibitory receptor in myeloid cells and prevent IL12p40 expression and downstream Th1 and Th17 in vivo responses.

They also showed that human T cells proliferation and human IFN-gamma are increased using anti-hCLEC-1A antibody as antagonist of CLEC-1A. They also demonstrated that mice deficient in CLEC-1 are better resistant to tumor growth and exhibit an increased survival rate in a hepatocarcinoma mice model. Therefore, CLEC-1A as a cell-surface receptor may represent a useful therapeutic tool to enhance anti-tumor immunity in a clinical setting.

In this context, the inventors provide for the first time humanized anti-CLEC-1A antibodies, which recognize and bind specifically to the extracellular domain of human CLEC-1A, which are antagonists of human CLEC-1A, in particular which are suitable for antagonizing the binding of the CLEC-1A to at least one of its ligand, particularly an endogenous ligand, and correlate when used in vitro with a modulation, in particular an increase, of the phagocytosis of tumor cells and/or secondary necrotic cells by myeloid cells, in particular by dendritic cells and/or macrophages. In a particular embodiment of the invention, it is provided humanized anti-CLEC-1A antibodies, which recognize and bind specifically to the extracellular domain of human CLEC-1A, which are antagonists of human CLEC-1A, in particular which are suitable for antagonizing the binding of the CLEC-1A to at least one of its ligand, particularly an endogenous ligand, and correlate when used in vitro with a modulation, in particular an increase, of the phagocytosis of tumor cells by macrophages.

As shown in the examples of the invention, it is provided for the first-time humanized anti-CLEC-1A antibodies and antigen-binding fragments thereof and mimetics thereof in particular anti-CLEC-1A antibodies, that have the capability to correlate when used in vivo and/or in vitro with a modulation, in particular an increase, of the phagocytosis of tumor cells and/or secondary necrotic cells by myeloid cells, in particular by dendritic cells and/or macrophages. By contrast to the anti-CLEC-1A antibody disclosed in the prior art (WO 2018/073440A1 and the article of Robles et al. (Blood advances 2017)), which is used in some of the working examples of the invention that binds to CLEC-1A and which is an antagonist of human CLEC-1A, it is illustrated in the present description that the humanized antibodies according to any embodiment of the invention correlate with a modulation, in particular an increase, of the phagocytosis of tumor cells by cells of the immune system when used in vitro. Tumor cells and/or secondary necrotic cells interacting with CLEC-1A escape phagocytosis by CLEC-1A-expressing myeloid cells. The antibodies of the invention interact with CLEC-1A in a manner that prevents functional interaction between CLEC-1A and tumor cells and/or secondary necrotic cells usually interacting with CLEC-1A-expressing cells, such interaction preventing the tumor cells to escape phagocytosis. As illustrated in the present invention, the antagonist anti-CLEC-1A antibody disclosed in the prior art (WO 2018/073440A1 and the article of Robles et al. (Blood advances 2017)), which is used in some of the examples of the present invention does not correlate with a modulation of the phagocytosis of tumor cells by myeloid cells, in particular by dendritic cells and/or macrophages. Modulation of the phagocytosis of tumor cells is only illustrated when an antibody according to the invention is present in the examples. CLEC-1A-expressing myeloid cells, in particular CLEC-1A-expressing dendritic cells and/or macrophages, in particular by macrophages, are not prevented to exert their phagocytosis capabilities on tumor cells and/or secondary necrotic cells when an antibody, antigen-binding fragment thereof or mimetic thereof according to the invention is present. Several very advantageous biological effects are reached when the compounds of the invention are administered, associated in particular with the phagocytosis capability of myeloid cells, including dendritic cells and/or macrophages. The antibodies of the invention which are suitable antagonists of CLEC-1A correlate with the modulation, in particular with the increase, of the phagocytosis capability of dendritic cells and/or macrophages, like activated macrophages. The administration of the anti-CLEC1A antibodies and antigen-binding fragments thereof, in particular anti-CLEC-1A antibodies, of the invention correlate with enhanced phagocytosis of tumor cells and/or cancer cells and/or secondary necrotic cells by dendritic cells and/or macrophages by antagonizing the binding of the CLEC-1A to its target(s) (at least one of its ligand) expressed by tumor cells and/or secondary necrotic cells. When CLEC-1A-expressing macrophages or dendritic cells interact with cells expressing one ligand of CLEC-1A, the phagocytosis capability of these macrophages or dendritic cells is inhibited or reduced. Tumor cells and secondary necrotic cells that express a ligand of CLEC-1A escape phagocytosis exerted by macrophages and dendritic cells. As shown in the examples of the invention, when the anti-CLEC1A antibodies disclosed herein are administered, the inhibition of the phagocytosis capability of macrophages and of dendritic cells, in particular by macrophages, is removed by antagonizing the CLEC-1A interaction with the tumor cells, thereby leading to phagocytosis of tumor cells by macrophages and dendritic cells, in particular by macrophages.

In addition to their effect on the phagocytosis of tumor cells and/or secondary necrotic cells by myeloid cells, the humanized antibodies of the invention may also modulate, in particular enhance or increase, the proliferation of T cells and/or the activation of T cells.

The antibodies described herein may be efficiently produced in recombinant production systems, allowing the provision of chimeric or (fully) humanized antibodies exhibiting the functional features disclosed here above in a sufficient amount for further developments.

Besides, the humanized antibodies and antigen-binding fragments thereof and mimetics thereof, in particular antibodies, of the invention have a specific affinity for the human CLEC-1A, as compared to its mice orthologue and its chimeric equivalents, since the antibodies of the invention do not cross-react with mice CLEC-1A protein in vitro.

Moreover, as shown in the examples of the invention, the anti-CLEC-1A compounds, in particular anti-CLEC-1A antibodies, of the invention specifically bind to the extracellular domain of CLEC-1A expressed on the cell membrane of human cells in vitro.

In an embodiment of the invention, the antibodies and antigen-binding fragments thereof and mimetics thereof of the invention disrupt the interaction between CLEC-1A expressed by myeloid cells, in particular by dendritic cells and/or macrophages, and secondary necrotic cells and/or tumor cells, like tumor cells present in a host having a cancer or developing a cancer, and/or with the intracellular content of secondary necrotic cells and/tumor cell. The present inventors determined that a ligand of CLEC-1A could be expressed or overexpressed, but not necessarily on the membrane on these cells, by damaged cells or tumor cells, and could therefore be involved in anti-tumor immunity and improve the death of tumor cells induced by the immune cells.

It is therefore provided humanized antibodies, antigen-binding fragment thereof and mimetics thereof, for which the inventors provide evidence, that they:

bind specifically to human CLEC-1A, in particular to CLEC-1A expressed on the cell membrane of human cells, are antagonists of human CLEC-1A, in particular suitable for antagonizing the binding of the CLEC-1A to at least one of its ligands, particularly one of its endogenous ligands, and have better antagonist capabilities on the binding of human CLEC-1A to one of its ligand than chimeric antibodies;

may be recovered at a significant yield allowing the provision of antibodies exhibiting the functional features disclosed here above in a sufficient amount for further developments; and correlate when used in vivo and/or in vitro with a modulation, in particular an increase, of the phagocytosis of tumor cells and/or secondary necrotic cells by myeloid cells, in particular by dendritic cells and/or macrophages.

Such antibodies and antigen-binding fragments thereof and mimetics thereof are particularly suitable for their uses in the prevention and/or the treatment of several diseases or deleterious conditions, in particular wherein the phagocytosis exerted by dendritic cells and/or macrophages needs to be improved, more particularly for modulating the phagocytosis of tumor cells and/or secondary necrotic cells, preferably the phagocytosis activity by myeloid cells, in particular for improving the phagocytosis capability of dendritic cells and/or macrophages, to improve the outcome of the disease by increasing the phagocytosis of tumor cells by myeloid cells, in particular by dendritic cells and/or macrophages.

Such compounds may also be particularly suitable for their uses in the prevention and/or the treatment of several diseases, in particular for modulating the T cell response, in particular by enhancing the activation and/or the proliferation of T cells.

In a particular embodiment of the invention, the humanized anti-CLEC-1A antibodies and antigen-binding fragments thereof and mimetics thereof are suitable for decrease the overall number of myeloid-derived suppressor cells, thereby leading to a decrease of immunosuppressive cells, like but not limited to immunosuppressive myeloid cells.

SUMMARY OF THE INVENTION

Accordingly, in a first aspect of the invention, it is disclosed an antibody or antigen-binding fragment thereof or mimetic thereof that specifically binds to the extracellular domain of human C-type lectin-like receptor-1 member A receptor (CLEC-1A receptor) which comprises:
- an antibody heavy chain variable domain comprising VHCDR1 of SEQ ID No. 10, VHCDR2 of SEQ ID No. 11, VHCDR3 of SEQ ID No. 12; and an antibody light chain variable domain comprising VLCDR1 of SEQ ID No. 13, VLCDR2 of SEQ ID No. 14, VLCDR3 of SEQ ID No. 15; or
- an antibody heavy chain variable domain comprising VHCDR1 of SEQ ID No. 16, VHCDR2 of SEQ ID No. 17, VHCDR3 of SEQ ID No. 18; and an antibody light chain variable domain comprising VLCDR1 of SEQ ID No. 19, VLCDR2 of SEQ ID No. 20, VLCDR3 of SEQ ID No. 21; or
- an antibody heavy chain variable domain comprising VHCDR1 of SEQ ID No. 22, VHCDR2 of SEQ ID No. 23, VHCDR3 of SEQ ID No. 24; and an antibody light chain variable domain comprising VLCDR1 of SEQ ID No. 25, VLCDR2 of SEQ ID No. 26, VLCDR3 of SEQ ID No. 27.

An antibody or an antigen-binding fragment thereof or mimetic thereof according to this embodiment is suitable for antagonizing human CLEC-1A while its binding property for this receptor is specific. Moreover, production in different cell lines, including but not limited to mammalian cell lines, with a yield of production suitable for purposes of development of a drug candidate is reached. Further, an antibody or an antigen-binding fragment thereof according to this embodiment is able to enhance the phagocytosis of tumor cells and/or secondary necrotic cells by myeloid cells, in particular by dendritic cells and/or macrophages.

The inventors synthetized several anti-CLEC-1A humanized antibodies, each comprising combinations of heavy chain variable domain and light chain variable domain. Accordingly, in a second aspect of the invention, it is provided an antibody or an antigen-binding fragment thereof, wherein
- an antibody heavy chain variable domain comprising or consisting of the amino acid sequence set forth in SEQ ID No. 3; and an antibody light chain variable domain comprising or consisting of the amino acid sequence set forth in SEQ ID No. 4, or
- an antibody heavy chain variable domain comprising or consisting of the amino acid sequence set forth in SEQ ID No. 5; and an antibody light chain variable domain comprising or consisting of the amino acid sequence set forth in SEQ ID No. 7; or
- an antibody heavy chain variable domain comprising or consisting of the amino acid sequence set forth in SEQ ID No. 6; and an antibody light chain variable domain comprising or consisting of the amino acid sequence set forth in SEQ ID No. 7; or
- an antibody heavy chain variable domain comprising or consisting of the amino acid sequence set forth in SEQ ID No. 8; and an antibody light chain variable domain comprising or consisting of the amino acid sequence set forth in SEQ ID No. 9.

In another aspect, the invention relates to a humanized antibody or an antigen-binding fragment thereof or a mimetic thereof, which specifically binds to the extracellular domain of human C-type lectin-like receptor-1 member A receptor (CLEC-1A receptor) and which correlates when used in vivo and/or in vitro with a modulation, in particular an increase, of the phagocytosis of tumor cells and/or secondary necrotic cells by myeloid cells, in particular by dendritic cells and/or macrophages, as compared to a negative control, in particular by at least 10%, more particularly by at least 20% as compared to the negative control.

In another aspect, the invention relates to the humanized anti-CLEC-1A antibodies or antigen-binding fragments thereof or mimetics thereof disclosed herein, for use in the treatment of a disease or a deleterious condition, in particular wherein the phagocytosis exerted by dendritic cells and/or macrophages needs to be improved, and/or wherein the improvement of the phagocytosis capability of dendritic cells and/or macrophages treats the disease or the deleterious condition.

In another aspect, the invention relates to humanized anti-CLEC-1A antibodies and antigen-binding fragments thereof and mimetics thereof as described above, for their use in the prevention and/or the treatment of a disease or a disorder in which the modulation of the phagocytosis capability by myeloid cells, in particular dendritic cells and/or macrophages, may improve the outcome of the disease or disorder, in particular by modulating the phagocytosis of tumor cells and/or secondary necrotic cells, wherein said anti-CLEC-1A antibodies or antigen-binding fragments thereof or mimetics thereof are antagonists of the interaction between human CLEC-1A and CLEC-1A ligand expressing cells, in particular CLEC-1A ligand-expressing tumor cells or cancer cells and/or secondary necrotic cells. Such antibodies or antigen-binding fragments thereof can be identified using phagocytosis assay such as described in the examples of the present invention, including by flow cytometry or microscopy. In a more particular embodiment of the invention, said humanized antibody or an antigen-binding fragment thereof or mimetic thereof is able to enhance the phagocytosis of cancer cells and/or secondary necrotic cells by myeloid cells, in particular by dendritic cells and/or macrophages, as compared to a negative control, in particular by at least 10%, more particularly by at least 20% as compared to the negative control. In a particular embodiment, the phagocytosis may be assessed according to the following experiment:

Macrophages (MΦ) are generated from monocytes with M-CSF (100 ng/ml) for 5 days;

Macrophages (MΦ) are then preincubated with the anti-CLEC1 compound for 2 hours and then cultured with the non-Hodgkin's lymphoma (Raji; CD20+) and the anti-CD20 mAb (Rituximab) respectively at 10 ng/mL providing the "Eat-me" signal, for 4 hours.

Phagocytosis analysis is performed by microscopy and the percentage of phagocytosis is calculated by the percentage of PHRODO (PHRODO-SE, THERMOFISHER) positive Raji cells in total Macrophages.

In another aspect, the invention relates to humanized anti-CLEC-1A antibody or antigen-binding fragment thereof or mimetic thereof as described above, for its use in the prevention and/or the treatment of a disease or a disorder in which T cells have deleterious effects, wherein said anti-CLEC-1A antibody or antigen-binding fragment thereof or mimetic thereof is an antagonist of the interaction between human CLEC-1A and secondary necrotic cells and/or tumor cells, and/or tumor cells present in a host having a cancer or developing a cancer and/or in the intracellular content of permeabilized secondary necrotic cells and/or in the intracellular content of permeabilized tumor cells.

In another aspect, the invention relates to a method of increasing the phagocytosis capability of myeloid cells, in particular of dendritic cells and/or macrophages, comprising the administration in a patient in need thereof of an effective amount of a humanized anti-CLEC-1A antibody or antigen-binding fragment thereof or mimetic thereof of the invention, in particular an anti-CLEC1A antibody, according to any embodiment disclosed herein; in particular said anti-CLEC-1A antibody or antigen-binding fragment thereof or mimetic thereof is administered simultaneously, separately or sequentially with a conventional treatment or with at least one second therapeutic agent as defined herein.

In another aspect, the invention relates to humanized anti-CLEC-1A antibody or antigen-binding fragment thereof or mimetic thereof as described above, for its use in the treatment of cancer in particular in the treatment of liquid or solid cancers, and more particularly in the treatment of lymphoma, colorectal cancer, mesothelioma or hepatocarcinoma.

In another aspect of the invention, it relates to a combination of therapeutic compounds comprising as a first therapeutic compound an CLEC-1A-antagonist antibody or antigen-binding fragment thereof or mimetic thereof, in particular an anti-CLEC-1A antibody, and at least one second therapeutic compound selected from the group consisting of an immunotherapeutic agent, in particular a tumor targeting antibody, in particular an anti-tumor targeting antibody suitable for activating and/or enhancing the phagocytosis capability of macrophages, in particular M1 macrophages, or a chemotherapeutic agent or a radiotherapy agent. The present inventors have shown that such combinations are particularly suitable for treating cancers. As illustrated in the examples of the invention, these combinations exert a synergetic effect in the treatment of cancer, leading to a drastic reduction of tumor growth, tumor volume, and/or improve the survival rate.

DETAILED DESCRIPTION OF THE INVENTION

The expression "secondary necrotic cells" or "cells under secondary necrosis" accordingly defines cells (including cell lines as disclosed herein) that have progressed toward stages of cellular changes characterized by hypercondensed chromatin (pyknosis), and nuclear fragmentation (karyorrhexis) and possibly the additional features of rupture of cytoplasmic membrane, release of activated caspase-3, further a possible cytoplasmic swelling and lysosomal membrane permeabilization. Cells under secondary necrosis are cells for which the apoptotic process proceeds to an autolytic necrotic outcome, i.e., an autolytic process of cell disintegration. The expression "secondary necrotic cells" or "cells under secondary necrosis" may similarly be properly defined by reference to markers of this specific stage in apoptotic cells wherein markers are known and used that may also enable to discriminate secondary necrotic cells from early apoptotic cells or from primary necrotic cells. Such markers include label-conjugated Annexin V and propidium iodide (PI): early-apoptotic cells are known to be Annexin V positive and PI negative (Annexin+/PI−) whereas late-apoptotic cells are known to be Annexin V positive and PI positive i.e. Annexin/PI double positive (Annexin+/PI+). These markers are sometimes used in the art to designate late-apoptotic cells. As used herein, permeabilized cells are cells in which is provided access to intracellular or intraorganellar antigens. Permeabilization allows entry through the cell membrane of antibodies, thereby allowing the binding into the intracellular content of these cells of the anti-CLEC1A antibodies, antigen-binding fragments thereof and mimetics of the invention with CLEC-1A expressed within the intracellular compartment of the cell but not on the cell membrane.

By "endogenous ligand", it should be understood a ligand originating from the same species or within the same organism as the CLEC-1A receptor; e.g. an endogenous human CLEC-1A ligand is the human ligand(s) of human CLEC-1A receptor; an endogenous mice CLEC-1A ligand is the mice ligand(s) of mice CLEC-1A receptor.

As used herein, the term "antibody" refers to polyclonal antibodies, monoclonal antibodies or recombinant antibodies.

As used herein, a "monoclonal antibody" is intended to refer to a preparation of antibody molecules, antibodies that share a common heavy chain and common light chain amino acid sequence, in contrast with "polyclonal" antibody preparations that contain a mixture of antibodies of different amino acid sequence. Monoclonal antibodies can be generated by several known technologies like phage, bacteria, yeast or ribosomal display, as well as by classical methods exemplified by hybridoma-derived antibodies. Thus, the term "monoclonal" is used to refer to all antibodies derived from one nucleic acid clone.

The antibodies of the present invention include recombinant antibodies. As used herein, the term "recombinant antibody" refers to antibodies which are produced, expressed, generated or isolated by recombinant means, such as antibodies which are expressed using a recombinant expression vector transfected into a host cell; antibodies isolated from a recombinant combinatorial antibody library; antibodies isolated from an animal (e.g. a mouse) which is transgenic due to human immunoglobulin genes; or antibodies which are produced, expressed, generated or isolated in any other way in which particular immunoglobulin gene sequences (such as human immunoglobulin gene sequences) are assembled with other DNA sequences. Recombinant antibodies include, for example, chimeric and humanized antibodies.

As used herein, a "chimeric antibody" refers to an antibody in which the sequence of the variable domain derived from the germline of a mammalian species, such as a mouse, have been grafted onto the sequence of the constant domain derived from the germline of another mammalian species, such as a human.

As used herein, a "humanized antibody" refers to an antibody in which CDR sequences derived from the germline of another mammalian species, such as a mouse, have been grafted onto human framework sequences.

Antibodies of the invention are humanized antibodies. In an embodiment, the antibodies of the invention are recombinant antibodies. In an embodiment, the antibodies of the invention are recombinant humanized antibodies. The antibodies of the invention may be de-immunized. By "de-immunized", it should be understood that the antibody shares a similar structure with the antibody of the invention, but the structure of the antibody is modified to lower the potential of unwanted T cell response by removing known epitope recognized by T cells in the structure of the antibody.

As used herein, an "antigen-binding fragment of an antibody" means a part of an antibody, i.e. a molecule corresponding to a portion of the structure of the antibody of the invention, that exhibits antigen-binding capacity for CLEC-1A, possibly in its native form; such fragment especially exhibits the same or substantially the same antigen-binding specificity for CLEC-1A compared to the antigen-binding specificity of the corresponding four-chain antibody. Advantageously, the antigen-binding fragments have a similar binding affinity as the corresponding 4-chain antibodies. However, antigen-binding fragment that have a reduced antigen-binding affinity with respect to corresponding 4-chain antibodies are also encompassed within the invention. The antigen-binding capacity can be determined by measuring the affinity between the antibody and the target fragment. These antigen-binding fragments may also be designated as "functional fragments" of antibodies.

As used herein, "mimetic" of an antibody means an antigen-binding antibody mimetic. Antigen-binding antibody mimetics are organic compounds that specifically bind antigens, but that are not structurally related to antibodies. They are usually artificial peptides or small proteins with a molar mass of about 3 to 20 kDa. Nucleic acids and small molecules are sometimes considered antibody mimetics as well, but not artificial antibodies, antibody fragments and fusion proteins composed from these. Common advantages over antibodies are better solubility, tissue penetration, stability towards heat and enzymes, and comparatively low production costs. Antibody mimetics are being developed as therapeutic and diagnostic agents. Antigen-binding antibody mimetics may also be selected among the group comprising affibodies, affilins, affimers, affitins, DARPins, and Monobodies.

As used herein, the term "CLEC-1" has its general meaning in the art and refers to C-type lectin-like receptor-1, particularly from a mammal species, more particularly a human CLEC-1. CLEC-1 belongs to the DECTIN-1 cluster of C type-lectin like receptors (CTLRs) including CLEC-2, DECTIN-1, CLEC-9A, MICL, MAH and LOX-1.

As used herein, the term "CLEC-1A" relates to a CLEC-1A from a mammal species, preferably a human CLEC-1A. A reference sequence of the human CLEC-1A corresponds to the sequence associated to the Accession number Q8NC01 Uniprot. Preferably, the term "human CLEC-1" or "human CLEC-1A" or "human CLEC-1 receptor" or "human CLEC-1A receptor" refers to the protein of amino acid sequence referenced by the Q8NC01 Uniprot accession number and encoded by CLEC1A gene referenced by the 51267 NCBI accession number. In the present description, the terms CLEC-1A, CLEC1A, CLEC1, CLEC-1, Clec1, Clec-1, Clec1A and Clec-1A are used interchangeably and all designate a CLEC1 receptor of a mammal corresponding to human CLEC-1A receptor corresponds to the sequence associated to the Accession number Q8NC01 Uniprot, an orthologue protein thereof, or a homologous protein thereof. In particular, CLEC-1A is, a protein having the amino acid sequence of SEQ ID No. 1. In particular, the extracellular domain of CLEC-1A is a protein having the amino acid sequence of SEQ ID No. 2.

As used herein, the term "CLEC-1 antagonist" has its general meaning in the art and refers to any compound, natural or synthetic, that blocks, suppresses, or reduces the biological activity of CLEC-1. In particular, the CLEC-1 antagonist inhibits the interactions between the CLEC-1 and at least one of its ligands. In particular, the CLEC-1 antagonist enhances T cells response, particularly increases T cells proliferation and/or cytokine synthesis such as IFNgamma. It may also refers to any compound, natural or synthetic, that blocks, suppresses, or reduces the biological activity of CLEC-1. In particular, the CLEC-1 antagonist inhibits the interactions between the receptor CLEC-1 and at least one of its ligands, more particularly all of its ligands. More particularly, a CLEC-1 antagonist can bind to receptor CLEC-1 or to any one of its ligands.

As used herein, "CLEC-1 antagonist" or "antagonist of CLEC-1" may correspond to a compound which binds to CLEC-1A and selected from the group of an antibody, an antigen-binding fragment of an antibody, an antigen-binding mimetic of an antibody a macromolecule comprising an antigen-binding fragment of an antibody or a full antibody or mimetic.

The antagonist capability of an antibody or antigen-binding fragment thereof or mimetic thereof may be assessed according to suitable experiments disclosed in the examples of the present invention, in particular in example 5. In particular, an antibody or antigen-binding fragment thereof or mimetic thereof may be considered as an antagonist of CLEC-1A, in particular of human CLEC-1A, when (i) it reduces the binding of the extra-cellular domain of CLEC-1A, in particular when it reduces the binding of a fusion protein comprising the extracellular domain of human CLEC-1A receptor fused with a Fc fragment of a human immunoglobulin, in particular a human IgG, to secondary necrotic cells and/or tumor cells and/or to the intracellular content of secondary necrotic cells, particularly to permeabilized RAJI cells and/or to apoptotic PBMCs as compared to the same binding experiment in absence of the antagonist antibody candidate; and (ii) it increases the phagocytosis of tumor cells by myeloid cells as compared to the same experiment in absence of the antagonist compound. A binding reduction is considered when the binding is reduced by at least 1-log, more particularly at least 2-log and most preferably at least 3-log as compared to the negative experiment. An increase in the phagocytosis of tumor cells is considered when the phagocytosis is raised by at least 10%, preferably at least 20%; and most preferably at least 30%.

The antibody and antigen-binding fragment of the invention may be defined according to structural features. Antigen-binding fragments of antibodies are fragments which comprise their hypervariable domains designated CDRs (Complementary Determining Regions) or part(s) thereof encompassing the recognition site for the antigen, i.e. the extracellular domain of CLEC-1A.

Each Light and Heavy chain variable domains (respectively VL and VH) of a four-chain immunoglobulin has three CDRs, designated VLCDR1 (or LCDR1), VLCDR2 (or LCDR2), VLCDR3 (or LCDR3) and VHCDR1 (or HCDR1), VHCDR2 (or HCDR2), VHCDR3 (or HCDR3), respectively.

The skilled person is able to determine the location of the various regions/domains of antibodies by reference to the standard definitions in this respect set forth, including a reference numbering system, a reference to the numbering system of KABAT or by application of the IMGT "collier de perle" algorithm. In this respect, for the definition of the sequences of the invention, it is noted that the delimitation of the regions/domains may vary from one reference system to another. Accordingly, the regions/domains as defined in the present invention encompass sequences showing variations in length or localization of the concerned sequences within the full-length sequence of the variable domains of the antibodies, of approximately +/−10%.

In a particular embodiment of the invention, the CDR domains of the antibodies are designated according to the Kabat nomenclature. In another particular embodiment of the invention, the CDR domains of the antibodies are designated according to the IMGT nomenclature. In other words, any or all CDR domain of the antibodies or the antigen-binding fragment thereof of the invention may be defined by Kabat nomenclature; any or all CDR domain of the antibodies or the antigen-binding fragment thereof of the invention may be defined by IMGT nomenclature. More particularly, all CDR domains of the antibodies or the antigen-binding fragment thereof of the invention are defined by the Kabat nomenclature.

Based on the structure of four-chain immunoglobulins, antigen-binding fragments can thus be defined by comparison with sequences of antibodies in the available databases and prior art, and especially by comparison of the location of the functional domains in these sequences, noting that the positions of the framework and constant domains are well defined for various classes of antibodies, especially for IgGs, in particular for mammalian IgGs. Such comparison also involves data relating to 3-dimensional structures of antibodies.

For illustration purpose of specific embodiments of the invention, antigen binding fragments of an antibody that contain the variable domains comprising the CDRs of said antibody encompass Fv, dsFv, scFv, Fab, Fab', F(ab')2. Fv fragments consist of the VL and VH domains of an antibody associated together by hydrophobic interactions; in dsFv fragments, the VH:VL heterodimer is stabilized by a disulphide bond; in scFv fragments, the VL and VH domains are connected to one another via a flexible peptide linker thus forming a single-chain protein. Fab fragments are monomeric fragments obtainable by papain digestion of an antibody; they comprise the entire L chain, and a VH-CH1 fragment of the H chain, bound together through a disulfide bond. The F(ab')2 fragment can be produced by pepsin digestion of an antibody below the hinge disulfide; it comprises two Fab' fragments, and additionally a portion of the hinge region of the immunoglobulin molecule. The Fab' fragments are obtainable from F(ab')2 fragments by cutting a disulfide bond in the hinge region. F(ab')2 fragments are divalent, i.e. they comprise two antigen binding sites, like the native immunoglobulin molecule; on the other hand, Fv (a VH:VL dimmer constituting the variable part of Fab), dsFv, scFv, Fab, and Fab' fragments are monovalent, i.e. they comprise a single antigen-binding site. These basic antigen-binding fragments of the invention can be combined together to obtain multivalent antigen-binding fragments, such as diabodies, tribodies or tetrabodies. These multivalent antigen-binding fragments are also part of the present invention.

As used herein, the term "bispecific" antibodies refer to antibodies that recognize two different antigens by virtue of possessing at least one region (e.g. derived from a variable region of a first antibody) that is specific for a first antigen, and at least a second region (e.g. derived from a variable region of a second antibody) that is specific for a second antigen. A bispecific antibody specifically binds to two target antigens and is thus one type of multispecific antibody. Multispecific antibodies, which recognize two or more different antigens, can be produced by recombinant DNA methods or include, but are not limited to, antibodies produced chemically by any convenient method. Bispecific antibodies include all antibodies or conjugates of antibodies, or polymeric forms of antibodies which are capable of recognizing two different antigens. Bispecific antibodies include antibodies that have been reduced and reformed so as to retain their bivalent characteristics and to antibodies that have been chemically coupled so that they can have several antigen recognition sites for each antigen such as BiME (Bispecific Macrophage Enhancing antibodies), BiTE (bispecific T cell engager), DART (Dual affinity retargeting); DNL (dock-and-lock). More particularly, a bispecific antibody according to the invention may recognize and bind CLEC-1A and comprises any combination of CDRs as disclosed herein, or any combination of heavy and light variable domains as disclosed herein, and exert the same function and capabilities as the humanized anti-CLEC-1A antibodies of the invention, and recognize and bind to at least a second compound selected from SIRPalpha, SIRPbeta, SIRPgamma, CD47, CTLA-4, CD86 (B7.2), CD28, CD40, CD40L, ICOS, ICOS-L, OX40L, GITR, HVEM, BTLA, CD160, LIGHT, TNFRSF25, 2B4, CD48, Tim1, Tim3, Tim4, Gal9, LAG-3, CD40, CD40L, CD70, CD27, VISTA, B7H3, B7H4 (B7x), TIGIT, CD112, HHLA2 (B7-H7), TMIGD2 (CD28H), Butyrophilin-like2 (BTNL2), SIGLEC, AXL, B7.1, B7-DC, B7-H1, B7-H2, B7-H3, B7-H4, CD19, CD20, CD22, CD24, CD137 (4-1BB), CD137L (4-1BBL), CEA, CXCR3, CXCR4, EGFR, EGFRvIII, ELTD1, EMR1, EMR2, EMR3, EMR4P, ENG, EPCAM, EPHR, PD-L1, TLR1, TLR10, TLR2, TLR3, TLR4, VEGFR, VEGFR2, VIPR1, VIPR2. A bispecific antibody may comprise two different paratopes, one recognizing the human CLEC-1A, and corresponding to any combination of CDRs as disclosed herein, or any combination of heavy and light variable domains as disclosed herein, a second, different, paratope recognizing another compound as listed here above. Alternatively, a bispecific antibody may be a humanized anti-CLEC-1A antibody or antigen-binding fragment thereof or mimetic thereof as disclosed here, which is linked to another compound selected from the list here above, or a fragment thereof, for example the extracellular domain of such a compound when it has an extracellular domain.

All the embodiments disclosed herein for antibodies are transposed mutatis mutandis to any compound according to the invention, in particular to antigen-binding antibody fragments, mimetics of an antibody, in particular to humanized recombinant antibodies.

In the following description of the invention, the term anti-CLEC-1A compound means either an antibody or an antigen-binding fragment or a mimetic of an antibody, whether recombinant or not, or a macromolecule comprising such an antibody or antigen-binding fragment thereof. When the term anti-CLEC-1A antibody is used, the same compounds are encompassed by this term, except when specified in relation to a particular embodiment of the invention.

A "specific anti-CLEC-1A antibody or antigen-binding fragment thereof or mimetic thereof" is a compound that exhibits specific binding for CLEC-1A and which does not exhibit specific binding for another compound, binding being in each case detectable by methods known in the art like but not limited to BIACORE analysis, BLITZ analysis, ELISA assay or Scatchard plot. A specific "anti-CLEC-1A antibody or antigen-binding fragment thereof" may nonetheless cross-react with another compound than CLEC-1A, the notion of specificity does not exclude that an antibody may cross-react with other polypeptides than CLEC-1A, but with a lower affinity. Hence, specific anti-CLEC-1A antibody or antigen-binding fragment thereof or mimetic thereof may also be defined as an antibody that exhibits high binding affinity for CLEC-1A but that nevertheless exhibit low binding affinity for another compound.

Antibodies and Antigen-Binding Fragments Thereof

In a first aspect, it is disclosed a humanized antibody or antigen-binding fragment thereof or mimetic thereof that specifically binds to the extracellular domain of human C-type lectin-like receptor-1 member A receptor (CLEC-1A receptor) which comprises:

an antibody heavy chain variable domain comprising VHCDR1 of SEQ ID No. 10, VHCDR2 of SEQ ID No. 11, VHCDR3 of SEQ ID No. 12; and an antibody light chain variable domain comprising VLCDR1 of SEQ ID No. 13, VLCDR2 of SEQ ID No. 14, VLCDR3 of SEQ ID No. 15; or an antibody heavy chain variable domain comprising VHCDR1 of SEQ ID No. 16, VHCDR2 of SEQ ID No. 17, VHCDR3 of SEQ ID No. 18; and an antibody light chain variable domain comprising VLCDR1 of SEQ ID No. 19, VLCDR2 of SEQ ID No. 20, VLCDR3 of SEQ ID No. 21; or an antibody heavy chain variable domain comprising VHCDR1 of SEQ ID No. 22, VHCDR2 of SEQ ID No. 23, VHCDR3 of SEQ ID No. 24; and an antibody light chain variable domain comprising VLCDR1 of SEQ ID No. 25, VLCDR2 of SEQ ID No. 26, VLCDR3 of SEQ ID No. 27.

These CDRs localized within the heavy and light variable domains of exemplified antibodies are provided using Kabat numbering. These combinations of CDR domains correspond respectively to the CDR domains present on the heavy and light chains of exemplified antibodies 11H11, 14H9 and 6C5 respectively.

In another aspect of the invention, it is disclosed an antibody or antigen-binding fragment thereof or mimetic thereof that specifically binds to the extracellular domain of human C-type lectin-like receptor-1 member A receptor (CLEC-1A receptor) which comprises:

an antibody heavy chain variable domain comprising VHCDR1 of SEQ ID No. 34, VHCDR2 of SEQ ID No. 35, VHCDR3 of SEQ ID No. 36; and an antibody light chain variable domain comprising VLCDR1 of SEQ ID No. 37, VLCDR2 of SEQ ID No. 38, VLCDR3 of SEQ ID No. 39; or an antibody heavy chain variable domain comprising VHCDR1 of SEQ ID No. 40, VHCDR2 of SEQ ID No. 41, VHCDR3 of SEQ ID No. 42; and an antibody light chain variable domain comprising VLCDR1 of SEQ ID No. 43, VLCDR2 of SEQ ID No. 44, VLCDR3 of SEQ ID No. 45; or an antibody heavy chain variable domain comprising VHCDR1 of SEQ ID No. 46, VHCDR2 of SEQ ID No. 47, VHCDR3 of SEQ ID No. 48; and an antibody light chain variable domain comprising VLCDR1 of SEQ ID No. 49, VLCDR2 of SEQ ID No. 50, VLCDR3 of SEQ ID No. 51.

These CDRs localized within the heavy and light variable domains of exemplified antibodies are provided using IMGT numbering. These combinations of CDR domains correspond respectively to the CDR domains present on the heavy and light chains of exemplified antibodies 11H11, 14H9 and 6C5 respectively.

In a particular aspect of the invention, an humanized antibody or antigen-binding fragment thereof or mimetic thereof that specifically binds to the extracellular domain of human C-type lectin-like receptor-1 member A receptor (CLEC-1A receptor) comprises a combination of 6 CDRs domains as disclosed herein, and shares at least 80%, particularly at least 85%, more particularly at least 90%, or at least 91%, or at least 92%, or at least 93%, or at least 94%, or at least 95%, or at least 96%, or at least 97%, or at least 98%, or at least 99%, with the framework regions of the antibody selected from 11H11, 14H9 and 6C5 and having the same 6 CDRs domains. CDRs domains may be defined according to the KABAT numbering or the IMGT numbering. Framework regions correspond to the amino acid residues localized in the variable domain of the heavy chain and the light chain outside the CDRs domains.

Antibodies according to theses embodiments (i.e. antibodies and antigen-binding fragments thereof with CDRs defined by Kabat numbering or IMGH numbering) are particularly suitable for enhancing the phagocytosis of tumor cells by dendritic cells. Antibodies according to this definition have an affinity for human CLEC-1A which is suitable for use in therapy and have at the same time a better effect at the same concentration on the phagocytosis capability of tumor cells by dendritic cells as compared to other anti-CLEC-1A antibody, in particular as compared to the control anti-CLEC-1A antibody used in the examples of the invention (see FIGS. 1-4). Further, these antibodies and antigen-binding fragments elicits superior antagonist capability towards human CLEC-1A as compared to the antagonist capability of their chimeric equivalents.

In a particular aspect of the invention, it is provided a humanized antibody or antigen-binding fragment thereof or mimetic thereof that specifically binds to the extracellular domain of human C-type lectin-like receptor-1 member A receptor (CLEC-1A receptor) which comprises:

an antibody heavy chain variable domain comprising VHCDR1 of SEQ ID No. 10, VHCDR2 of SEQ ID No. 11, VHCDR3 of SEQ ID No. 12; and an antibody light chain variable domain comprising VLCDR1 of SEQ ID No. 19, VLCDR2 of SEQ ID No. 20, VLCDR3 of SEQ ID No. 21; or an antibody heavy chain variable domain comprising VHCDR1 of SEQ ID No. 10, VHCDR2 of SEQ ID No. 11, VHCDR3 of SEQ ID No. 12; and an antibody light chain variable domain comprising VLCDR1 of SEQ ID No. 25, VLCDR2 of SEQ ID No. 26, VLCDR3 of SEQ ID No. 27;

an antibody heavy chain variable domain comprising VHCDR1 of SEQ ID No. 16, VHCDR2 of SEQ ID No. 17, VHCDR3 of SEQ ID No. 18; and an antibody light chain variable domain comprising VLCDR1 of SEQ ID No. 25, VLCDR2 of SEQ ID No. 26, VLCDR3 of SEQ ID No. 27; or an antibody heavy chain variable domain comprising VHCDR1 of SEQ ID No. 16, VHCDR2 of SEQ ID No. 17, VHCDR3 of SEQ ID No. 18; and an antibody light chain variable domain comprising VLCDR1 of SEQ ID No. 13, VLCDR2 of SEQ ID No. 14, VLCDR3 of SEQ ID No. 15; or an antibody heavy chain variable domain comprising VHCDR1 of SEQ ID No. 22, VHCDR2 of SEQ ID No. 23, VHCDR3 of SEQ ID No. 24; and an antibody light chain variable domain comprising VLCDR1 of SEQ ID No. 19, VLCDR2 of SEQ ID No. 20, VLCDR3 of SEQ ID No. 21; or an antibody heavy chain variable domain comprising VHCDR1 of SEQ ID No. 22, VHCDR2 of SEQ ID No. 23, VHCDR3 of SEQ ID No. 24; and an antibody light chain variable domain comprising VLCDR1 of SEQ ID No. 13, VLCDR2 of SEQ ID No. 14, VLCDR3 of SEQ ID No. 15.

In a particular aspect of the invention, it is provided a humanized antibody or antigen-binding fragment thereof or mimetic thereof that specifically binds to the extracellular domain of human C-type lectin-like receptor-1 member A receptor (CLEC-1A receptor) which comprises:

an antibody heavy chain variable domain comprising VHCDR1 of SEQ ID No. 34, VHCDR2 of SEQ ID No. 35, VHCDR3 of SEQ ID No. 36; and an antibody light chain variable domain comprising VLCDR1 of SEQ ID No. 43, VLCDR2 of SEQ ID No. 44, VLCDR3 of SEQ ID No. 45; or an antibody heavy chain variable domain comprising VHCDR1 of SEQ ID No. 34, VHCDR2 of SEQ ID No. 35, VHCDR3 of SEQ ID No. 36; and an antibody light chain variable domain comprising VLCDR1 of SEQ ID No. 49, VLCDR2 of SEQ ID No. 50, VLCDR3 of SEQ ID No. 51;

an antibody heavy chain variable domain comprising VHCDR1 of SEQ ID No. 40, VHCDR2 of SEQ ID No. 41, VHCDR3 of SEQ ID No. 42; and an antibody light chain variable domain comprising VLCDR1 of SEQ ID No. 49, VLCDR2 of SEQ ID No. 50, VLCDR3 of SEQ ID No. 51; or an antibody heavy chain variable domain comprising VHCDR1 of SEQ ID No. 40, VHCDR2 of SEQ ID No. 41, VHCDR3 of SEQ ID No. 42; and an antibody light chain variable domain comprising VLCDR1 of SEQ ID No. 37, VLCDR2 of SEQ ID No. 38, VLCDR3 of SEQ ID No. 39; or an antibody heavy chain variable domain comprising VHCDR1 of SEQ ID No. 46, VHCDR2 of SEQ ID No. 47, VHCDR3 of SEQ ID No. 48; and an antibody light chain variable domain comprising VLCDR1 of SEQ ID No. 43, VLCDR2 of SEQ ID No. 44, VLCDR3 of SEQ ID No. 45; or an antibody heavy chain variable domain comprising VHCDR1 of SEQ ID No. 46, VHCDR2 of SEQ ID No. 47, VHCDR3 of SEQ ID No. 48; and an antibody light chain variable domain comprising VLCDR1 of SEQ ID No. 37, VLCDR2 of SEQ ID No. 38, VLCDR3 of SEQ ID No. 39.

In a particular embodiment, a humanized antibody or an antigen-binding fragment thereof or mimetic thereof of the invention comprises:
an antibody heavy chain variable domain comprising three VHCDRs wherein their amino acid sequences are respectively selected from:
VHCDR1 of SEQ ID No: 10; SEQ ID No. 16 and SEQ ID No. 22;
VHCDR2 of SEQ ID No: 11; SEQ ID No: 17 and SEQ ID No: 23; and
VHCDR3 of SEQ ID No: 12; SEQ ID No: 18 and SEQ ID No: 24; and
an antibody light chain variable domain comprising three VLCDRs wherein their amino acid sequence is selected from:
VLCDR1 of SEQ ID No: 13; SEQ ID No. 19 and SEQ ID No. 25; and
VLCDR2 of SEQ ID No: 14; SEQ ID No. 20 and SEQ ID No. 26; and
VLCDR3 of SEQ ID No: 15; SEQ ID No. 21 and SEQ ID No. 27.

These CDRs localized within the heavy and light variable domains of exemplified antibodies are provided using Kabat numbering.

In a particular embodiment, a humanized antibody or an antigen-binding fragment thereof or mimetic thereof of the invention comprises:
an antibody heavy chain variable domain comprising three VHCDRs wherein their amino acid sequences are respectively selected from:
VHCDR1 of SEQ ID No: 34; SEQ ID No. 40 and SEQ ID No. 46;
VHCDR2 of SEQ ID No: 35; SEQ ID No: 41 and SEQ ID No: 47; and
VHCDR3 of SEQ ID No: 36; SEQ ID No: 42 and SEQ ID No: 49; and
an antibody light chain variable domain comprising three VLCDRs wherein their amino acid sequence is selected from:

VLCDR1 of SEQ ID No: 37; SEQ ID No. 43 and SEQ ID No. 49; and
VLCDR2 of SEQ ID No: 38; SEQ ID No. 44 and SEQ ID No. 50; and
VLCDR3 of SEQ ID No: 39; SEQ ID No. 45 and SEQ ID No. 51.

These CDRs localized within the heavy and light variable domains of exemplified antibodies are provided using Kabat numbering.

In a particular embodiment, a humanized antibody or an antigen-binding fragment thereof or a mimetic thereof of the invention comprises:
an antibody heavy chain variable domain comprising or consisting of the amino acid sequence set forth in SEQ ID No. 3; and an antibody light chain variable domain comprising or consisting of the amino acid sequence set forth in SEQ ID No. 4, or
an antibody heavy chain variable domain comprising or consisting of the amino acid sequence set forth in SEQ ID No. 5; and an antibody light chain variable domain comprising or consisting of the amino acid sequence set forth in SEQ ID No. 7; or
an antibody heavy chain variable domain comprising or consisting of the amino acid sequence set forth in SEQ ID No. 6; and an antibody light chain variable domain comprising or consisting of the amino acid sequence set forth in SEQ ID No. 7; or
an antibody heavy chain variable domain comprising or consisting of the amino acid sequence set forth in SEQ ID No. 8; and an antibody light chain variable domain comprising or consisting of the amino acid sequence set forth in SEQ ID No. 9.

These combinations of a heavy variable domain with a light variable domain correspond respectively to the heavy and light variable domains of exemplified antibodies 11H11, 14H9, a mutated version of the humanized heavy chain of 14H9 (the mutations are localized within the frameworks of the chain) with the light variable domain of 14H9, and 6C5. Antibodies according to this definition may be particularly suitable for modulating, in particular, enhancing the phagocytosis of tumor cells and/or secondary necrotic cells by myeloid cells, in particular by dendritic cells or macrophages, in particular in vitro and/or in vivo. Further, antibodies according to this definition are particularly suitable for antagonizing the binding of human CLEC-1A to at least one of its ligand, in particular as compared to chimeric antibodies.

In a particular embodiment, a humanized antibody or an antigen-binding fragment thereof or a mimetic thereof of the invention comprises:
an antibody heavy chain variable domain comprising or consisting of the amino acid sequence set forth in SEQ ID No. 3; SEQ ID No. 5; SEQ ID No. 6 and SEQ ID No. 8; and
an antibody light chain variable domain comprising or consisting of the amino acid sequence set forth in SEQ ID No. 4; SEQ ID No. 7 and SEQ ID No. 9.

The various antibody molecules and fragments may derive from any of the commonly known immunoglobulin classes (isotypes), including but not limited to IgA, secretory IgA, IgE, IgG and IgM. IgG subclasses are also well known to those in the art and include but are not limited to human IgG1, IgG2, IgG3 and IgG4. In a particular embodiment of the invention, the variable regions of the antibody may be associated with antibody constant regions, like IGg1, IgG2, IgG3 or IgG4 constant regions. These constant regions may be further mutated or modified, by methods known in the art, for modifying their binding capability towards Fc receptor.

In a particular embodiment, the antibody or antigen-binding fragment thereof or mimetic thereof according to the invention is a humanized monoclonal antibody wherein the antibody light chain constant domain is derived from a human kappa light chain constant domain, in particular wherein the light chain constant domain comprises or consists of the sequence of SEQ ID No: 33.

In a particular embodiment, the antibody or antigen-binding fragment thereof or mimetic thereof according to the invention is a humanized monoclonal antibody wherein the antibody heavy chain constant domain is derived from a human IgG1, IgG2, IgG3, or IgG4 heavy chain constant domain, in particular wherein the antibody heavy chain constant domain comprises or consists of the amino acid sequence of SEQ ID No: 28 (human Fc IgG1), SEQ ID No: 29 (human Fc IgG2), SEQ ID No: 30 (human Fc IgG4), SEQ ID No. 97 (Fc IgG1 N297A), SEQ ID No. 100 (FcG1 LALA) and SEQ ID No. 101 (Fc IgG1 LALAPG). Chimeric antibodies (for examples the one used as controls in the examples of the invention) may comprise a heavy chain constant domain of SEQ ID No: 31 (mouse FcG1) or SEQ ID No: 32.

In another embodiment, the antibody or antigen-binding fragment thereof or mimetic thereof binds to an human CLEC-1A with an affinity of at least about 1×10-6 M, 1×10-7 M, 1×10-8 M, 1×10-9 M, 1×10-10 M, 1×10-11 M, 1×10-12 M, or more, and/or bind to a target with an affinity that is at least two-fold greater than its affinity for another compound than human CLEC-1A receptor. In a particular embodiment, the antibody or antigen-binding fragment of the invention binds to human CLEC-1A with an affinity constant (KD) of at least than 1E-07 M, more particularly of at least 1E-08 M. In a particular embodiment, the antibody or antigen-binding fragment thereof or mimetic thereof binds to a human CLEC-1A with an affinity over 1-log, more particularly over 2-log, and most preferably over 3-log, as compared to the binding of control anti-CLEC-1A antibody to CLEC-1a in the same binding conditions. The binding experiment may be proceeded according to any one the binding experiment disclosed in the examples of the invention.

In a particular embodiment, an anti-CLEC-1A antibody or antigen-binding fragment thereof or mimetic thereof is CLEC-1A specific when the effective dose of the compound to reach 50% of the maximum signal (ED50) according to the invention has an ED50 value for human CLEC-1A lower than 1500 ng/ml The ED50 may be determined according to methods known in the art, or by the method disclosed in the examples of the present invention, like cytometry illustrated on FIG. 11. In a particular embodiment, the binding between an anti-CLEC-1A antibody and human CLEC-1A as defined here above may be considered specific when the effective dose of the compound to reach 50% of the maximum signal (EC50) in a binding assay is lower than 1200 ng/ml, more particularly lower than 800 ng/ml, and still more particularly lower than 400 ng/ml. Such an ability may for example be assessed according to the methods illustrated in the examples of the present invention.

In another particular embodiment, a specific anti-CLEC-1A antibody or antigen-binding fragment thereof or mimetic thereof according to the invention has an ED50 value (also referenced EC 50 value) for human CLEC-1A comprised between 1 ng/ml and 1000 ng/ml, more particularly between 5 ng/ml and 1500 ng/ml, more particularly 800 ng/ml. The EC50 may be determined according to methods known in the art, or by the method disclosed in the examples of the present invention, for example according to the method disclosed in relation to the data illustrated on FIG. 11 and issued from example 7.

The term "ED50" and as used herein refers to the measure of the effectiveness of a compound (e.g., an anti-CLEC-1A antibody or antigen-binding fragment thereof) in eliciting a biological or biochemical function (e.g., the function or activity of CLEC-1A) by 50%. For example, EC50 indicates how much of an anti-CLEC-1A antibody or antigen-binding fragment thereof or mimetic thereof is needed to elicit the activity of CLEC-1A by half. That is, it is the half maximal (50%) effective concentration of an anti-CLEC-1A antibody or antigen-binding fragment thereof or mimetic thereof (50% ED, or ED50). ED50 represents the concentration of a drug that is required for 50% effectiveness in vitro. The ED50 can be determined by techniques known in the art, for example, by constructing a dose-response curve and examining the effect of different concentrations of the anti-CLEC-1A compound on CLEC-1A binding to Fc-CLEC. A method is for example disclosed in the examples of the present invention.

In the invention, it can also be considered that an anti-CLEC-1A antibody or antigen-binding fragment thereof or mimetic thereof is an antagonist of CLEC-1A if said compound induces an increase superior to 1 log, preferably superior to 2 log, more preferably superior to 3 log, most preferably superior to 4 log, of the KD value of Fc-CLEC-1A protein to CLEC-1A in a binding competitive assay wherein the antagonist antibody is present. This experiment may be conducted according to BLITZ method or ELISA, for example in the experimental conditions illustrated in the examples of the invention.

An antibody or an antigen-binding fragment thereof or mimetic thereof, which is a humanized antibody can also be derived by substitution of amino acid residue(s) present in constant region(s) of variable chains (VH and/or VL), for human amino acid residue(s) having corresponding location in human antibodies according to standard definition and numbering, wherein the substitution level is from 1% to 80%, more preferably from 1% to 50%, still more preferably form 1% to 20%, in particular from 1% to 18% of the residues in said framework regions. Said constant regions include those of framework regions (FRs) defined in four-chain antibodies identified in particular by reference to Kabat numbering. Or IMGT numbering, more particularly by Kabat numbering.

Anti-CLEC-1A antibodies may be humanized according to known methods. As examples, the different combinations of CDRs disclosed herein may be grafted on human heavy chain variable domain and/or light chain variable domain. The chimeric, humanized and/or de-immunized antibodies of the invention can belong to any class of immunoglobulins, like the non-modified antibodies. Preferably, they belong to a subclass of the IgG class such as IgG1, IgG2, IgG3 or IgG4.

Methods for preparing recombinant antibodies (or antigen-binding fragments thereof or mimetics thereof) by combining the variable regions of an antibody with appropriate linkers, or with the constant regions of another antibody, are well known in the art.

Also encompassed by the present invention is an antibody or an antigen-binding fragment thereof or a mimetic thereof, in particular humanized antibody or antigen-binding fragment thereof, which competes with an antibody comprising the amino acid sequence of SEQ ID No. 3, SEQ ID, No. 5, SEQ ID No. 6 or SEQ ID No. 8 as its variable heavy domain and the amino acid sequence of SEQ ID No: 4, SEQ ID No. 7 or SEQ ID No. 9 as its light variable domain, in particular which is the humanized antibody 11H11, 14H9 or 6C5, illustrated in the examples of the present invention, for binding to a CLEC-1A receptor and which antagonizes CLEC-1A binding to its target, and in particular enhances the phagocytosis of tumor cells and/or secondary necrotic cells by myeloid cells, in particular by dendritic cells and/or macrophages, as compared to a negative control, more particularly as compared to the antibody comprising the amino acid sequence of SEQ ID No. 3, SEQ ID, No. 5, SEQ ID No. 6 or SEQ ID No. 8 as its variable heavy domain and the amino acid sequence of SEQ ID No: 4, SEQ ID No. 7 or SEQ ID No. 9 as its light variable domain.

In particular, an antibody or an antigen-binding fragment thereof or a mimetic thereof of the invention specifically binds to the extracellular domain of human C-type lectin-like receptor-1 member A receptor (CLEC-1A receptor) and/or to a Fc-CLEC-1A protein comprising or consisting of the amino acid sequence set forth in SEQ ID No. 52, and further competes with an antibody comprising or consisting of a heavy variable domain comprising or consisting of SEQ ID No. 3 and a light variable domain comprising or consisting of SEQ ID No. 4, in particular comprising or consisting of a heavy domain comprising or consisting of SEQ ID No. 3 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 4 and SEQ ID No. 33, for binding to a human CLEC-1A receptor, and is an antagonist of human CLEC-1A, in particular antagonizes the binding of human CLEC-1A, particularly the binding of the extra-cellular domain of human CLEC-1A or the binding of Fc-CLEC-1A protein comprising or consisting of the amino acid sequence set forth in SEQ ID No. 52, to at least one of its ligand (in particular its target), particularly expressed by secondary necrotic cells and/or tumor cells, and more particularly enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 3 and a light variable domain comprising or consisting of SEQ ID No. 4, in particular comprising or consisting of a heavy domain comprising or consisting of SEQ ID No. 3 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 4 and SEQ ID No. 33.

In particular, an antibody or an antigen-binding fragment thereof or a mimetic thereof of the invention specifically binds to the extracellular domain of human C-type lectin-like receptor-1 member A receptor (CLEC-1A receptor) and/or to a Fc-CLEC-1A protein comprising or consisting of the amino acid sequence set forth in SEQ ID No. 52, and further competes with an antibody comprising or consisting of a heavy variable domain comprising or consisting of SEQ ID No. 5 and a light variable domain comprising or consisting of SEQ ID No. 7, in particular comprising or consisting of a heavy domain comprising or consisting of SEQ ID No. 5 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33, for binding to a human CLEC-1A receptor, and is an antagonist of human CLEC-1A, in particular antagonizes the binding of human CLEC-1A, particularly the binding of the extra-cellular domain of human CLEC-1A or the binding of Fc-CLEC-1A protein comprising or consisting of the amino acid sequence set forth in SEQ ID No. 52, to at least one of its ligand (in particular its target), particularly expressed by secondary necrotic cells and/or tumor cells, and more particularly enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 5 and a light variable domain comprising or consisting of SEQ ID No. 7, in particular comprising or consisting of a heavy domain comprising or consisting of SEQ ID No. 5 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33.

In particular, an antibody or an antigen-binding fragment thereof or a mimetic thereof of the invention specifically binds to the extracellular domain of human C-type lectin-like receptor-1 member A receptor (CLEC-1A receptor) and/or to a Fc-CLEC-1A protein comprising or consisting of the amino acid sequence set forth in SEQ ID No. 52, and further competes with an antibody comprising or consisting of a heavy variable domain comprising or consisting of SEQ ID No. 6 and a light variable domain comprising or consisting of SEQ ID No. 7, in particular comprising or consisting of a heavy domain comprising or consisting of SEQ ID No. 6 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33, for binding to a human CLEC-1A receptor, and is an antagonist of human CLEC-1A, in particular antagonizes the binding of human CLEC-1A, particularly the binding of the extra-cellular domain of human CLEC-1A or the binding of Fc-CLEC-1A protein comprising or consisting of the amino acid sequence set forth in SEQ ID No. 52, to at least one of its ligand (in particular its target), particularly expressed by secondary necrotic cells and/or tumor cells, and more particularly enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 6 and a light variable domain comprising or consisting of SEQ ID No. 7, in particular comprising or consisting of a heavy domain comprising or consisting of SEQ ID No. 6 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33.

In particular, an antibody or an antigen-binding fragment thereof or a mimetic thereof of the invention specifically binds to the extracellular domain of human C-type lectin-like receptor-1 member A receptor (CLEC-1A receptor) and/or to a Fc-CLEC-1A protein comprising or consisting of the amino acid sequence set forth in SEQ ID No. 52, and further competes with an antibody comprising or consisting of a heavy variable domain comprising or consisting of SEQ ID No. 8 and a light variable domain comprising or consisting of SEQ ID No. 9, in particular comprising or consisting of a heavy domain comprising or consisting of SEQ ID No. 8 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 9 and SEQ ID No. 33, for binding to a human CLEC-1A receptor, and is an antagonist of human CLEC-1A, and antagonizes the binding of human CLEC-1A, particularly the binding of the extra-cellular domain of human CLEC-1A or the binding of Fc-CLEC-1A protein comprising or consisting of the amino acid sequence set forth in SEQ ID No. 52, to at least one of its ligand (in particular its target), particularly expressed by secondary necrotic cells and/or tumor cells, and more particularly enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 8 and a light variable domain comprising or consisting of SEQ ID No. 9, in particular comprising or consisting of a heavy domain comprising or consisting of SEQ ID No. 8 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 9 and SEQ ID No. 33.

In a more particular embodiment of the invention, said antibody or an antigen-binding fragment thereof or a mimetic thereof is also able to enhance the phagocytosis of cancer cells and/or secondary necrotic cells by myeloid cells, in particular by dendritic cells and/or macrophages, as compared to a negative control, in particular by at least 10%, more particularly by at least 20% as compared to the negative control. Particularly, said antibody or antigen-binding fragment thereof or a mimetic thereof correlates when used in vivo and/or in vitro with a modulation, in particular an increase, of the phagocytosis of tumor cells and/or secondary necrotic cells by myeloid cells, in particular by dendritic cells and/or macrophages, as compared to a negative control, in particular the phagocytosis of tumor cells and/or secondary necrotic cells is increased by at least 10%, more particularly by at least 20% as compared to the negative control.

Cross-competing antibodies (or compounds) and antibodies (or compounds) that recognize the CLEC-1A receptor can be identified using routine techniques such as an immunoassay, for example, by showing the ability of one antibody to block the binding of another antibody to a target antigen, e.g., a competitive binding assay. Competitive binding may be determined using an assay such as described in the examples of the present invention. In particular, competitive binding may be determined using the method illustrated in example 7, wherein antibodies interaction and competition on His-CLEC1 is studied by ELISA. Cross-competition is present if the tested anti-CLEC-1A compound reduces binding of the other antibody by at least by 50%, at least by 60%, specifically at least by 70% and more specifically at least by 80% and vice versa in comparison to the positive control which lacks one of said antibodies (or compounds).

The invention also concerns genetic constructs encoding at least a portion of the specific anti-CLEC-1A antibodies and antigen-binding fragments thereof and mimetics thereof described therein.

To this end, the invention also relates to nucleic acid molecule(s) or combination(s) of nucleic acid molecules encoding an antibody or an antigen-binding fragment thereof or a mimetic thereof according to any one of the definitions disclosed herein. In other words, the nucleic acid molecule(s) encode(s) at least the 6 CDR domains of an antibody or antigen-binding fragment thereof or a mimetic thereof.

The invention may also relate to a combination of a first nucleic acid molecule and a second nucleic acid molecule, wherein a first nucleic acid molecule encodes at least a variable heavy chain domain of an antibody, and wherein a second nucleic acid molecule encodes at least a variable light chain domain of an antibody. The combination of a first and a second nucleic acid molecule encode(s) at least the 6 CDR domains of the antibody or antigen-binding fragment thereof or mimetic thereof according to any embodiment disclosed herein.

In a particular embodiment of the invention, it is provided nucleic acid molecule(s) or combination(s) of nucleic acid molecules encoding an antibody or an antigen-binding fragment thereof or a mimetic thereof according to any one of the definitions disclosed herein, said nucleic acid molecule(s) or combination(s) of nucleic acid molecules comprising or consisting of:
  (a) A nucleotide acid sequence of SEQ ID No. 54, SEQ ID No. 55, SEQ ID No. 61, SEQ ID No. 62, SEQ ID No. 68 or SEQ ID No. 69 encoding the CDR1 of the light chain variable domain; and/or
  (b) A nucleotide acid sequence of SEQ ID No. 56, SEQ ID No. 57, SEQ ID No. 63, SEQ ID No. 64, SEQ ID No. 70 or SEQ ID No. 71 encoding the CDR2 of the light chain variable domain; and/or
  (c) A nucleotide acid sequence of SEQ ID No. 58, SEQ ID No. 59, SEQ ID No. 65, SEQ ID No. 66, SEQ ID No. 72 or SEQ ID No. 73 encoding the CDR3 of the light chain variable domain; and/or
  (d) A nucleotide acid sequence of SEQ ID No. 75, SEQ ID No. 76, SEQ ID No. 82, SEQ ID No. 83, SEQ ID No. 89 or SEQ ID No. 90 encoding the CDR1 of the heavy chain variable domain; and/or
  (e) A nucleotide acid sequence of SEQ ID No. 76, SEQ ID No. 77, SEQ ID No. 84, SEQ ID No. 85, SEQ ID No. 91 or SEQ ID No. 92 encoding the CDR2 of the heavy chain variable domain; and/or
  (f) A nucleotide acid sequence of SEQ ID No. 78, SEQ ID No. 79, SEQ ID No. 86, SEQ ID No. 87, SEQ ID No. 93 or SEQ ID No. 94 encoding the CDR3 of the heavy chain variable domain.

In a particular embodiment of the invention, it is provided nucleic acid molecule(s) or combination(s) of nucleic acid molecules encoding an antibody or an antigen-binding fragment thereof or a mimetic thereof according to any one of the definitions disclosed herein, said nucleic acid molecule(s) or combination(s) of nucleic acid molecules comprising or consisting of:
  a) A nucleotide acid sequence of SEQ ID No. 53, SEQ ID No. 60 or SEQ ID No. 67 encoding a variable domain of a light chain; and/or
  b) A nucleotide acid sequence of SEQ ID No. 74, SEQ ID No. 81, SEQ ID No. 88 or SEQ ID No. 95 encoding a variable domain of a heavy chain.

In a particular embodiment of the invention, the nucleic acid molecule(s) or combination(s) of nucleic acid molecules encoding an antibody or an antigen-binding fragment thereof or a mimetic thereof of the invention further encodes the constant domain of a light chain, and in particular comprises the nucleotide sequence of SEQ ID No. 96, and/or the constant domain of a heavy chain, and in particular comprises the nucleotide sequence of SEQ ID No. 98 or of SEQ ID No. 99.

Any nucleic acid molecules according to the invention may be inserted within an expression vector, like a plasmid for example, suitable for expression of the encoded sequence within a host cell.

Combinations of Compounds.

The invention also concerns combination of compounds comprising a humanized antibody or an antigen-binding fragment thereof as a first therapeutic agent and at least one second therapeutic agent.

The first therapeutic agent is a humanized anti-CLEC-1A antibody or antigen-binding fragment thereof or mimetic thereof according to any embodiment disclosed herein. The at least one second therapeutic agent is selected from the list consisting of a chemotherapeutic agent, a radiotherapy agent, an immunotherapeutic agent, in particular a tumor-targeting antibody including anti-hCD20-hIgG1, anti-hEGFR-hIgG1, anti-hHER2-hIgG1 or antigen-binding fragment thereof, in particular a tumor-targeting monoclonal antibody or antigen-binding fragment thereof, more particularly a tumor-targeting monoclonal antibody or antigen-binding fragment thereof or mimetic thereof which activates and/or enhances the phagocytosis capability of macrophages, and still more particularly a monoclonal antibody selected from the group consisting of alemtuzumab, atezolizumab, bevacizumab, anti-hEGFR-hIgG1 monoclonal tumor-targeting antibody such as cetuximab, herceptin, panitumumab, anti-hCD20-hIgG1 monoclonal tumor-targeting antibody such as rituximab, anti-hHER2-hIgG1 monoclonal tumor-targeting trastuzumab, an anti-PDL-1 antibody, and an anti-CD47 antibody, or another antibody or monoclonal antibody selected from the group consisting of an anti-PD1 antibody an anti-CTLA4 antibody, an agonist anti-CD137 antibody, an anti-CD28 antibody, an anti-CD127 antibody, an anti-bc12 antibody and an anti-SIRPa antibody; and/or a chemotherapeutic agent and/or a cell therapy agent (such as CAR-T cells) and/or a radiotherapy agent, in particular a cytotoxic agent with anti-proliferative, pro-apoptotic, cell cycle arresting and/or differentiation inducing effect, more particularly a cytotoxic agent selected from the group consisting of cytotoxic antibody, alkylating drugs, anthracyclines, antimetabolites, anti-microtubule agents, topoisomerase inhibitors, alkaloids, bleomycin, antineoplastic drugs, cyclophosphamide.

Particularly said immunotherapeutic agent is selected from the group consisting of an anti-CD3 agent, in particular anti-CD3 antibody, an anti-PD1 agent (particularly an anti-PD1 antibody), in particular an antagonist of PD1, more particularly an antagonist anti-PD1 antibody, an anti-PDL1 agent (particularly an anti-PDL1 antibody), in particular an antagonist of PDL1, more particularly an antagonist anti-PDL1 antibody, an anti-CTLA4 agent (particularly an anti-CTLA4 antibody), in particular an antagonist of CTLA4, more particularly an antagonist anti-CTLA4 antibody, an agonist of CD137, in particular an agonist anti-CD137 antibody, an anti-CLEC-1 agent (particularly an anti-CLEC-1 antibody), an anti-VEGF agent, in particular an anti-VEGF antibody, anti-CD19 agent, in particular an anti-CD19 antibody, and anti-CD47 agent (particularly an anti-CD47 antibody), in particular an antagonist of CD47, more particularly an anti-CD47 antagonist antibody, an anti-SIRPa agent (particularly an anti-SIRPa antibody), in particular an antagonist of anti-SIRPa, more particularly an anti-SIRPa antagonist antibody, an anti-CD28 agent (particularly an anti-CD28 antibody), in particular an antagonist of anti-CD28, more particularly an anti-CD28 antagonist antibody an anti-Bcl-2 agent (in particular venetoclax also referenced as ABT199 or GDC-0199), an inhibitor of the tyrosine/kinase pathway such as venetoclax.

In a particular embodiment, the first therapeutic agent is a humanized anti-CLEC-1A antibody or an antigen-binding fragment thereof or mimetic thereof according to any embodiment disclosed herein, and the at least one second therapeutic agent is cetuximab.

In a particular embodiment, the first therapeutic agent is a humanized anti-CLEC-1A antibody or an antigen-binding fragment thereof or mimetic thereof according to any embodiment disclosed herein, and the at least one second therapeutic agent is rituximab.

In a particular embodiment, the first therapeutic agent is a humanized anti-CLEC-1A antibody or an antigen-binding fragment thereof or mimetic thereof according to any embodiment disclosed herein, and the at least one second therapeutic agent is trastuzumab.

A tumor-targeting antibody may be defined as a of therapeutic monoclonal antibody that recognizes tumor-specific membrane proteins, block cell signalling, and induce tumor killing through Fc-driven innate immune responses.

In a particular embodiment of the invention, the first therapeutic agent is an antibody defined by its CDR domains as disclosed herein, or an antigen-binding fragment thereof or a mimetic thereof, and the second therapeutic agent is Rituximab, trastuzumab cetuximab, or another antibody or monoclonal antibody selected from the group consisting of an anti-PD1 antibody, an anti-PDL-1 antibody, an anti-CD47 antibody, and an anti-SIRPa antibody.

In a particular embodiment, the anti-CLEC-1A antibody or antigen-binding fragment thereof or mimetic thereof is:

an antibody or an antigen-binding fragment thereof or a mimetic thereof, which specifically binds to the extracellular domain of human C-type lectin-like receptor-1 member A receptor (CLEC-1A receptor) and which competes with an antibody comprising or consisting of a heavy variable domain comprising or consisting of SEQ ID No. 3 and a light variable domain comprising or consisting of SEQ ID No. 4, in particular comprising or consisting of a heavy domain comprising or consisting of SEQ ID No. 3 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 4 and SEQ ID No. 33, for binding to a human CLEC-1A receptor, and which is an antagonist of human CLEC-1, and more particularly which enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 3 and a light variable domain comprising or consisting of SEQ ID No. 4, in particular comprising or consisting of a heavy domain comprising or consisting of SEQ ID No. 3 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 4 and SEQ ID No. 33; or an antibody or an antigen-binding fragment thereof or a mimetic thereof, which specifically binds to the extracellular domain of human C-type lectin-like receptor-1 member A receptor (CLEC-1A receptor) and which competes with an antibody comprising or consisting of a heavy variable domain comprising or consisting of SEQ ID No. 5 and a light variable domain comprising or consisting of SEQ ID No. 7, in particular comprising or consisting of a heavy domain comprising or consisting of SEQ ID No. 5 and SEQ ID No. 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33, for binding to a human CLEC-1A receptor, and which is an antagonist of human CLEC-1; and more particularly which enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 5 and a light variable domain comprising or consisting of SEQ ID No. 7, in particular comprising or consisting of a heavy domain comprising or consisting of SEQ ID No. 5 and SEQ ID No . . . 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33. or an antibody or an antigen-binding fragment thereof or a mimetic thereof, which specifically binds to the extracellular domain of human C-type lectin-like receptor-1 member A receptor (CLEC-1A receptor) and which competes with an antibody comprising or consisting of a heavy variable domain comprising or consisting of SEQ ID No. 6 and a light variable domain comprising or consisting of SEQ ID No. 7, in particular comprising or consisting of a heavy domain comprising or consisting of SEQ ID No. 6 and SEQ ID No . . . 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33, for binding to a human CLEC-1A receptor, and which is an antagonist of human CLEC-1; and more particularly which enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 7 and a light variable domain comprising or consisting of SEQ ID No. 7, in particular comprising or consisting of a heavy domain comprising or consisting of SEQ ID No. 6 and SEQ ID No . . . 28, SEQ ID No. 29, SEQ ID No. 30, SEQ ID No. 97, SEQ ID, No. 100 or SEQ ID No. 101 and a light domain comprising or consisting of SEQ ID No. 7 and SEQ ID No. 33. or an antibody or an antigen-binding fragment thereof or a mimetic thereof, which specifically binds to the extracellular domain of human C-type lectin-like receptor-1 member A receptor (CLEC-1A receptor) and which competes with an antibody comprising or consisting of a heavy variable domain comprising or consisting of SEQ ID No. 8 and a light variable domain comprising or consisting of SEQ ID No. 9, in particular comprising or consisting of a heavy domain comprising or consisting of SEQ ID No. 8 and SEQ ID No . . . 28, SEQ ID No. 29, SEQ ID No. 30, SEQ ID No. 97, SEQ ID, No. 100 or SEQ ID No. 101 and a light domain comprising or consisting of SEQ ID No. 9 and SEQ ID No. 33, for binding to a human CLEC-1A receptor, and which is an antagonist of human CLEC-1; and more particularly enhances the phagocytosis of tumor cells and/or secondary necrotic cells by myeloid cells, in particular by dendritic cells and/or macrophages, as compared to a negative control, more particularly as compared to the antibody comprising or consisting of a heavy variable domain comprising or consisting of SEQ ID No. 8 and a light variable domain comprising or consisting of SEQ ID No. 9, in particular comprising or consisting of a heavy domain comprising or consisting of SEQ ID No. 8 and SEQ ID No . . . 28, SEQ ID No. 29, SEQ ID No. 30, SEQ ID No. 97, SEQ ID, No. 100 or SEQ ID No. 101 and a light domain comprising or consisting of SEQ ID No. 9 and SEQ ID No. 33. and the second therapeutic agent being selected from the list defined here above or here below.

The term "chemotherapeutic agent" includes chemical compounds that are effective in inhibiting tumor growth. Chemotherapeutic agent may be a conventional cytotoxic agent, i.e. a compound that induces irreversible lethal lesions through interference with DNA replication, mitosis, etc. following exposure. These agents may have anti-proliferative, pro-apoptotic, cell cycle arresting, and differentiation inducing effects. These agents are preferentially selected from the group consisting of alkylating drugs (cisplatin, chlorambucil, procarbazine, carmustine), anthracyclines and other cytotoxic antibiotics, antimetabolites (i.e. methotrexate, cytarabine, gemcitabine), anti-microtubule agents (i.e. vinblastine, paclitaxel, docetaxel), topoisomerase inhibitors (i.e. etoposide, doxorubicin), alkaloids (i.e. Vincristine, Vinblastine, Vinorelbine, Camptothecin) or bleomycin (inhibiting incorporation of thymidine into DNA strands).

The inventors shown that the use in combination of an antagonist of CLEC-1A, and in particular a humanized antagonist antibody of CLEC-1A, in combination with another therapeutic agent, in particular rituximab, enhances the phagocytosis capability of macrophages, in particular M1 macrophages, and anti-CLEC-1A antagonist compounds are therefore suitable for enhancing the therapeutic effect of a simultaneously, separately, or sequentially administered second therapeutic agent.

In a particular embodiment, the therapeutic agents may be administered simultaneously, separately, or sequentially in the treatment of a disease.

The invention also concerns a pharmaceutical composition comprising as a first therapeutic agent an anti-CLEC-1A humanized antibody or antigen-binding fragment thereof or a mimetic thereof or a nucleic acid molecule or a combination of nucleic acid molecules, according to any embodiment disclosed herein, either alone or in combination with a second therapeutic agent, as disclosed herein, with a pharmaceutical suitable vehicle, which are pharmaceutically acceptable for a formulation capable of being administered to a patient in need thereof. These may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions.

The invention also concerns a pharmaceutical composition comprising a first therapeutic agent as defined herein, in particular a humanized anti-CLEC-1A antagonist antibody or antigen-binding fragment thereof or mimetic thereof according to any embodiment disclosed herein, either alone or in combination with a second therapeutic agent, and/or with a pharmaceutical suitable vehicle as defined here in, for use in a combination therapy with another treatment including the use of a medicament comprising a chemotherapeutic agent, a radiotherapy agent, an immunotherapeutic agent (such as a tumor-targeting monoclonal antibody), a cell therapy agents (such as CAR-T cells), an immunosuppressive agent, a pro-apoptotic agent, an antibiotic, a targeted cancer therapy, and/or a probiotic, in particular for simultaneous, separated, or sequential administration to a patient in need thereof. Radiotherapy may comprise radiation or associated administration of radiopharmaceuticals to a patient. The source of radiation may be either external or internal to the patient being treated (radiation treatment may, for example, be in the form of external beam radiation therapy (EBRT) or brachytherapy (BT)). Targeted cancer therapies are drugs or other substances that block the growth and spread of cancer by interfering with specific molecules ("molecular targets") that are involved in the growth, progression, and spread of cancer. Targeted cancer therapies are sometimes called "molecularly targeted drugs," "molecularly targeted therapies," "precision medicines," or similar names. In some embodiments, the targeted therapy consists of administering the subject with a tyrosine kinase inhibitor. The term "tyrosine kinase inhibitor" refers to any of a variety of therapeutic agents or drugs that act as selective or non-selective inhibitors of receptor and/or non-receptor tyrosine kinases. Tyrosine kinase inhibitors and related compounds are well known in the art and described in U.S Patent Publication 2007/0254295, which is incorporated by reference herein in its entirety.

The invention also concerns a method of treating cancer in a human subject in need thereof comprising administering to the subject a therapeutically effective amount of a first therapeutic agent as defined herein, in particular a humanized anti-CLEC-1A antagonist antibody or antigen-binding fragment thereof or mimetic thereof according to any embodiment disclosed herein; wherein said first therapeutic agent is used in combination with a conventional treatment, in particular a conventional treatment of cancer. The invention also relates to a humanized anti-CLEC-1A antagonist antibody or antigen-binding fragment thereof or mimetic thereof according to any embodiment disclosed herein for use in the treatment of cancer in combination with a conventional treatment of cancer.

As used herein, the term "standard or conventional treatment" refers to any treatment of cancer (drug, radiotherapy, etc) usually administrated to a subject who suffers from cancer.

In particular, the humanized anti-CLEC-1A antagonist antibody or antigen-binding fragment thereof or mimetic thereof is used in combination with a chemotherapeutic agent, a radiotherapy agent, an immunotherapeutic agent (such as a tumor-targeting monoclonal antibody), a cell therapy agent (such as CAR-T cells), an immunosuppressive agent, a pro-apoptotic agent, an antibiotic, a targeted cancer therapy, and/or a probiotic.

The present invention also concerns the use of the anti-CLEC1A antibodies and antigen-binding fragments and mimetics thereof disclosed herein, for use in the treatment of a cancer. The terms "cancer" has its general meaning in the art and refers to a group of diseases involving abnormal cell growth with the potential to invade or spread to other parts of the body. The term "cancer" further encompasses both primary and metastatic cancers. Examples of cancers that may treated by methods and compositions of the invention include, but are not limited to, cancer from the bladder, blood, bone, bone marrow, brain, breast, colon, oesophagus, gastrointestinal, gum, head, kidney, liver, lung, nasopharynx, neck, ovary, prostate, skin, stomach, testis, tongue, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; non encapsulating sclerosing carcinoma; adrenal cortical carcinoma; endometroid carcinoma; skin appendage carcinoma; apocrine adenocarcinoma; sebaceous adenocarcinoma; ceruminous; adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; Paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; and roblastoma, malignant; Sertoli cell carcinoma; leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; malign melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brennertumor, malignant; phyllodestumor, malignant; synovial sarcoma; mesothelioma, malignant; dysgerminoma; embryonal carcinoma; teratoma, malignant; strumaovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblasticodontosarcoma; ameloblastoma, malignant; ameloblasticfibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin's disease; Hodgkin's lymphoma; paragranuloma; malignant lymphoma, small lymphocytic; malignant lymphoma, large cell, diffuse; malignant lymphoma, follicular; mycosis fungoides; other specified non-Hodgkin's lymphomas; malignant histiocytosis; multiple myeloma; mast cell sarcoma; immunoproliferative small intestinal disease; leukaemia; lymphoid leukaemia; plasma cell leukaemia; erythroleukemia; lymphosarcoma cell leukaemia; myeloid leukaemia; basophilic leukaemia; eosinophilic leukaemia; monocyticleukaemia; mast cell leukaemia; megakaryoblasticleukaemia; myeloid sarcoma; and hairy cell leukaemia.

In some embodiments, the subject suffers from a cancer selected from the group consisting of bile duct cancer, bladder cancer, bone cancer, brain and central nervous system cancer, breast cancer, Castleman disease cervical cancer, colorectal cancer, endometrial cancer, oesophagus cancer, gallbladder cancer, gastrointestinal carcinoid tumors, Hodgkin's disease, non-Hodgkin's lymphoma, Kaposi's sarcoma, kidney cancer, laryngeal and hypopharyngeal cancer, liver cancer, lung cancer, mesothelioma, plasmacytoma, nasal cavity and paranasal sinus cancer, nasopharyngeal cancer, neuroblastoma, oral cavity and oropharyngeal cancer, ovarian cancer, pancreatic cancer, penile cancer, pituitary cancer, prostate cancer, retinoblastoma, rhabdomyosarcoma, salivary gland cancer, skin cancer, stomach cancer, testicular cancer, thymus cancer, thyroid cancer, vaginal cancer, vulvar cancer, and uterine cancer.

The present invention also concerns the use of the anti-CLEC1A antibodies and antigen-binding fragments and mimetics thereof disclosed herein, for use in the treatment, including the preventive treatment, of a deleterious condition or a disease, in particular wherein the phagocytosis capability of myeloid cells, in particular of dendritic cells and/or macrophages, is involved. In a particular embodiment, the disease or condition is selected from the group consisting of cancer, in particular a cancer as listed here above, more particularly liquid cancers, solid cancers, lymphoma, colorectal cancers, mesothelioma or hepatocarcinoma.

The present invention also concerns the use of the anti-CLEC1A antibodies and antigen-binding fragment and mimetics thereof disclosed herein, for use in the treatment, including the preventive treatment, of a deleterious condition or a disease, in particular wherein the stimulation of the phagocytosis capability of dendritic cells may improve or treat the condition or the disease. In a particular embodiment, the disease or condition is selected from the group consisting of cancer, in particular a cancer as listed here above, more particularly liquid cancers, solid cancers, lymphoma, colorectal cancers, mesothelioma or hepatocarcinoma.

The present invention also concerns the use of the anti-CLEC1A antibodies and antigen-binding fragment and mimetics thereof disclosed herein, for use in the treatment, including the preventive treatment, of any disease or condition susceptible of being improved or prevented by increasing the phagocytosis capability of myeloid cells, in particular of dendritic cells and/or macrophages. In particular, the disease or condition is selected from the group consisting of cancer, in particular a cancer as listed here above, more particularly liquid cancers, solid cancers, lymphoma, colorectal cancers, mesothelioma or hepatocarcinoma.

The present invention also concerns the use of the anti-CLEC1A antibodies and antigen-binding fragment and mimetics thereof disclosed herein, for use in the treatment, including the preventive treatment, of a deleterious condition or a disease, in particular wherein T cells are involved, and wherein the proliferation of T cells is involved. In a particular embodiment, the disease or condition is selected from the group consisting of cancer, in particular a cancer as listed here above, more particularly liquid cancers, solid cancers, lymphoma, colorectal cancers, mesothelioma or hepatocarcinoma.

The present invention also concerns a method of increasing the phagocytosis capability of myeloid cells, in particular of dendritic cells and/or macrophages, comprising the administration in a patient in need thereof of an effective amount of an anti-CLEC1A antibody or antigen-binding fragment thereof or mimetic thereof according to any embodiment disclosed herein; in particular antibody or antigen-binding fragment thereof or mimetic thereof is administered simultaneously, separately or sequentially with a conventional treatment or with at least one second therapeutic agent as defined herein.

The present invention also concerns the antibody or antigen-binding fragment thereof or mimetic thereof according to the invention, and/or a nucleic acid molecule or a combination of nucleic acid molecules according to the invention, and/or the combination of compounds and/or the pharmaceutical composition according to the invention, for use as a medicament.

The present invention also concerns the use of a humanized anti-CLEC1A antibody or antigen-binding fragment thereof or mimetic thereof according to any embodiment disclosed herein and/or a nucleic acid molecule or a combination of nucleic acid molecules according to the invention, and/or the combination of compounds and/or the pharmaceutical composition according to the invention for the manufacture of a medicament. In particular, the present invention concerns the use of such an anti-CLEC-1A antibody or antigen-binding fragment thereof or mimetic thereof and/or a nucleic acid molecule or a combination of nucleic acid molecules according to the invention, and/or the combination of compounds and/or the pharmaceutical composition according to the invention for use in the manufacture of a medicament for treating and/or preventing cancer, in particular a cancer as listed here above, more particularly liquid cancers and solid cancers even more particularly lymphoma, colorectal cancers, mesothelioma or hepatocarcinoma.

The present invention also concerns a method for treating or preventing a disease by administering to a patient in need thereof a therapeutic amount of a humanized anti-CLEC1A antibody or antigen-binding fragment thereof or mimetic thereof according to any definition disclosed herein and/or a nucleic acid molecule or a combination of nucleic acid molecules according to the invention, and/or the combination of compounds and/or the pharmaceutical composition according to the invention. In particular, the present invention concerns a method for treating or preventing a cancer, in particular a cancer as listed here above, more particularly liquid cancers and solid cancers even more particularly lymphoma, colorectal cancers, mesothelioma or hepatocarcinoma.

The invention also concerns uses of the compounds, compositions, and combinations of compounds as defined herein, in particular uses for preventing or treating a disease or a disorder. Accordingly, it is provided a humanized antibody or antigen-binding fragment thereof or mimetic thereof according to the disclosure of the invention, or the nucleic acid molecule or a combination of nucleic acid molecules according to the invention, or a combination of compounds according the invention, for use in the prevention and/or the treatment of a disease or a disorder, in particular a human disease or a human disorder, in which the increase of the phagocytosis capability by myeloid cells, in particular dendritic cells and/or macrophages, improves or prevents the disease or disorder.

It is also provided a humanized anti-CLEC1A antibody or antigen-binding fragment thereof or mimetic thereof of the invention, or the nucleic acid molecule or a combination of nucleic acid molecules according to the invention, or a combination of compounds according to the invention, for use in a treatment of a disease or a condition wherein induction of phagocytosis in a patient improves or prevents the disease or condition.

It is also provided a humanized anti-CLEC1A antibody or antigen-binding fragment thereof or mimetic thereof of the invention, or the nucleic acid molecule or a combination of nucleic acid molecules according to the invention, or a combination of compounds according to the invention, for the treatment of a patient having a cancer, in particular a liquid or a solid cancer, more particularly a lymphoma, a colorectal cancer, a mesothelioma or a hepatocarcinoma, an inflammatory disease, a chronic infection or sepsis It is also provided a humanized antibody or antigen-binding fragment thereof or mimetic thereof of the invention, or the nucleic acid molecule or a combination of nucleic acid molecules according to the invention, or a combination of compounds according to the invention, for use in a combination therapy, wherein a first medicament comprising a chemotherapeutic agent, a radiotherapy agent, an immunotherapeutic agent (such as a tumor-targeting monoclonal antibody), a cell therapy agents (such as CAR-T cells), an immunosuppressive agent, a pro-apoptotic agent, an antibiotic, a targeted cancer therapy, and/or a probiotic, in particular for simultaneous, separated, or sequential administration, is administered to a patient in need

TABLE 1

Sequences of the specific CDR domain of the heavy and light variable domains of antibodies according to the invention (according to the Kabat system)

| CDRs | Sequences | SEQ ID No |
|---|---|---|
| 11H11 VHCDR1 | NFGMN | 10 |
| 11H11 VHCDR2 | WINTNTGEPTYADDFKG | 11 |
| 11H11 VHCDR3 | GAPAWFTY | 12 |
| 11H11 VLCDR1 | RASESIYSYLA | 13 |
| 11H11 VLCDR2 | NAKTLAS | 14 |
| 11H11 VLCDR3 | QHHFGTPLT | 15 |
| 14H9 VHCDR1 | TYGIH | 16 |
| 14H9 VHCDR2 | VIWSDASTIYASSLKS | 17 |
| 14H9 VHCDR3 | HGGYYNYFDY | 18 |
| 14H9 VLCDR1 | HASQNINVWLS | 19 |
| 14H9 VLCDR2 | KASNLHT | 20 |
| 14H9 VLCDR3 | QQGQSYWT | 21 |
| 6C5 VHCDR1 | DYVIS | 22 |
| 6C5 VHCDR2 | EIYPGSGNTYYNQKFQG | 23 |
| 6C5 VHCDR3 | GGSSHFDY | 24 |
| 6C5 VLCDR1 | RASQSVDNHGFSFMN | 25 |
| 6C5 VLCDR2 | AASNRGT | 26 |
| 6C5 VLCDR3 | QQSKEVPWT | 27 |

Any combination of VHCDR1, VHCDR2, VHCDR3, VLCDR1, VLCDR2 and VLCDR3 is contemplated in the present invention.

TABLE 2

Sequences of heavy chain variable domains of antibodies according to the invention

| Variable heavy chains | Sequences | SEQ ID No: |
|---|---|---|
| 11H11 | QIQLVQSGSELKKPGASVKVSCKASGYTFTNFGMNWVRQAPGQGLEWMGWINTNTGEPTYADDFKGRFVFSLDTSVSTAYLQISSLKAEDTATYFCARGAPAWFTYWGQGTTVTVSS | 3 |
| 14H9 | QVQLVESGGGVVQPGRSLRLSCAISGFTLTTYGIHWVRQAPGKGLEWVAVIWSDASTIYASSLKSRFTISKDNTKNTVYLQMTSLRAEDTAVYYCARHGGYYNYFDYWGQGTLVTVSS | 5 |
| 6C5 | QVQLVQSGAEVKKPGSSVKMSCKASGYTFTDYVISWVRQAPGQGLEWMGEIYPGSGNTYYNQKFQGRVTLTADKSTSTAYMELSSLRSEDTAVYYCAGGGSSHFDYWGQGTTVTVSS | 8 |

The variable heavy chains listed herein correspond to the one present in antibodies 11H11, 14H9 and 6C5 used in the working examples of the invention.

TABLE 3

Sequences of light chain variable domains of antibodies according to the invention

| Variable light chains | Sequences | SEQ ID No: |
|---|---|---|
| 11H11 | DIQMTQSPSSLSASVGDRVTITCRASESIYSYLAWYQQKPGKAPKFLIYNAKTLASGVPSRFSGSGSGTDFTLTISSLQPEDFATYYCQHHFGTPLTFGQGTKLEIK | 4 |

TABLE 3-continued

Sequences of light chain variable domains of antibodies according to the invention

| Variable light chains | Sequences | SEQ ID No: |
|---|---|---|
| 14H9 | DIQMTQSPSSLSASVGDRVTITCHASQNINVWLSWYQQKPGKA PKLLLYKASNLHTGVPSRFSGSGSGTDFTLTISSLQPEDIATYYC QQGQSYWTFGGGTKVEIK | 7 |
| 6C5 | EIVLTQSPATLSLSPGERATLSCRASQSVDNHGFSFMNWFQQKP GQAPRLLIYAASNRGTGIPARFSGSGSGTDFTLTISSMEPEDFAV YYCQQSKEVPWTFGGGTKVEIK | 9 |

The variable light chains listed herein correspond to the one present in antibodies 11H11, 14H9 and 6C5 used in the working examples of the invention.

Any combination of one heavy chain variable domain selected among table 2 with one light chain variable domain selected among table 3 is contemplated in the present invention.

The following Figures and Examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

BRIEF DESCRIPTION OF THE FIGURES

FIG. 1 illustrates a phagocytosis assay of tumor cells (non-Hodgkin's lymphoma cells (Raji cells) (A); colon carninoma cells (DLD-1) (B); breast cancer cells (SK-BR3) (C); non-Hodgkin's lymphoma cell (Raji cells) (D); and lung cancer cells (NSCLC) (E), in presence of humanized antibodies according to the present invention (11H11, 14H9 and 6C5) in A, B and C as compared with an anti-CLEC-1A antibody of the prior art (αCLEC-1 Ctrl mAb-D and E) which corresponds to the anti-CLEC-1A antibody disclosed in WO2018073440A1 and Robles et al. (Blood advances, 2017). Isotype control is a humanized irrelevant antibody. Ratio of phagocytosis was determined by normalizing the frequency of Clec-1 blocked TGFb-DC that have phagocytosed tumor cells over the PBS or control antibody according the isotype of the used mAb.

FIG. 2 illustrates a phagocytosis assay of tumor cells (non-Hodgkin's lymphoma cells (Raji cells) (A); colon carninoma cells (DLD-1) (B); breast cancer cells (SK-BR3) (C); and non-Hodgkin's lymphoma cell (Raji cells) (D); in presence of a combination of humanized antibodies according to the present invention (11H11, 14H9 and 6C5) and rituximab (A); cetuximab (B), and trastuzumab (C) at 1 ng/ml as compared with an anti-CLEC-1A antibody of the prior art (αCLEC-1 Ctrl mA which corresponds to the anti-CLEC-1A antibody disclosed in WO2018073440A1 and Robles et al. (Blood advances, 2017)) in combination with rituximab at 1 ng/ml in D. Isotype control is a humanized irrelevant antibody. Ratio of phagocytosis was determined by normalizing the frequency of Clec-1 blocked TGFb-DC that have phagocytosed tumor cells over the PBS or control antibody controls according the isotype of the used mAb.

FIG. 3 illustrates the effect of anti-CLEC1 antibodies of the invention on a Hepatocarcinoma mice model (HCC model). Anti-tumor effect of anti-CLEC1 antibodies (Humanized 6C5 or Humanized 14H9, 3 mg/kg) i.p. administration twice a week for 3 weeks in an orthotropic model of murine hepatoma ($2.5.10^6$ of Hepa 1.6 cells injected through the portal vein on day 0). Isotype control antibody was used in the control group (3 mg/kg).

FIG. 9 illustrates an antagonist activity study of humanized and chimeric anti-CLEC1 antibodies (6C5 antibodies (A) and 1H11 antibodies (B) on MC38 cell line. Table (C) illustrates the EC50 of each humanized and chimeric antibody. The curves (in A to C) represent the percentage of Fc-CLEC-1 positive live cells normalized to the isotype control antibody condition according the concentration of anti-CLEC-1 chimeric (empty circles) or humanized (solid circles) mAbs. EC50 refers to the concentration required to reach 50% of the maximal signal in this assay for each humanized and chimeric anti-CLEC1A antibodies.

FIG. 10 illustrates the productivity of humanized anti-CLEC-1A antibodies of the invention 6C5, 14H9 and 11H11 in HEK cells (A) and CHO cells (B). Table (C) illustrates the yield of recovered antibodies as compared to control anti-CLEC-1A antibody production on last line.

FIG. 14 illustrates the binding study of different humanized CLEC1 antibodies of the invention and mutated versions thereof.

MATERIAL AND METHODS

Figure 4:
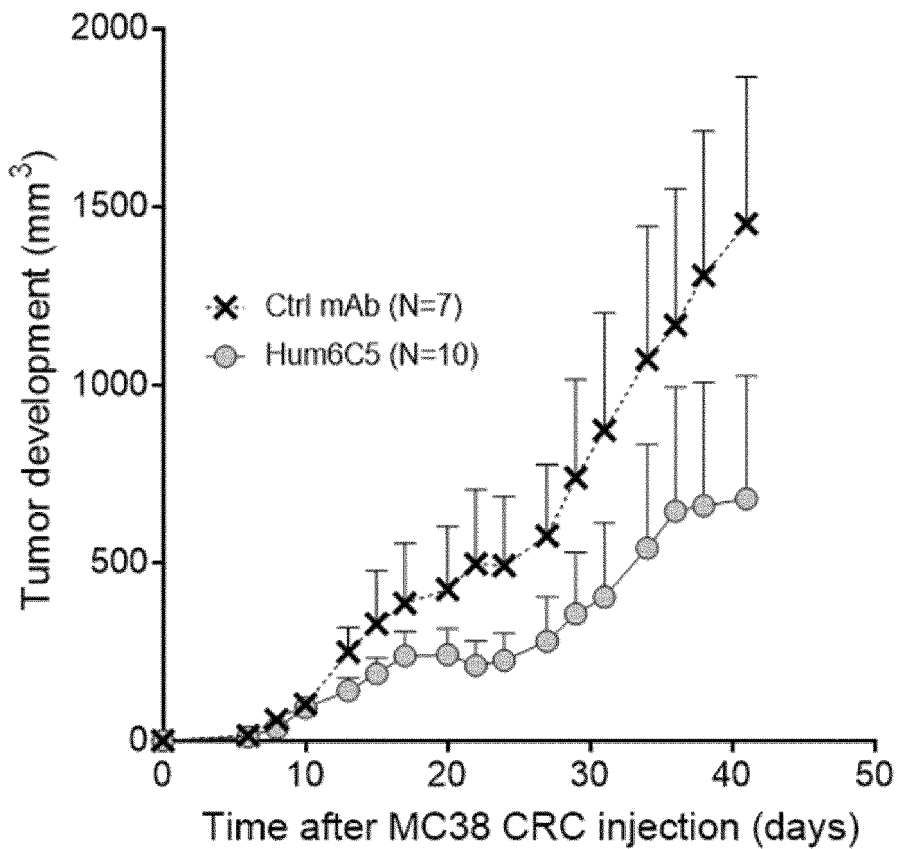
FIG. 4 illustrates the effect of anti-CLEC1 antibody of the invention on a colorectal carcinoma mice model (CRC model). Anti-tumor effect of anti-CLEC1 antibody (Humanized 6C5 3 mg/kg) i.p. administration twice a week for 3 weeks with a combination with chemotherapy (cyclophosphamide 100 mg/kg once when tumor reached 50-100 mm3 in a syngeneic model of murine colorectal carcinoma ($0.5.10^6$ of MC38 cells subcutaneously injected on day 0). Isotype control antibody was used in the control group (3 mg/kg).
Figure 5:
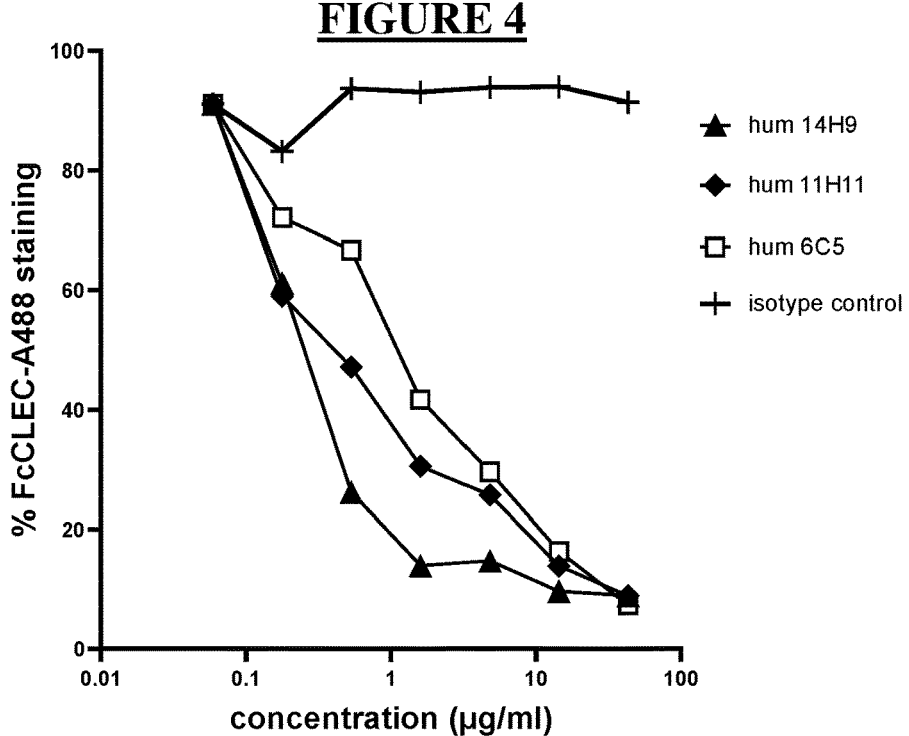
FIG. 5 illustrates an antagonist activity study of humanized anti-CLEC1 antibodies on Fc-CLEC1-permeabilised Raji interaction by FACS: The different anti-CLEC1 antibodies were tested over a dose response: 6C5, 14H9 and 1H11 (humanized anti-CLEC-1A antibodies of the invention) and isotype control as a negative control. The curve represents the percentage of binding of Fc-CLEC1-A488 at 10 nM on Raji cells after competition with anti-CLEC1 antibodies. Assessment by cytometry on permeabilised Raji with A488-labelled FcCLEC at fixed concentration (10 nM) and humanized 14H9 (▲), humanized 11H11 (|) humanized 6C5 (□) and isotype control (+). Revelation was performed on CYTOFLEX cytometer, values corresponding to percentage of stained cells (%).
Figure 6:
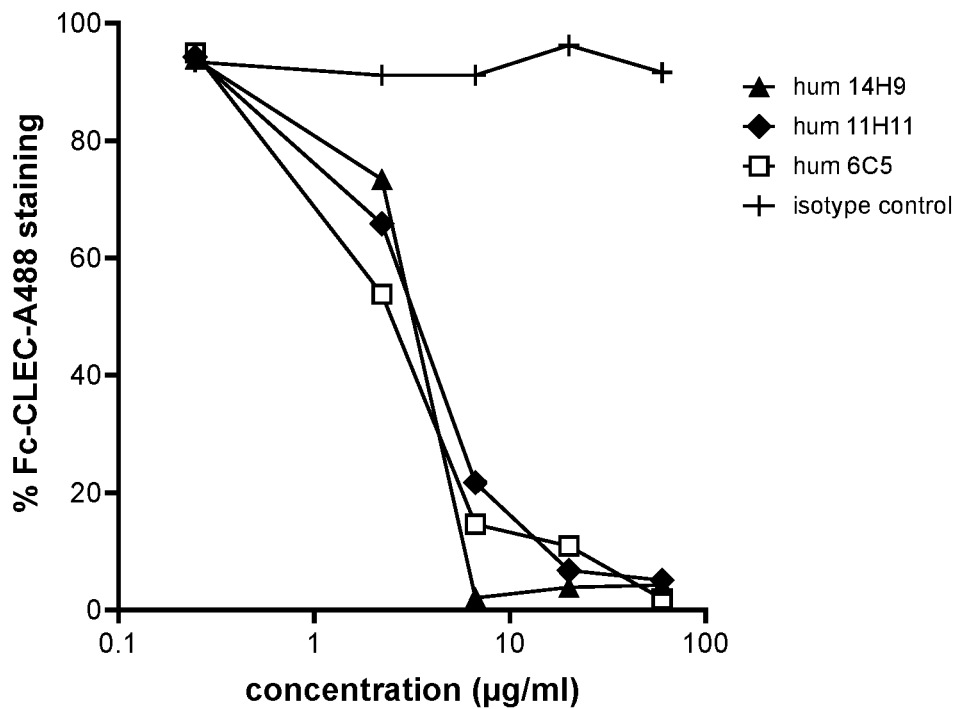
FIG. 6 illustrates an antagonist activity study of anti-CLEC1 antibodies (including humanized anti-CLEC-1A antibodies of the invention 14H9, 11H11 and 6C5) on Fc-CLEC1-permeabilized NALM6 cell line. The curve illustrates the percentage of binding of Fc-CLEC1-A488 at 10 nM on PBMC after competition with anti-hCLEC1 antibodies. Assessment by cytometry on permeabilised NALM6 with A488-labelled FcCLEC at fixed concentration (100 nM) and humanized 14H9 (▲), humanized 11H11 (♦), humanized 6C5 (□) and isotype control (+). Revelation was performed on CYTOFLEX cytometer, values corresponding to percentage of stained cells (%).
Figure 7:
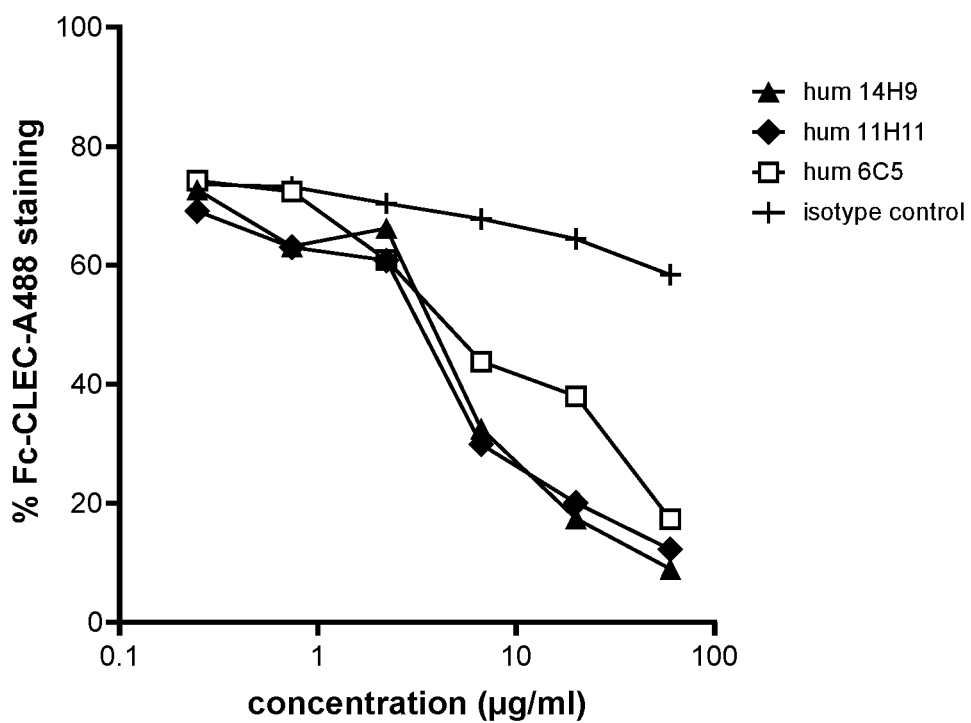
FIG. 7 illustrates an antagonist activity study of anti-CLEC1 antibodies (including humanized anti-CLEC-1A antibodies of the invention 14H9, 11H11 and 6C5) on Fc-CLEC1-native non-permeabilized NALM6 cell line. The curve illustrates the percentage of binding of Fc-CLEC1-A488 at 100 nM on NALM6 after competition with anti-hCLEC1 antibodies. Assessment by cytometry on non-permeabilized NALM6 with A488-labelled FcCLEC at fixed concentration (100 nM) and humanized 14H9 (▲), humanized 11H11 (♦), humanized 6C5 (□) and isotype control (+). Revelation was performed on CYTOFLEX cytometer, values corresponding to percentage of stained cells (%).
Figure 8:
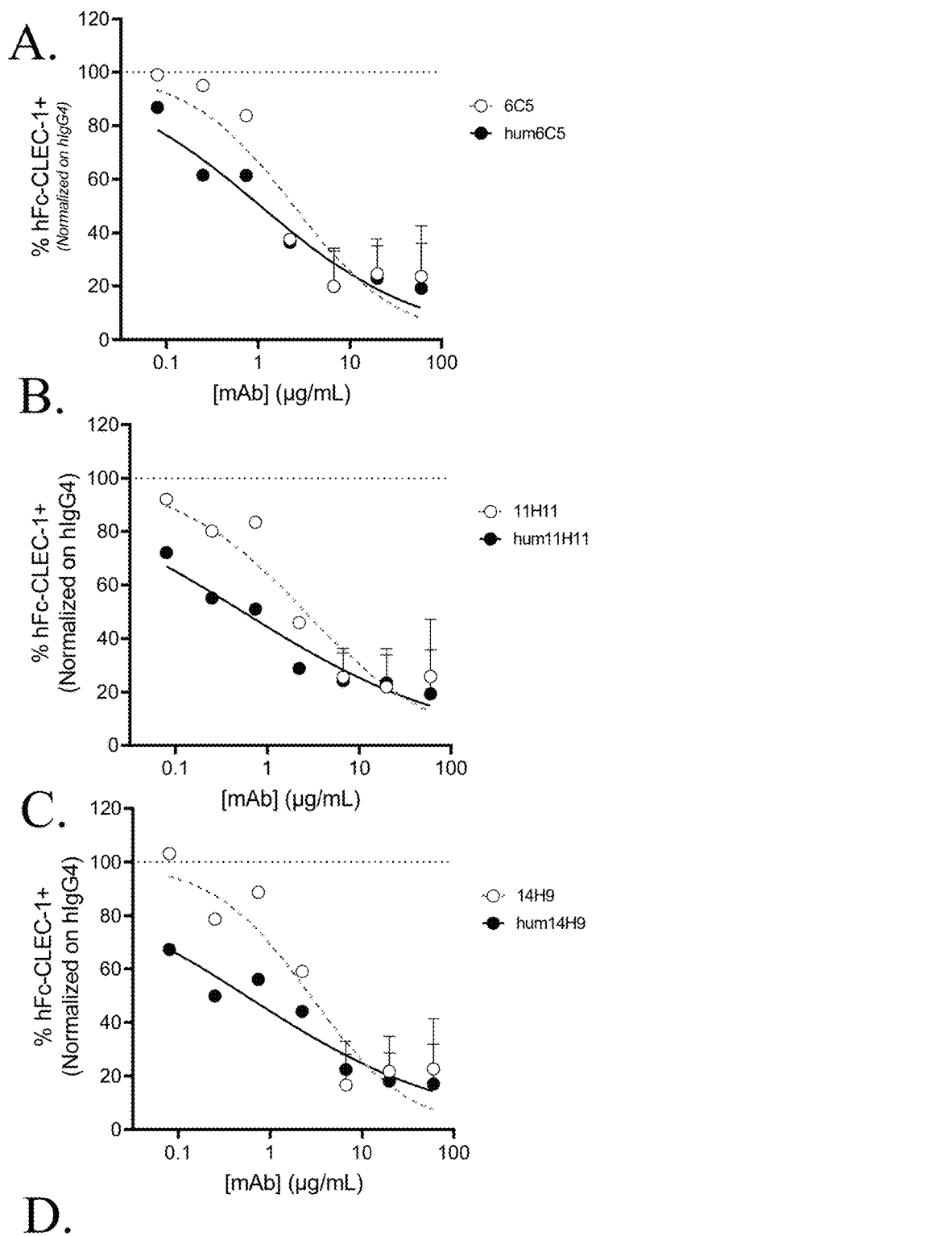
FIG. 8 illustrates an antagonist activity study of humanized and chimeric anti-CLEC1 antibodies (6C5 antibodies (A); 1H11 antibodies (B) and 14H9 antibodies (C) on Hepa1.6 cell line. Table (D) illustrates the EC50 of each humanized and chimeric antibody. The curves (in A to C) represent the percentage of Fc-CLEC-1 positive live cells normalized to the isotype control antibody condition according the concentration of anti-CLEC-1 chimeric (empty circles) or humanized (solid circles) mAbs. EC50 refers to the concentration required to reach 50% of the maximal signal in this assay for each humanized and chimeric anti-CLEC1A antibodies.

Preparation and Characterisation of Humanized Anti-Clec Antibodies

For humanized anti-clec, variable sequence of heavy chain (VH) of anti-clec antibodies cloned was by EcoRV in pcDNA3.4 human G4m expression plasmid (OSE IMMUNOTHERAPEUTICS plasmid) containing CH1-hinge-CH2-CH3 domains of hIgG4, mutated at S228P to stabilize hinge region. Variable sequence of light chain (VL) of anti-clec antibody was cloned by BsiWI in pcDNA3.4 CLIg-hkappa expression plasmid (OSE IMMUNOTHERAPEUTICS plasmid) containing human CLkappa.

In HEK freestyle cells or CHO mammalian cells, we have co-transfected same plasmid containing VH-hFcG4m and VL-CLhk by lipofectamine or polyethylenimine method. After 6-7 days incubation, supernatant was recovered and purified by affinity on Protein A chromatography (HITRAP, GEHEALTHCARE) with citric acid 0.1M pH 3 elution buffer. Purified antibody was dialyzed in PBS, 100 mM Arginine/L-Glutamic acid and concentrated. They were quantified by UV at 280 nm and tested in several test: activity assay against Clec-his in ELISA and in BLITZ (FORTEBIO), activity assay against U266 cells (Clec is present on the surface of cells), antagonist assay with permeabilized cells lines.

Preparation and Characterisation of Variants of Humanized Anti-CLEC1 Antibodies

Variants of humanized anti-CLEC1 antibodies (11H11m, 6C5 ml, 6C5m2 and 14H9m) were generated by PCR with primers containing substitution nucleotide with Q5® Site-Directed Mutagenesis Kit (NEBIOLABS) and transformed in Top10 chimiocompetent cells before plasmid purification. In CHO mammalian cells, same plasmid containing VH-hFcG4m and VL-CLhk were co-transfected by polyethylenimine method. After 6-7 days incubation, supernatant was recovered and quantified by sandwich ELISA assay and CLEC1 binding assay.

Elisa Quantification Assays by Sandwich Method

For quantification ELISA assay, donkey anti-human IgG, Fc specific, antibody (JACKSON IMMUNORESEARCH #709-005-098) was immobilized on plastic at 1.3 µg/ml and supernatants containing antibodies or purified antibodies were added to measure binding. After incubation and washing, mouse anti-human kappa antibody (OSE IMMUNOTHERAPEUTICS; reference NaM76-5F3) followed by peroxidase-labeled donkey anti-mouse IgG (JACKSON IMMUNORESEARCH reference 715-036-151) was added and revealed by conventional methods.

Elisa Activity Assay Human Anti-CLEC-1A with CLEC1-His Coated

For activity ELISA assay, recombinant hCLEC-His (R et D systems; reference 1704-CL) was immobilized on plastic at 2 µg/ml and supernatants containing antibodies or purified antibodies were added to measure binding. After incubation and washing, peroxidase-labeled donkey anti-human IgG (JACKSON IMMUNORESEARCH reference 709-035-149) was added and revealed by conventional methods.

Elisa Activity Assay Human Anti-CLEC-1A with Fc-CLEC1 Coated

For activity ELISA assay, recombinant hFc-CLEC (OSE IMMUNOTHERAPEUTICS; Nantes) was immobilized on plastic at 2 µg/ml and supernatants containing antibodies or purified antibodies were added to measure binding. After incubation and washing, mouse anti-human kappa antibody (OSE IMMUNOTHERAPEUTICS; reference NaM76-5F3) followed by peroxidase-labeled donkey anti-mouse IgG (JACKSON IMMUNORESEARCH reference 715-036-151) was added and revealed by conventional methods.

Anti-Clec Binding Assay on U266 Cells by Cytofluorometry

To measure binding of anti-clec on U266 cells CLEC1+, human Fc Receptor Binding Inhibitor diluted at 1/50 (BD PHARMINGEN; USA; reference 564220) was first added for 30 min at room-temperature to block human Fc receptors on U266 cells to reduce background. Then, antibodies were incubated for 30 min at 4° C., and washed before stained 15 min at 4° C. with PE-labelled anti-human IgG Fc (BIOLE-GEND; USA; reference 409303). Samples were analyzed on CYTOFLEX (BECKMAN COULTER)

Affinity Analysis by BLITZ of Anti-Clec Antibodies on Human CLEC-His Recombinant Protein.

Clec-His recombinant protein (R et D systems; reference 1704-CL) was immobilized onto a NINTA biosensor at 10 µg/ml and the indicated antibodies were added at 20 µg/ml. Values were deduced after an association period (ka) of 120 sec followed by a dissociation period of 120 sec (kd) to determine affinity constant (KD).

Antagonist Activity by Flow Cytometry

For competitive assay, Fc-Clec-1 (OSE IMMUNOTHERAPEUTICS, Nantes, France) were coupled with Alexa Fluor® 488 (Alexa Fluor® 488 Microscale Protein Labeling Kit #A30006, FISHER SCIENTIFIC, Illkirch, France).

Permeabilized (reference 554714 CYTOFIX/CYTOPERM kit, BD BIOSCIENCES, France) and Fc-blocked (reference 564220, BD Biosciences) Burkitt lymphoma Raji cells express a Clec-1 ligand, which can be detected after incubation with Alexa®488-labelled-Fc-Clec at 10 nM. To measure competition, purified anti-Clec antibodies at different concentrations were pre-incubated with Alexa®488-labelled-Fc-Clec (fixed 10 nM) for 15 min at room temperature. Pre-incubated mixes were then incubated on permeabilized and Fc-blocked Raji cells for 30 min on ice. Binding on cells were then fixed by PFA 2% in cold PBS for 10 min on ice and analyzed on CYTOFLEX cytofluorometer (BECKMAN COULTER France, Villepinte).

Competition were also measured on NALM6 cells, which can also express the ligand in intracellular or extracellular surface. Purified anti-Clec antibodies at different concentrations were pre-incubated with Alexa®488-labelled-Fc-Clec at 100 nM for 15 min at room temperature. Pre-incubated mixes were then incubated on Fc-blocked NALM6 cells, pre-permeabilized or not, for 30 min on ice. Binding on cells were then fixed by PFA 2% in cold PBS for 10 min on ice and analyzed on CYTOFLEX-cytofluorometer (BECKMAN COULTER France, Villepinte).

Phagocytosis Assay

Monocytes were isolated by magnetic sorting from cytapheresis of healthy volunteers using Classical Monocytes Isolation kit provided by M1LTENY1. Then, monocytes were cultured for 6-7 days with 50 ng/ml of human recombinant GM-CSF (CELLGENIX) and 20 ng/ml of human recombinant IL-4 (CELLGENIX) in order to generate immature dendritic cells (iDC). iDCs were polarized into immunotolerant DCs with 50 ng/ml of human recombinant TGFb (PEPROTECH) for 2 days, which leads to overexpression of Clec-1 by these TGFb-DCs. Antibodies were added during the polarization at 10 µg/mL. TGFβ-DC were cultured with the non-Hodgkin's lymphoma (Raji) at a 1:1 ratio with the anti-CD20 mAb (Rituximab) at 10 ng/mL providing the "Eat-me" signal: the bare NSCLC cells (A549) were cultured for 5 hours with TGFβ-DC. Phagocytosis was analyzed by flow cytometry and normalized over the control antibody condition for each donor.

Macrophages (MΦ) were generated from monocytes with M-CSF (100 ng/ml) for 5 days. MΦ were cultured with either the non-Hodgkin's lymphoma (Raji: CD20+) or the colon carcinoma (DLD-1; EGFR2+), or the breast cancer (SK-BR3; Her2+) at a 1:2 ratio +/−either the anti-CD20 mAb (Rituximab), the anti-EGFR mAb (Cetuximab), or the anti-Her2 mAb (Trastuzumab) respectively at 10 ng/ml providing the "Eat-me" signal, for 2 hours. Phagocytosis analysis was performed by flow cytometry and the percentage of phagocytosis was calculated by the percentage of CPDe670+ cells in total CPDe450+ cells. Results were expressed by multiplying the percentage of M1 that have phagocytosed Raji cells with the median intensity fluorescence of phagocytic cells and represented according the Rituximab concentration.

For the macroscopy assay, the macrophages were generated as described above, MΦ were preincubated with the anti-CLEC1 chimeric mAbs for 2 hours and then cultured with the non-Hodgkin's lymphoma (Raji: CD20+)+the anti-CD20 mAb (Rituximab) respectively at 10 ng/ml providing the "Eat-me" signal, for 4 hours. Phagocytosis analysis was performed by microscopy and the percentage of phagocytosis was calculated by the percentage of PHRODO (PHRODO-SE, THERMOFISHER) positive Raji in total Macrophages.

Tumor cell lines, Raji (B lymphoma) CSCLC cells, colorectal cancer cells and breast cancer cells Huh7 (Hepatocarcinoma), were stained with a fluorescent dye to characterize the cells in the phagocytosis assay. Briefly, tumor cells were incubated with the Cell Proliferation Dye EFLUOR 670 for 15 min and washed before UV treatment according the manufacturer's instructions (LIFE TECHNOLOGIES). Then, cells were treated with UV at 150 mJ/cm$^2$ and incubated overnight to trigger the apoptotic induced program which leads to Clec-1 ligand expression.

TGFb-DC and tumor cell lines were collected, numbered and incubated at two DC for one tumor cells ratio for 5 hours and antibody were added during this process at 10 µg/mL. Phagocytosis was evaluated by flow cytometry on CPD-EFLUOR670 positive TGFb-DC.

In the examples of the invention, except when specifically noted, the anti-CLEC-1A control antibody is an in-house antibody that has no antagonist properties.

Examples of the Invention

Example 1. Biological Activity of Humanized Anti-hCLEC1A Antagonistic Antibodies of the Invention and of the Anti-hCLEC1A Antagonistic Antibody Disclosed in the Prior Art on Dendritic Cell Tumoral Phagocytosis—FIG. 1

Methods.

A) Generation of Monocytes Derived Dendritic Cells (DC) Polarized with TGFb Recombinant Protein Monocytes were isolated by magnetic sorting from cytapheresis of healthy volunteers using Classical Monocytes Isolation kit provided by M1LTENY1. Then, monocytes were cultured for 6-7 days with 50 ng/ml of human recombinant GM-CSF (CELLGENIX) and 20 ng/ml of human recombinant IL-4 (CELLGENIX) in order to generate immature dendritic cells (iDC). iDCs were polarized into immunotolerant DCs with 50 ng/ml of human recombinant TGFb (PEPROTECH) for 2 days, which leads to overexpression of Clec-1 by these TGFb-DCs. Antibodies were added during the polarization at 10 µg/mL.

B) Generation of UV-Treated Apoptotic Tumor Cell Lines

Tumor cell lines corresponding to non-hodgkin's B lymphoma (Raji cells—FIG. 1A & FIG. 1D), colon carninoma (DLD-1 model—FIG. 1B), breast cancer (SK-BR3 cell line—FIG. 1C), and lung cancer (NSCLC cells—FIG. 1E, were stained with a fluorescent dye to characterize the cells in the phagocytosis assay. Briefly, tumor cells were incubated with the Cell Proliferation Dye EFLUOR 670 for 15 min and washed before UV treatment according the manufacturer's instructions (LIFE TECHNOLOGIES). Then, cells were treated with UV at 150 mJ/cm$^2$ and incubated overnight to trigger the apoptotic induced program which leads to Clec-1 ligand expression.

C) Phagocytosis Assay

TGFb-DC and tumor cell lines were collected, numbered and incubated at two DC for one tumor cells ratio for 5 hours and antibody were added during this process at 10 µg/mL. Phagocytosis was evaluated by flow cytometry on CPD-EFLUOR670 positive TGFb-DC. Humanized anti-Clec-1 mAbs were incubated with human macrophages (monocytes derived macrophages polarized with IFNγ) for 1 h at 37° C. after staining with an EFLUOR450 cell proliferation dye (LIFE TECHNOLOGIES).

Results. FIG. 1 illustrates the phagocytosis of UV treated tumor cells by TGFb-DC normalized over the control conditions. In three different models of cancers, lymphoma (FIG. 1A), carcinoma (FIG. 1B) and breast cancer (FIG. 1C) the antagonistic humanized 14H9, 6C5, and 11H11 antibodies of the invention increased the phagocytosis of tumor cells whereas control antibody of the prior art (disclosed in WO2018073440A1 and Robles et al. (Blood advances, 2017)) did not induce any significant change on the DC ability to phagocyte tumor cells in lymphoma (FIG. 1D) or in lung cancer (FIG. 1E). The phagocytosis of UV treated tumor cells by TGFb-DC normalized over the control conditions in all models of cancer is enhanced in presence of an antibody according to the invention as compared to the negative control.

This example demonstrates the capability of the humanized antibodies of the invention to increase the phagocytosis of tumor cells by dendritic cells, contrary to the antibody of the prior art (disclosed in WO2018073440A1 and Robles et al. (Blood advances, 2017)). It should be noted that the humanized anti-CLEC-1A antibodies 6C5 and 14H9 were IgG1 antibodies, with a constant chain domain corresponding to IgG1N297A, of SEQ ID No. 97 (hum 6C5-m, hum 14H9-m). Humanized 11h11 antibody was an IgG4 antibody (S228P) (hum 11H11). According to the illustrated results, the phagocytosis of tumor cells seems higher when the humanized antibody is either 6C5 or 14H9 the provision of IgG 1 humanized anti-CLEC-1A antibodies may be of interest as compared to the provision of their IgG4 equivalents.

Example 2. Biological Activity of a Combination of Anti-hCLEC-1A Antagonistic Antibody of the Invention or of the Anti-hCLEC1A Antagonistic Antibody of the Prior Art with a Tumor-Targeting Antibody: Rituximab, Cetuximab or Trastuzumab—FIG. 2

Methods.

Humanized anti-Clec-1 mAbs were incubated at 10 µg/mL with human macrophages (monocytes derived macrophages polarized with IFNγ) for 1 h at 37° C. after staining with an EFLUOR450 cell proliferation dye (LIFE TECHNOLOGIES).

Human Raji B lymphoma, DLD-1 colon carcinoma, SK-BR3 breast carcinoma cell lines were incubated with media or anti-tumor associated antigen (TAA) (Rituximab anti-CD20 on Raji, Cetuximab anti-EGFR on DLD-1, Trastuzumab anti-Her2 on SK-BR3) at 1 ng/ml for 1 h at 37° C. after staining with an EFLUOR 647 cell proliferation dye (LIFE TECHNOLOGIES). Phagocytosis assay was performed by incubating anti-CLEC-1-treated macrophages with +/−anti-TAA opsonized tumor cell lines for 1 h at 37° C. Phagocytosis analysis was performed by flow cytometry and the percentage of phagocytosis was calculated by the percentage of CPDe670+ cells in total CPDe450+ cells. Results were expressed by multiplying the percentage of M1 that have phagocytosed Raji cells with the median intensity fluorescence of phagocytic cells and represented according the Rituximab concentration.

Results: The phagocytosis assay shows that M1 macrophages are able to phagocyte Raji cells (FIG. 2A), in presence of a combination of Rituximab and an anti-CLEC-1A antibody of the invention, as compared to the antibody of the prior art (see FIG. 2D) disclosed in WO2018073440A1 and Robles et al. (Blood advances, 2017)). The same results are illustrated for two other cancer model; phagocytosis of colon carcinoma tumor cells by macrophages is increased when a combination of Cetuximab and an anti-CLEC-1A antibody of the invention is administered (FIG. 2B); and phagocytosis of breast cancer tumor cells by macrophages is increased when a combination of Trastuzumab and an anti-CLEC-1A antibody of the invention is administered (FIG. 2C). The combination of the anti-CLEC-1A antibodies of the invention with a second anti-tumor antibody enhances the phagocytosis capability of macrophages M1. It is therefore illustrated that using an anti-CLEC-1A antagonist antibody of the invention enhances the therapeutic effects of tumor targeting antibodies.

This example demonstrates the capability of the antibodies of the invention in combination with a tumor-targeting antibody to increase the phagocytosis of tumor cells by macrophages, contrary to the antibody of the prior art (disclosed in WO2018073440A1 and Robles et al. (Blood advances, 2017)).

Example 3. Anti-Tumor Effect on the Overall Survival of Mice Hepatocarcinoma Tumor Model—FIG. 3

Method.

Mice were anesthetized with a mix of air/isoflurane. After a laparotomy, tumoral Hepa 1.6 cells were injected in PBS through the portal vein ($2.5 \times 10^6$ cells/100 µL) in PBS. The treatment was started 4 days after tumor injection. The anti-CLEC1 antibodies and the isotype control were injected at 3 mg/kg twice a week for 3 weeks. The Overall survival was followed and the percentage of survival in each condition was reported FIG. 3.

Results: As shown in FIG. 3, animals treated with the humanized anti-CLEC1 antibodies of the invention had seen their survival rate prolonged for both anti-CLEC1 therapies (mice treated with a control antibody all died after 25 days, while mice treated with the anti-CLEC1 antibodies of the invention 6C5 or 14H9 survived at least twice longer). This result indicates an unexpected efficiency of the therapeutic monotherapy (humanized anti-CLEC1 antibodies of the invention) on HCC tumor model.

Example 4: Anti-Tumor Effect on the Tumor Development of Mice Colorectal Carcinoma Tumor Model Treated by Combination Therapy (Anti-CLEC1 Antibody and Chemotherapy)—FIG. 4

Method.

Mice were anesthetized with a mix of air/isoflurane. Tumoral MC38 cells were subcutaneously injected in PBS ($0.5 \times 10^6$ cells/100 µL) in PBS. The treatment was started 4 days after tumor injection. The anti-CLEC1 antibody of the invention 6C5 and the isotype control were injected at 3 mg/kg twice a week for 3 weeks. Chemotherapy was intraperitoneally administered at 100 mg/kg In PBS once when tumor reached 50-100 mm3. The tumor development was evaluated by measuring the length and the width of the tumor and the tumor development was established from the tumor measure baseline in each condition and is reported FIG. 4.

Results: As shown in FIG. 4, animals treated with the humanized anti-CLEC1 antibody of the invention and chemotherapy had seen better response rates compared to the chemotherapy alone. The combined measurements of the volume of the tumors in mice treated with the anti-CLEC1 antibody and chemotherapy did not raise as much as in mice only treated with chemotherapy after 40 days (600 mm3 vs. 1500 mm3). Further, 4 mices (out of 10) treated with the humanized anti-CLEC1 antibody of the invention 6C5 and chemotherapy survived after the experiment, while all mice treated only with chemotherapy died. This result indicates an unexpected efficiency of the therapeutic combination (humanized anti-CLEC1 antibody of the invention+chemotherapy) on CRC tumor model.

Example 5: Competitive Study Between CLEC1-Ligand and Humanized Anti-hCLEC1 Antibodies Using Antagonist Assays—FIGS. 5 to 9

Methods. To measure competition on permeabilised Raji (CYTOFIX/CYTOPERM kit. BD BIOSCIENCES) which expressed CLEC1 ligand, Fc-CLEC1-labelled A488 which bound specifically to permeabilised Raji was used. To measure competition, Fc-CLEC1 labelled A488 at 10 nM was mixed with humanized anti-hCLEC1 at different concentrations for 15 min at RT then added on these cells for 30 min at 4° C. After incubation and washing, PFA 2% was added to wells to fix cells for 10 min at 4° C. and analyzed on CYTOFLEX (BECKMAN) cytofluorometer to detect the inhibition of Fc-CLEC1-labelled. To measure competition on NALM6 cells. Fc-CLEC1 labelled A488 at 100 nM was mixed with humanized anti-hCLEC1 at different concentrations for 15 min at RT then added on these cells for 30 min at 4° C. After incubation and washing, PFA 2% was added to wells to fix cells for 10 min at 4° C. and analyzed on CYTOFLEX (BECKMAN) cytofluorometer to detect the inhibition of Fc-CLEC1-labelled.

Murine hepatoma Hepa 1.6 or colorectal carcinoma MC38 cell lines were also used in an antagonist assay. Chimeric or humanized anti-Clec-1 mAbs (6C5, 11H11, 14H9) were also incubated at different concentrations (from 60 µg/mL to 0.08 µg/mL) with the human Fc-CLEC-1 recombinant protein conjugated with the A488 fluorochrome at 10 µg/mL for 30 min on ice. Murine hepatoma Hepa 1.6 or colorectal carcinoma MC38 cell lines were stained first with a viability marker, then with the A488-fluorochrome conjugated recombinant human Fc-CLEC-1 protein preincubated with antagonistic anti-CLEC-1 mAbs for 30 min on ice. Finally, cells were fixed with 1% PFA solution and read on a cytometer.

Graphs depict the percentage of Fc-CLEC-1 positive live cells normalized to the hIgG4 control condition according the concentration of anti-CLEC-1 chimeric (empty circles) or humanized (solid circles) mAbs.

Results: FIGS. 5-9 illustrate the antagonistic activity of the humanized anti-hCLEC1 antibodies of the invention, compared to isotype control or in-house chimeric anti-CLEC1 control (control+anti-Clec1). Fc-CLEC1 respectively at 10 nM and 100 nM was able to bind specifically permeabilized Raji, permeabilized NALM6 cell and native NALM6 cells. The 3 tested antibodies are able to block interaction of Fc-CLEC to its ligands on permeabilized Raji permeabilized NALM6 cell and native NALM6 in dose-dependent manner, as compared to isotype control, which did not inhibit the binding of Fc-CLEC on these cells. Among the 3 antibodies, IC50 were similar for all, and inhibition profile curve were similar (see FIGS. 5 to 7).

In a complementary assay, the capability to antagonize human CLEC-1A was assessed to compare the results achieved with the humanized antibodies of the invention, as compared to their chimeric counterparts. As illustrated on FIGS. 8 and 9, all three humanized antibodies 11H11, 14H9 and 6C5 antagonizes the binding of Fc-CLEC1A to Murine hepatoma Hepa 1.6 or colorectal carcinoma MC38 cell lines (FIG. 8A-C and FIG. 9A-B). At the lowest concentration, the humanized antibodies are better antagonists than their counterpart chimeric antibodies. As illustrated in the tables (FIG. 8D and FIG. 9C), the EC50 of humanized antibodies is at maximum half the EC50 of their chimeric counterpart, and most of the time comprised between ⅕ and ⅓.

Accordingly, all the tested humanized antibodies of the invention are able to prevent the binding between CLEC-1A and cells usually binding to CLEC-1A, thereby illustrating that these antibodies are able to antagonize the binding between CLEC-1A and one of its ligands. Thus, this example illustrates that the antibodies of the invention are antagonists of human CLEC-1. Further, the humanized antibodies of the invention seem to be better antagonists of CLEC-1A than their chimeric counterparts, in particular at low concentrations.

Example 6: Production of Humanized Anti-CLEC1 Antibodies—FIG. 10

In mammalian HEK cells and in CHO cells, we have co-transfected, by lipofectamine method or by polyethylenimine (PEI), respectively, plasmids containing VH-hFcG4m or VH-hFcGIN297A with plasmid containing VL-CLkappa. After 5-6 days incubation, supernatant was purified by affinity on Protein A chromatography (HITRAP, GEHEALTHCARE) with citric acid 0.1M pH 3 elution buffer. Purified antibody was dialyzed in PBS, 100 mM Arginine/L-Glutamic acid and concentrated. They were quantified by UV (A280 nm) Yield corresponds to the quantity of purified antibody per liter of collected culture supernatant.

Antibodies of the invention were well expressed with different productivity as shown in FIGS. 10A and 10B (signal peptide used: IgKleader). As shown in table (FIG. 10C), humanized antibodies had high production yield in HEK cells and in CHO cells.

This example illustrates that the antibodies of the invention may be efficiently produced in recombinant production systems.

Example 7. CLEC1 Bindings Assay of Humanized Anti-hCLEC1 Antibodies by ELISA—FIGS. 11-14

Figure 11:
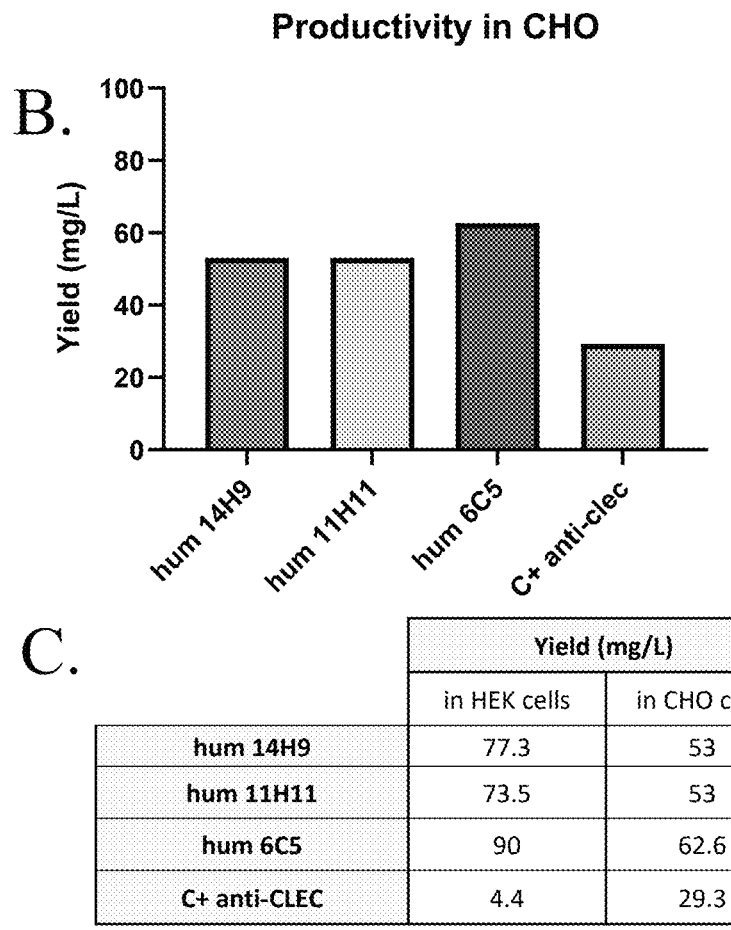
FIG. 11 illustrates the binding affinity (KD), the affinity constant (ka) and the dissociation constant (kd) of humanized antibodies of the invention for human CLEC-A-his recombinant protein measured by BLITZ.

Method: Affinity analysis has been performed by BLITZ of anti-CLEC1 antibodies on human CLEC1-His recombinant protein. CLEC1-His recombinant protein was immobilized onto a NINTA biosensor and the indicated antibodies were added at 20 µg/ml. Values were deduced after an association period (ka) of 120 sec followed by a dissociation period of 120 sec (kd) to determine affinity constant (KD) (FIG. 11).

Figure 12:
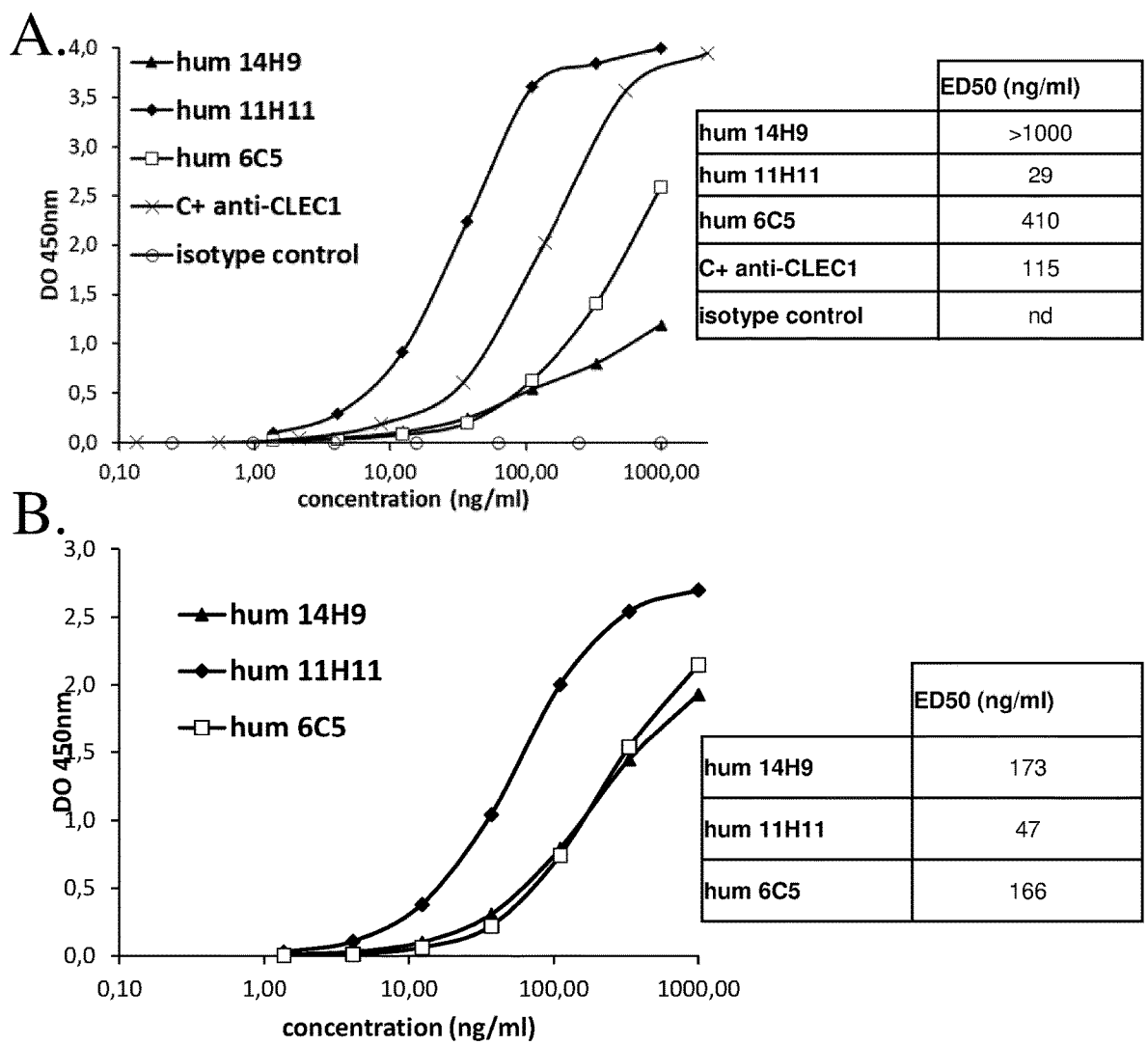
FIG. 12 illustrates a binding study of the different humanized anti-CLEC1 antibodies of the invention over a dose response on immobilized CLEC-1A-his recombinant protein (A) and on Fc-CLEC-1A (B) by ELISA.
Figure 13:
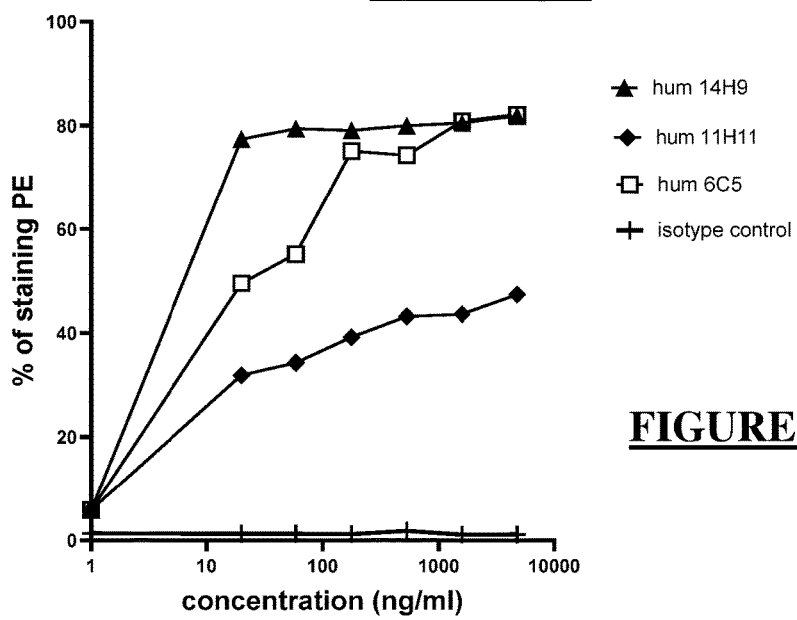
FIG. 13 illustrates a binding study of humanized CLEC1 antibodies of the invention on human U266 cell lines by Flow cytometry (FACS) by ELISA.

The binding activity of the anti-hCLEC1 antibodies was also assessed by ELISA (Enzyme-linked immunosorbent assay). For the ELISA assay, recombinant hCLEC1-His (R&D SYSTEMS reference 1704-CL) was immobilized on plastic at 2 µg/ml in carbonate buffer (pH9.2) and purified antibodies were added at different concentrations to measure binding. After incubation and washing, revelation was performed with a peroxidase labelled donkey anti-human antibody and revealed by colorimetry at 450 nm using TMB substrate (JACKSON IMMUNORESEARCH; reference 715-036-151) (FIG. 12A). A second ELISA assays was performed, like above, with immobilization of Fc-CLEC1 (OSE IMMUNOTHERAPEUTICS) at 2 µg/ml. Like above, ELISA was made with immobilization of mouse Fc-CLEC1 (OSE IMMUNOTHERAPEUTICS) at 2 µg/ml in carbonate buffer instead of His-Clec. Purified antibodies were added at different concentrations to measure binding. After incubation and washing, revelation was performed with a mouse anti-human kappa antibody plus peroxidase-labelled donkey anti-mouse antibody and revealed by colorimetry at 450 nm using TMB substrate. ED50 is the concentration of the indicated antibody to reach 50% of the signal in this assay. (FIG. 12B) Control antibody is an isotype control. A third binding study was assessed by cytofluorometry on human U266 cell lines CLEC1+ of humanized 14H9, humanized 11H1, humanized 6C5, and isotype control. Revelation was performed with a PE labeled mouse anti-human Fc mAb on CYTOFLEX cytometer, values corresponding to Mean Fluorescent Intensity (MFI) (FIG. 13).

Results: As shown in FIGS. 11-13, the binding activity of different humanized anti-CLEC1 antibodies of the invention on CLEC1-His as measured by ELISA showed a binding activity for all antibodies. All humanized anti-CLEC-1A antibodies of the invention elicit a specific binding activity to CLEC-His. Binding activity of chimeric anti-CLEC1 antibodies on CLEC1-His as measured by ELISA showed a binding activity for all antibodies with different EC50 (FIG. 12A). All humanized anti-CLEC-1A antibodies of the invention elicit a specific binding activity to Fc-CLEC-1A (FIG. 12B), with different ED50. Further, all humanized antibodies were able to bind to human U266 cells (FIG. 13).

This example demonstrates that the antibodies of the invention have a specific affinity for the human CLEC-1A.

To assess the binding capabilities of anti-CLEC1 antibodies having the same combinations of CDRs as the antibodies of the invention referenced 6C5, 11H11 and 14H9, mutated versions of these antibodies were provided and their binding capabilities to Fc-CLEC was assessed (FIG. 14A-D). 6C5, 11H11 and 14H9 antibodies of the invention were mutated in the framework regions of the variable region of the light chain or of the variable region of the heavy chain, or of the variable regions of the light and heavy chains. To this end, a mutated version of 14H9 (referenced 14H9m on FIG. 14A) was provided, which comprises the light chain of 14H9 of SEQ ID No. 7 and a mutated version of the heavy chain of SEQ ID No. 6 (two substitutions in the third framework region as compared to 14H9: T74S and V89I). A mutated version of 11H11 (referenced 11H11m on FIG. 14B) was provided which comprises the heavy chain of 11H11 of SEQ ID No. 3 and a mutated version of the variable light chain of 11H11 of SEQ ID No. 102 (a substitution in the second framework region as compared to 11H11: A43S). Two mutated versions of 6C5 (referenced 6C5 ml and 6C5 m2 on FIG. 14C-D) were provided. 6C5 ml comprises the light chain of 6C5 of SEQ ID No. 9 and a mutated version of the heavy chain of SEQ ID No. 103 (a substitution in the third framework region as compared to 6C5: M81I). 6C5m2 comprises the heavy chain of 6C5 of SEQ ID No. 8 and a mutated version of the light chain of SEQ ID No. 104 (two substitutions in the second framework region as compared to 16C5: A43P and R45K). The binding capabilities of these four mutants to Fc-CLEC1 were compared to the binding capabilities of their respective parent antibody. As illustrated in FIG. 14, the mutated antibodies have the same binding capabilities as their respective parent antibodies. Thus, mutation(s) within the framework region(s) may have no effect on the capabilities of the antibodies, with the proviso that the CDRs are not modified.

The invention claimed is:

1. An antibody or antigen-binding fragment thereof that specifically binds to the extracellular domain of human C-type lectin-like receptor-1 member A receptor (CLEC-1A receptor) and which comprises:
- an antibody heavy chain variable domain comprising VHCDR1 of SEQ ID NO: 10, VHCDR2 of SEQ ID NO: 11, VHCDR3 of SEQ ID NO: 12; and
- an antibody light chain variable domain comprising VLCDR1 of SEQ ID NO: 13, VLCDR2 of SEQ ID NO: 14, VLCDR3 of SEQ ID NO: 15; or
- an antibody heavy chain variable domain comprising VHCDR1 of SEQ ID NO: 16, VHCDR2 of SEQ ID NO: 17, VHCDR3 of SEQ ID NO: 18; and
- an antibody light chain variable domain comprising VLCDR1 of SEQ ID NO: 19, VLCDR2 of SEQ ID NO:20, VLCDR3 of SEQ ID NO:21; or
- an antibody heavy chain variable domain comprising VHCDR1 of SEQ ID NO: 22, VHCDR2 of SEQ ID NO:23, VHCDR3 of SEQ ID NO:24; and
- an antibody light chain variable domain comprising VLCDR1 of SEQ ID NO: 25, VLCDR2 of SEQ ID NO:26, VLCDR3 of SEQ ID NO:27.

2. The antibody or antigen-binding fragment thereof according to claim 1, which comprises:
- an antibody heavy chain variable domain comprising or consisting of the amino acid sequence set forth in SEQ ID NO:3; and an antibody light chain variable domain comprising or consisting of the amino acid sequence set forth in SEQ ID No. 4, or
- an antibody heavy chain variable domain comprising or consisting of the amino acid sequence set forth in SEQ ID NO:5; and an antibody light chain variable domain comprising or consisting of the amino acid sequence set forth in SEQ ID No. 7; or
- an antibody heavy chain variable domain comprising or consisting of the amino acid sequence set forth in SEQ ID NO:8; and an antibody light chain variable domain comprising or consisting of the amino acid sequence set forth in SEQ ID No. 9.

3. The antibody or antigen-binding fragment thereof according to claim 1, which antagonizes the binding of the extracellular domain of human CLEC-1A to secondary necrotic cells and/or tumor cells and/or to the intracellular content of secondary necrotic cells and/or to the intracellular content of tumor cells.

4. The antibody or antigen-binding fragment thereof according to claim 1, which antagonizes the binding of a fusion protein comprising the extracellular domain of human CLEC-1A receptor fused with a Fc fragment of a human immunoglobulin to secondary necrotic cells and/or tumor cells and/or to the intracellular content of secondary necrotic cells and/or to the intracellular content of tumor cells.

5. The antibody or antigen-binding fragment thereof according to claim 1, wherein the antibody is a recombinant antibody that comprises a human IgG1, IgG2, IgG3 or IgG4 constant region.

6. The antibody or antigen-binding fragment thereof according to claim 1, comprising an antibody heavy chain constant region that comprises or consists of the amino acid sequence set forth in SEQ ID NO: 28, SEQ ID NO:29 and SEQ ID NO:30, SEQ ID NO:97, SEQ ID NO: 100 or SEQ ID NO: 101.

7. The antibody or antigen-binding fragment thereof according to claim 1, comprising an antibody light chain constant region that is a kappa light chain constant region.

8. The antibody or antigen-binding fragment thereof according to claim 1, comprising an antibody light chain constant region that comprises or consists of the amino acid sequence set forth in SEQ ID NO: 33.

9. The antibody or antigen-binding fragment thereof according to claim 1, which binds to human CLEC-1A with an affinity constant (KD) of at least 1E-07 M.

10. The antibody or antigen-binding fragment thereof according to claim 1, which increases when used in vivo and/or in vitro the phagocytosis of tumor cells and/or secondary necrotic cells by dendritic cells and/or macrophages, as compared to a negative control, wherein the phagocytosis of tumor cells is increased by at least 10% as compared to the negative control.

11. A pharmaceutical composition comprising an antibody or antigen-binding fragment thereof according to claim 1 with a pharmaceutical suitable vehicle.

12. A combination of compounds comprising a first therapeutic agent and at least one second therapeutic agent, wherein:
i) the first therapeutic agent is an antibody or antigen-binding fragment thereof according to claim 1; and
ii) the at least one second therapeutic agent is selected from the group consisting of an immunotherapeutic agent, including a tumor-targeting antibody or antigen-binding fragment thereof, a chemotherapeutic agent, a cell therapy agent, a CAR-T cell, a radiotherapy agent, and a cytotoxic agent; for simultaneous, separate or sequential use of the first and the second therapeutic agents.

13. The combination of compounds according to claim 12, wherein the tumor-targeting antibody is a monoclonal antibody or antigen-binding fragment thereof.

14. The combination of compounds according to claim 12, wherein the tumor-targeting antibody is a tumor-targeting monoclonal antibody or antigen-binding fragment thereof which activates and/or enhances the phagocytosis capability of macrophages.

15. The combination of compounds according to claim 12, wherein the tumor-targeting antibody is a monoclonal antibody or antigen-binding fragment thereof is a monoclonal antibody selected from the group consisting of alemtuzumab, atezolizumab, bevacizumab, cetuximab, herceptin, panitumumab, rituximab, trastuzumab, an anti-PDL-1 antibody and an anti-CD47 antibody.

16. The combination of compounds according to claim 12, wherein the tumor-targeting antibody is selected from the group consisting of an anti-PD1 antibody, an anti-CTLA4 antibody, an agonist anti-CD137 antibody, an anti-CD28 antibody, an anti-CD127 antibody, an anti-bcl2 antibody and an anti-SIRPa antibody.

17. The combination of compounds according to claim 12, wherein the cytotoxic agent has an anti-proliferative, pro-apoptotic, cell cycle arresting and/or differentiation inducing effect.

18. The combination of compounds according to claim 12, wherein the cytotoxic agent is selected from the group consisting of cytotoxic antibody, alkylating drugs, anthracyclines, antimetabolites, anti-microtubule agents, topoisomerase inhibitors, alkaloids, bleomycin, antineoplastic drugs, and cyclophosphamide.

\* \* \* \* \*

SEQUENCE LISTING

```
<160> NUMBER OF SEQ ID NOS: 104

<210> SEQ ID NO 1
<211> LENGTH: 280
<212> TYPE: PRT
<213> ORGANISM: artificial sequence
<220> FEATURE:
<223> OTHER INFORMATION: Synthetic sequence

<400> SEQUENCE: 1

Met Gln Ala Lys Tyr Ser Ser Thr Arg Asp Met Leu Asp Asp Asp Gly
1               5                   10                  15

Asp Thr Thr Met Ser Leu His Ser Gln Gly Ser Ala Thr Thr Arg His
            20                  25                  30

Pro Glu Pro Arg Arg Thr Glu His Arg Ala Pro Ser Ser Thr Trp Arg
        35                  40                  45

Pro Val Ala Leu Thr Leu Leu Thr Leu Cys Leu Val Leu Leu Ile Gly
    50                  55                  60

Leu Ala Ala Leu Gly Leu Leu Phe Phe Gln Tyr Tyr Gln Leu Ser Asn
65                  70                  75                  80
```

```
Thr Gly Gln Asp Thr Ile Ser Gln Met Glu Glu Arg Leu Gly Asn Thr
                85                  90                  95

Ser Gln Glu Leu Gln Ser Leu Gln Val Gln Asn Ile Lys Leu Ala Gly
            100                 105                 110

Ser Leu Gln His Val Ala Glu Lys Leu Cys Arg Glu Leu Tyr Asn Lys
            115                 120                 125

Ala Gly Ala His Arg Cys Ser Pro Cys Thr Glu Gln Trp Lys Trp His
130                 135                 140

Gly Asp Asn Cys Tyr Gln Phe Tyr Lys Asp Ser Lys Ser Trp Glu Asp
145                 150                 155                 160

Cys Lys Tyr Phe Cys Leu Ser Glu Asn Ser Thr Met Leu Lys Ile Asn
                165                 170                 175

Lys Gln Glu Asp Leu Glu Phe Ala Ala Ser Gln Ser Tyr Ser Glu Phe
            180                 185                 190

Phe Tyr Ser Tyr Trp Thr Gly Leu Leu Arg Pro Asp Ser Gly Lys Ala
            195                 200                 205

Trp Leu Trp Met Asp Gly Thr Pro Phe Thr Ser Glu Leu Phe His Ile
            210                 215                 220

Ile Ile Asp Val Thr Ser Pro Arg Ser Arg Asp Cys Val Ala Ile Leu
225                 230                 235                 240

Asn Gly Met Ile Phe Ser Lys Asp Cys Lys Glu Leu Lys Arg Cys Val
                245                 250                 255

Cys Glu Arg Arg Ala Gly Met Val Lys Pro Glu Ser Leu His Val Pro
            260                 265                 270

Pro Glu Thr Leu Gly Glu Gly Asp
            275                 280

<210> SEQ ID NO 2
<211> LENGTH: 206
<212> TYPE: PRT
<213> ORGANISM: artificial sequence
<220> FEATURE:
<223> OTHER INFORMATION: Synthetic sequence

<400> SEQUENCE: 2

Tyr Tyr Gln Leu Ser Asn Thr Gly Gln Asp Thr Ile Ser Gln Met Glu
1               5                   10                  15

Glu Arg Leu Gly Asn Thr Ser Gln Glu Leu Gln Ser Leu Gln Val Gln
            20                  25                  30

Asn Ile Lys Leu Ala Gly Ser Leu Gln His Val Ala Glu Lys Leu Cys
            35                  40                  45

Arg Glu Leu Tyr Asn Lys Ala Gly Ala His Arg Cys Ser Pro Cys Thr
        50                  55                  60

Glu Gln Trp Lys Trp His Gly Asp Asn Cys Tyr Gln Phe Tyr Lys Asp
65                  70                  75                  80

Ser Lys Ser Trp Glu Asp Cys Lys Tyr Phe Cys Leu Ser Glu Asn Ser
                85                  90                  95

Thr Met Leu Lys Ile Asn Lys Gln Glu Asp Leu Glu Phe Ala Ala Ser
            100                 105                 110

Gln Ser Tyr Ser Glu Phe Phe Tyr Ser Tyr Trp Thr Gly Leu Leu Arg
        115                 120                 125

Pro Asp Ser Gly Lys Ala Trp Leu Trp Met Asp Gly Thr Pro Phe Thr
130                 135                 140

Ser Glu Leu Phe His Ile Ile Ile Asp Val Thr Ser Pro Arg Ser Arg
145                 150                 155                 160
```

-continued

```
Asp Cys Val Ala Ile Leu Asn Gly Met Ile Phe Ser Lys Asp Cys Lys
                165                 170                 175

Glu Leu Lys Arg Cys Val Cys Glu Arg Arg Ala Gly Met Val Lys Pro
        180                 185                 190

Glu Ser Leu His Val Pro Pro Glu Thr Leu Gly Glu Gly Asp
    195                 200                 205

<210> SEQ ID NO 3
<211> LENGTH: 117
<212> TYPE: PRT
<213> ORGANISM: artificial sequence
<220> FEATURE:
<223> OTHER INFORMATION: Synthetic sequence

<400> SEQUENCE: 3

Gln Ile Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asn Phe
            20                  25                  30

Gly Met Asn Trp Val Arg Gln Ala Pro Gly Gln Gly Leu Glu Trp Met
        35                  40                  45

Gly Trp Ile Asn Thr Asn Thr Gly Glu Pro Thr Tyr Ala Asp Asp Phe
    50                  55                  60

Lys Gly Arg Phe Val Phe Ser Leu Asp Thr Ser Val Ser Thr Ala Tyr
65                  70                  75                  80

Leu Gln Ile Ser Ser Leu Lys Ala Glu Asp Thr Ala Thr Tyr Phe Cys
                85                  90                  95

Ala Arg Gly Ala Pro Ala Trp Phe Thr Tyr Trp Gly Gln Gly Thr Thr
            100                 105                 110

Val Thr Val Ser Ser
        115

<210> SEQ ID NO 4
<211> LENGTH: 107
<212> TYPE: PRT
<213> ORGANISM: artificial sequence
<220> FEATURE:
<223> OTHER INFORMATION: Synthetic sequence

<400> SEQUENCE: 4

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Ser Ile Tyr Ser Tyr
            20                  25                  30

Leu Ala Trp Tyr Gln Gln Lys Pro Gly Lys Ala Pro Lys Phe Leu Ile
        35                  40                  45

Tyr Asn Ala Lys Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Phe Gly Thr Pro Leu
                85                  90                  95

Thr Phe Gly Gln Gly Thr Lys Leu Glu Ile Lys
            100                 105

<210> SEQ ID NO 5
<211> LENGTH: 118
<212> TYPE: PRT
<213> ORGANISM: artificial sequence
```

<220> FEATURE:
<223> OTHER INFORMATION: Synthetic sequence

<400> SEQUENCE: 5

Gln Val Gln Leu Val Glu Ser Gly Gly Gly Val Val Gln Pro Gly Arg
1               5                   10                  15

Ser Leu Arg Leu Ser Cys Ala Ile Ser Gly Phe Thr Leu Thr Thr Tyr
            20                  25                  30

Gly Ile His Trp Val Arg Gln Ala Pro Gly Lys Gly Leu Glu Trp Val
        35                  40                  45

Ala Val Ile Trp Ser Asp Ala Ser Thr Ile Tyr Ala Ser Ser Leu Lys
    50                  55                  60

Ser Arg Phe Thr Ile Ser Lys Asp Asn Thr Lys Asn Thr Val Tyr Leu
65                  70                  75                  80

Gln Met Thr Ser Leu Arg Ala Glu Asp Thr Ala Val Tyr Tyr Cys Ala
                85                  90                  95

Arg His Gly Gly Tyr Tyr Asn Tyr Phe Asp Tyr Trp Gly Gln Gly Thr
            100                 105                 110

Leu Val Thr Val Ser Ser
        115

<210> SEQ ID NO 6
<211> LENGTH: 118
<212> TYPE: PRT
<213> ORGANISM: artificial sequence
<220> FEATURE:
<223> OTHER INFORMATION: Synthetic sequence

<400> SEQUENCE: 6

Gln Val Gln Leu Val Glu Ser Gly Gly Gly Val Val Gln Pro Gly Arg
1               5                   10                  15

Ser Leu Arg Leu Ser Cys Ala Ile Ser Gly Phe Thr Leu Thr Thr Tyr
            20                  25                  30

Gly Ile His Trp Val Arg Gln Ala Pro Gly Lys Gly Leu Glu Trp Val
        35                  40                  45

Ala Val Ile Trp Ser Asp Ala Ser Thr Ile Tyr Ala Ser Ser Leu Lys
    50                  55                  60

Ser Arg Phe Thr Ile Ser Lys Asp Asn Ser Lys Asn Thr Val Tyr Leu
65                  70                  75                  80

Gln Met Thr Ser Leu Arg Ala Glu Asp Thr Ala Ile Tyr Tyr Cys Ala
                85                  90                  95

Arg His Gly Gly Tyr Tyr Asn Tyr Phe Asp Tyr Trp Gly Gln Gly Thr
            100                 105                 110

Leu Val Thr Val Ser Ser
        115

<210> SEQ ID NO 7
<211> LENGTH: 106
<212> TYPE: PRT
<213> ORGANISM: artificial sequence
<220> FEATURE:
<223> OTHER INFORMATION: Synthetic sequence

<400> SEQUENCE: 7

Asp Ile Gln Met Thr Gln Ser Pro Ser Ser Leu Ser Ala Ser Val Gly
1               5                   10                  15

Asp Arg Val Thr Ile Thr Cys His Ala Ser Gln Asn Ile Asn Val Trp
            20                  25                  30

```
Leu Ser Trp Tyr Gln Gln Lys Pro Gly Lys Ala Pro Lys Leu Leu Leu
            35                  40                  45

Tyr Lys Ala Ser Asn Leu His Thr Gly Val Pro Ser Arg Phe Ser Gly
 50                  55                  60

Ser Gly Ser Gly Thr Asp Phe Thr Leu Thr Ile Ser Ser Leu Gln Pro
 65                  70                  75                  80

Glu Asp Ile Ala Thr Tyr Tyr Cys Gln Gln Gly Gln Ser Tyr Trp Thr
                 85                  90                  95

Phe Gly Gly Gly Thr Lys Val Glu Ile Lys
                100                 105

<210> SEQ ID NO 8
<211> LENGTH: 117
<212> TYPE: PRT
<213> ORGANISM: artificial sequence
<220> FEATURE:
<223> OTHER INFORMATION: Synthetic sequence

<400> SEQUENCE: 8

Gln Val Gln Leu Val Gln Ser Gly Ala Glu Val Lys Lys Pro Gly Ser
 1               5                  10                  15

Ser Val Lys Met Ser Cys Lys Ala Ser Gly Tyr Thr Phe Thr Asp Tyr
                 20                  25                  30

Val Ile Ser Trp Val Arg Gln Ala Pro Gly Gln Gly Leu Glu Trp Met
             35                  40                  45

Gly Glu Ile Tyr Pro Gly Ser Gly Asn Thr Tyr Tyr Asn Gln Lys Phe
 50                  55                  60

Gln Gly Arg Val Thr Leu Thr Ala Asp Lys Ser Thr Ser Thr Ala Tyr
 65                  70                  75                  80

Met Glu Leu Ser Ser Leu Arg Ser Glu Asp Thr Ala Val Tyr Tyr Cys
                 85                  90                  95

Ala Gly Gly Gly Ser Ser His Phe Asp Tyr Trp Gly Gln Gly Thr Thr
            100                 105                 110

Val Thr Val Ser Ser
            115

<210> SEQ ID NO 9
<211> LENGTH: 111
<212> TYPE: PRT
<213> ORGANISM: artificial sequence
<220> FEATURE:
<223> OTHER INFORMATION: Synthetic sequence

<400> SEQUENCE: 9

Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Asp Asn His
                 20                  25                  30

Gly Phe Ser Phe Met Asn Trp Phe Gln Gln Lys Pro Gly Gln Ala Pro
             35                  40                  45

Arg Leu Leu Ile Tyr Ala Ala Ser Asn Arg Gly Thr Gly Ile Pro Ala
 50                  55                  60

Arg Phe Ser Gly Ser Gly Ser Gly Thr Asp Phe Thr Leu Thr Ile Ser
 65                  70                  75                  80

Ser Met Glu Pro Glu Asp Phe Ala Val Tyr Tyr Cys Gln Gln Ser Lys
                 85                  90                  95

Glu Val Pro Trp Thr Phe Gly Gly Gly Thr Lys Val Glu Ile Lys
            100                 105                 110
```

<210> SEQ ID NO 10
<211> LENGTH: 5
<212> TYPE: PRT
<213> ORGANISM: artificial sequence
<220> FEATURE:
<223> OTHER INFORMATION: Synthetic sequence

<400> SEQUENCE: 10

Asn Phe Gly Met Asn
1               5

<210> SEQ ID NO 11
<211> LENGTH: 17
<212> TYPE: PRT
<213> ORGANISM: artificial sequence
<220> FEATURE:
<223> OTHER INFORMATION: Synthetic sequence

<400> SEQUENCE: 11

Trp Ile Asn Thr Asn Thr Gly Glu Pro Thr Tyr Ala Asp Asp Phe Lys
1               5                   10                  15

Gly

<210> SEQ ID NO 12
<211> LENGTH: 8
<212> TYPE: PRT
<213> ORGANISM: artificial sequence
<220> FEATURE:
<223> OTHER INFORMATION: Synthetic sequence

<400> SEQUENCE: 12

Gly Ala Pro Ala Trp Phe Thr Tyr
1               5

<210> SEQ ID NO 13
<211> LENGTH: 11
<212> TYPE: PRT
<213> ORGANISM: artificial sequence
<220> FEATURE:
<223> OTHER INFORMATION: Synthetic sequence

<400> SEQUENCE: 13

Arg Ala Ser Glu Ser Ile Tyr Ser Tyr Leu Ala
1               5                   10

<210> SEQ ID NO 14
<211> LENGTH: 7
<212> TYPE: PRT
<213> ORGANISM: artificial sequence
<220> FEATURE:
<223> OTHER INFORMATION: Synthetic sequence

<400> SEQUENCE: 14

Asn Ala Lys Thr Leu Ala Ser
1               5

<210> SEQ ID NO 15
<211> LENGTH: 9
<212> TYPE: PRT
<213> ORGANISM: artificial sequence
<220> FEATURE:
<223> OTHER INFORMATION: Synthetic sequence

<400> SEQUENCE: 15

Gln His His Phe Gly Thr Pro Leu Thr

```
1               5

<210> SEQ ID NO 16
<211> LENGTH: 5
<212> TYPE: PRT
<213> ORGANISM: artificial sequence
<220> FEATURE:
<223> OTHER INFORMATION: Synthetic sequence

<400> SEQUENCE: 16

Thr Tyr Gly Ile His
1               5

<210> SEQ ID NO 17
<211> LENGTH: 16
<212> TYPE: PRT
<213> ORGANISM: artificial sequence
<220> FEATURE:
<223> OTHER INFORMATION: Synthetic sequence

<400> SEQUENCE: 17

Val Ile Trp Ser Asp Ala Ser Thr Ile Tyr Ala Ser Ser Leu Lys Ser
1               5                   10                  15

<210> SEQ ID NO 18
<211> LENGTH: 10
<212> TYPE: PRT
<213> ORGANISM: artificial sequence
<220> FEATURE:
<223> OTHER INFORMATION: Synthetic sequence

<400> SEQUENCE: 18

His Gly Gly Tyr Tyr Asn Tyr Phe Asp Tyr
1               5                   10

<210> SEQ ID NO 19
<211> LENGTH: 11
<212> TYPE: PRT
<213> ORGANISM: artificial sequence
<220> FEATURE:
<223> OTHER INFORMATION: Synthetic sequence

<400> SEQUENCE: 19

His Ala Ser Gln Asn Ile Asn Val Trp Leu Ser
1               5                   10

<210> SEQ ID NO 20
<211> LENGTH: 7
<212> TYPE: PRT
<213> ORGANISM: artificial sequence
<220> FEATURE:
<223> OTHER INFORMATION: Synthetic sequence

<400> SEQUENCE: 20

Lys Ala Ser Asn Leu His Thr
1               5

<210> SEQ ID NO 21
<211> LENGTH: 8
<212> TYPE: PRT
<213> ORGANISM: artificial sequence
<220> FEATURE:
<223> OTHER INFORMATION: Synthetic sequence

<400> SEQUENCE: 21

Gln Gln Gly Gln Ser Tyr Trp Thr
1               5
```

<210> SEQ ID NO 22
<211> LENGTH: 5
<212> TYPE: PRT
<213> ORGANISM: artificial sequence
<220> FEATURE:
<223> OTHER INFORMATION: Synthetic sequence

<400> SEQUENCE: 22

Asp Tyr Val Ile Ser
1               5

<210> SEQ ID NO 23
<211> LENGTH: 17
<212> TYPE: PRT
<213> ORGANISM: artificial sequence
<220> FEATURE:
<223> OTHER INFORMATION: Synthetic sequence

<400> SEQUENCE: 23

Glu Ile Tyr Pro Gly Ser Gly Asn Thr Tyr Tyr Asn Gln Lys Phe Gln
1               5                   10                  15

Gly

<210> SEQ ID NO 24
<211> LENGTH: 8
<212> TYPE: PRT
<213> ORGANISM: artificial sequence
<220> FEATURE:
<223> OTHER INFORMATION: Synthetic sequence

<400> SEQUENCE: 24

Gly Gly Ser Ser His Phe Asp Tyr
1               5

<210> SEQ ID NO 25
<211> LENGTH: 15
<212> TYPE: PRT
<213> ORGANISM: artificial sequence
<220> FEATURE:
<223> OTHER INFORMATION: Synthetic sequence

<400> SEQUENCE: 25

Arg Ala Ser Gln Ser Val Asp Asn His Gly Phe Ser Phe Met Asn
1               5                   10                  15

<210> SEQ ID NO 26
<211> LENGTH: 7
<212> TYPE: PRT
<213> ORGANISM: artificial sequence
<220> FEATURE:
<223> OTHER INFORMATION: Synthetic sequence

<400> SEQUENCE: 26

Ala Ala Ser Asn Arg Gly Thr
1               5

<210> SEQ ID NO 27
<211> LENGTH: 9
<212> TYPE: PRT
<213> ORGANISM: artificial sequence
<220> FEATURE:
<223> OTHER INFORMATION: Synthetic sequence

<400> SEQUENCE: 27

Gln Gln Ser Lys Glu Val Pro Trp Thr

<210> SEQ ID NO 28
<211> LENGTH: 330
<212> TYPE: PRT
<213> ORGANISM: artificial sequence
<220> FEATURE:
<223> OTHER INFORMATION: Synthetic sequence

<400> SEQUENCE: 28

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 29
<211> LENGTH: 326
<212> TYPE: PRT

<213> ORGANISM: artificial sequence
<220> FEATURE:
<223> OTHER INFORMATION: Synthetic sequence

<400> SEQUENCE: 29

```
Ala Ser Thr Lys Gly Pro Ser Val Phe Pro Leu Ala Pro Cys Ser Arg
1               5                   10                  15
Ser Thr Ser Glu Ser Thr Ala Ala Leu Gly Cys Leu Val Lys Asp Tyr
            20                  25                  30
Phe Pro Glu Pro Val Thr Val Ser Trp Asn Ser Gly Ala Leu Thr Ser
        35                  40                  45
Gly Val His Thr Phe Pro Ala Val Leu Gln Ser Ser Gly Leu Tyr Ser
    50                  55                  60
Leu Ser Ser Val Val Thr Val Pro Ser Ser Asn Phe Gly Thr Gln Thr
65                  70                  75                  80
Tyr Thr Cys Asn Val Asp His Lys Pro Ser Asn Thr Lys Val Asp Lys
                85                  90                  95
Thr Val Glu Arg Lys Cys Cys Val Glu Cys Pro Pro Cys Pro Ala Pro
            100                 105                 110
Pro Val Ala Gly Pro Ser Val Phe Leu Phe Pro Pro Lys Pro Lys Asp
        115                 120                 125
Thr Leu Met Ile Ser Arg Thr Pro Glu Val Thr Cys Val Val Val Asp
130                 135                 140
Val Ser His Glu Asp Pro Glu Val Gln Phe Asn Trp Tyr Val Asp Gly
145                 150                 155                 160
Val Glu Val His Asn Ala Lys Thr Lys Pro Arg Glu Glu Gln Phe Asn
                165                 170                 175
Ser Thr Phe Arg Val Val Ser Val Leu Thr Val Val His Gln Asp Trp
            180                 185                 190
Leu Asn Gly Lys Glu Tyr Lys Cys Lys Val Ser Asn Lys Gly Leu Pro
        195                 200                 205
Ala Pro Ile Glu Lys Thr Ile Ser Lys Thr Lys Gly Gln Pro Arg Glu
    210                 215                 220
Pro Gln Val Tyr Thr Leu Pro Pro Ser Arg Glu Glu Met Thr Lys Asn
225                 230                 235                 240
Gln Val Ser Leu Thr Cys Leu Val Lys Gly Phe Tyr Pro Ser Asp Ile
                245                 250                 255
Ser Val Glu Trp Glu Ser Asn Gly Gln Pro Glu Asn Asn Tyr Lys Thr
            260                 265                 270
Thr Pro Pro Met Leu Asp Ser Asp Gly Ser Phe Phe Leu Tyr Ser Lys
        275                 280                 285
Leu Thr Val Asp Lys Ser Arg Trp Gln Gln Gly Asn Val Phe Ser Cys
    290                 295                 300
Ser Val Met His Glu Ala Leu His Asn His Tyr Thr Gln Lys Ser Leu
305                 310                 315                 320
Ser Leu Ser Pro Gly Lys
                325
```

<210> SEQ ID NO 30
<211> LENGTH: 327
<212> TYPE: PRT
<213> ORGANISM: artificial sequence
<220> FEATURE:
<223> OTHER INFORMATION: Synthetic sequence

<400> SEQUENCE: 30

```
Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
        130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
            245                 250                 255

Ile Ala Val Glu Trp Glu Ser Asn Gly Gln Pro Glu Asn Asn Tyr Lys
        260                 265                 270

Thr Thr Pro Pro Val Leu Asp Ser Asp Gly Ser Phe Phe Leu Tyr Ser
    275                 280                 285

Arg Leu Thr Val Asp Lys Ser Arg Trp Gln Glu Gly Asn Val Phe Ser
290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 31
<211> LENGTH: 330
<212> TYPE: PRT
<213> ORGANISM: artificial sequence
<220> FEATURE:
<223> OTHER INFORMATION: Synthetic sequence

<400> SEQUENCE: 31

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30
```

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Ala Lys Thr Ile Ser Lys Ala Lys Gly
            210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 32
<211> LENGTH: 327
<212> TYPE: PRT
<213> ORGANISM: artificial sequence
<220> FEATURE:
<223> OTHER INFORMATION: Synthetic sequence

<400> SEQUENCE: 32

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
        290                 295                 300

Cys Ser Val Met His Glu Ala Leu His Asn His Tyr Thr Gln Lys Ser
305                 310                 315                 320

Leu Ser Leu Ser Pro Gly Lys
                325

<210> SEQ ID NO 33
<211> LENGTH: 107
<212> TYPE: PRT
<213> ORGANISM: artificial sequence
<220> FEATURE:
<223> OTHER INFORMATION: Synthetic sequence

<400> SEQUENCE: 33

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

```
Pro Val Thr Lys Ser Phe Asn Arg Gly Glu Cys
            100                 105

<210> SEQ ID NO 34
<211> LENGTH: 8
<212> TYPE: PRT
<213> ORGANISM: artificial sequence
<220> FEATURE:
<223> OTHER INFORMATION: Synthetic sequence

<400> SEQUENCE: 34

Gly Tyr Thr Phe Thr Asn Phe Gly
1               5

<210> SEQ ID NO 35
<211> LENGTH: 9
<212> TYPE: PRT
<213> ORGANISM: artificial sequence
<220> FEATURE:
<223> OTHER INFORMATION: Synthetic sequence

<400> SEQUENCE: 35

Trp Ile Asn Thr Asn Thr Gly Glu Pro
1               5

<210> SEQ ID NO 36
<211> LENGTH: 11
<212> TYPE: PRT
<213> ORGANISM: artificial sequence
<220> FEATURE:
<223> OTHER INFORMATION: Synthetic sequence

<400> SEQUENCE: 36

Cys Ala Arg Gly Ala Pro Ala Trp Phe Thr Tyr
1               5                   10

<210> SEQ ID NO 37
<211> LENGTH: 6
<212> TYPE: PRT
<213> ORGANISM: artificial sequence
<220> FEATURE:
<223> OTHER INFORMATION: Synthetic sequence

<400> SEQUENCE: 37

Glu Ser Ile Tyr Ser Tyr
1               5

<210> SEQ ID NO 38
<211> LENGTH: 3
<212> TYPE: PRT
<213> ORGANISM: artificial sequence
<220> FEATURE:
<223> OTHER INFORMATION: Synthetic sequence

<400> SEQUENCE: 38

Asn Ala Lys
1

<210> SEQ ID NO 39
<211> LENGTH: 9
<212> TYPE: PRT
<213> ORGANISM: artificial sequence
<220> FEATURE:
<223> OTHER INFORMATION: Synthetic sequence

<400> SEQUENCE: 39

Gln His His Phe Gly Thr Pro Leu Thr
```

```
<210> SEQ ID NO 40
<211> LENGTH: 8
<212> TYPE: PRT
<213> ORGANISM: artificial sequence
<220> FEATURE:
<223> OTHER INFORMATION: Synthetic sequence

<400> SEQUENCE: 40

Gly Phe Thr Leu Thr Thr Tyr Gly
1               5

<210> SEQ ID NO 41
<211> LENGTH: 7
<212> TYPE: PRT
<213> ORGANISM: artificial sequence
<220> FEATURE:
<223> OTHER INFORMATION: Synthetic sequence

<400> SEQUENCE: 41

Trp Ser Asp Ala Ser Thr Ile
1               5

<210> SEQ ID NO 42
<211> LENGTH: 11
<212> TYPE: PRT
<213> ORGANISM: artificial sequence
<220> FEATURE:
<223> OTHER INFORMATION: Synthetic sequence

<400> SEQUENCE: 42

Arg His Gly Gly Tyr Tyr Asn Tyr Phe Asp Tyr
1               5                   10

<210> SEQ ID NO 43
<211> LENGTH: 6
<212> TYPE: PRT
<213> ORGANISM: artificial sequence
<220> FEATURE:
<223> OTHER INFORMATION: Synthetic sequence

<400> SEQUENCE: 43

Gln Asn Ile Asn Val Trp
1               5

<210> SEQ ID NO 44
<211> LENGTH: 3
<212> TYPE: PRT
<213> ORGANISM: artificial sequence
<220> FEATURE:
<223> OTHER INFORMATION: Synthetic sequence

<400> SEQUENCE: 44

Lys Ala Ser
1

<210> SEQ ID NO 45
<211> LENGTH: 7
<212> TYPE: PRT
<213> ORGANISM: artificial sequence
<220> FEATURE:
<223> OTHER INFORMATION: Synthetic sequence

<400> SEQUENCE: 45

Gln Gln Gly Gln Ser Tyr Trp
1               5
```

<210> SEQ ID NO 46
<211> LENGTH: 8
<212> TYPE: PRT
<213> ORGANISM: artificial sequence
<220> FEATURE:
<223> OTHER INFORMATION: Synthetic sequence

<400> SEQUENCE: 46

Gly Tyr Thr Phe Thr Asp Tyr Val
1               5

<210> SEQ ID NO 47
<211> LENGTH: 7
<212> TYPE: PRT
<213> ORGANISM: artificial sequence
<220> FEATURE:
<223> OTHER INFORMATION: Synthetic sequence

<400> SEQUENCE: 47

Tyr Pro Gly Ser Gly Asn Thr
1               5

<210> SEQ ID NO 48
<211> LENGTH: 10
<212> TYPE: PRT
<213> ORGANISM: artificial sequence
<220> FEATURE:
<223> OTHER INFORMATION: Synthetic sequence

<400> SEQUENCE: 48

Ala Gly Gly Gly Ser Ser His Phe Asp Tyr
1               5                   10

<210> SEQ ID NO 49
<211> LENGTH: 10
<212> TYPE: PRT
<213> ORGANISM: artificial sequence
<220> FEATURE:
<223> OTHER INFORMATION: Synthetic sequence

<400> SEQUENCE: 49

Gln Ser Val Asp Asn His Gly Phe Ser Phe
1               5                   10

<210> SEQ ID NO 50
<211> LENGTH: 3
<212> TYPE: PRT
<213> ORGANISM: artificial sequence
<220> FEATURE:
<223> OTHER INFORMATION: Synthetic sequence

<400> SEQUENCE: 50

Ala Ala Ser
1

<210> SEQ ID NO 51
<211> LENGTH: 9
<212> TYPE: PRT
<213> ORGANISM: artificial sequence
<220> FEATURE:
<223> OTHER INFORMATION: Synthetic sequence

<400> SEQUENCE: 51

Gln Gln Ser Lys Glu Val Pro Trp Thr
1               5

<210> SEQ ID NO 52
<211> LENGTH: 451
<212> TYPE: PRT
<213> ORGANISM: artificial sequence
<220> FEATURE:
<223> OTHER INFORMATION: Synthetic sequence

<400> SEQUENCE: 52

Met Glu Thr Asp Thr Leu Leu Leu Trp Val Leu Leu Trp Val Pro
1               5                   10                  15

Gly Ser Thr Gly Asp Val Glu Cys Pro Pro Cys Pro Ala Pro Val
                20                  25                  30

Ala Gly Pro Ser Val Phe Leu Phe Pro Pro Lys Pro Lys Asp Thr Leu
            35                  40                  45

Met Ile Ser Arg Thr Pro Glu Val Thr Cys Val Val Asp Val Ser
50                  55                  60

His Glu Asp Pro Glu Val Lys Phe Asn Trp Tyr Val Asp Gly Val Glu
65                  70                  75                  80

Val His Asn Ala Lys Thr Lys Pro Arg Glu Glu Gln Tyr Asn Ser Thr
                85                  90                  95

Tyr Arg Val Val Ser Val Leu Thr Val Leu His Gln Asp Trp Leu Asn
                100                 105                 110

Gly Lys Glu Tyr Lys Cys Lys Val Ser Asn Lys Gly Leu Pro Ser Ser
            115                 120                 125

Ile Glu Lys Thr Ile Ser Lys Ala Lys Gly Gln Pro Arg Glu Pro Gln
130                 135                 140

Val Tyr Thr Leu Pro Pro Ser Arg Glu Glu Met Thr Lys Asn Gln Val
145                 150                 155                 160

Ser Leu Thr Cys Leu Val Lys Gly Phe Tyr Pro Ser Asp Ile Ala Val
                165                 170                 175

Glu Trp Glu Ser Asn Gly Gln Pro Glu Asn Asn Tyr Lys Thr Thr Pro
                180                 185                 190

Pro Val Leu Asp Ser Asp Gly Ser Phe Phe Leu Tyr Ser Lys Leu Thr
            195                 200                 205

Val Asp Lys Ser Arg Trp Gln Gln Gly Asn Val Phe Ser Cys Ser Val
210                 215                 220

Met His Glu Ala Leu His Asn His Tyr Thr Gln Lys Ser Leu Ser Leu
225                 230                 235                 240

Ser Pro Gly Lys Gln Tyr Tyr Gln Leu Ser Asn Thr Gly Gln Asp Thr
                245                 250                 255

Ile Ser Gln Met Glu Glu Arg Leu Gly Asn Thr Ser Gln Glu Leu Gln
                260                 265                 270

Ser Leu Gln Val Gln Asn Ile Lys Leu Ala Gly Ser Leu Gln His Val
            275                 280                 285

Ala Glu Lys Leu Cys Arg Glu Leu Tyr Asn Lys Ala Gly Ala His Arg
290                 295                 300

Cys Ser Pro Cys Thr Glu Gln Trp Lys Trp His Gly Asp Asn Cys Tyr
305                 310                 315                 320

Gln Phe Tyr Lys Asp Ser Lys Ser Trp Glu Asp Cys Lys Tyr Phe Cys
                325                 330                 335

Leu Ser Glu Asn Ser Thr Met Leu Lys Ile Asn Lys Gln Glu Asp Leu
                340                 345                 350

Glu Phe Ala Ala Ser Gln Ser Tyr Ser Glu Phe Phe Tyr Ser Tyr Trp
            355                 360                 365

-continued

```
Thr Gly Leu Leu Arg Pro Asp Ser Gly Lys Ala Trp Leu Trp Met Asp
    370                 375                 380
Gly Thr Pro Phe Thr Ser Glu Leu Phe His Ile Ile Ile Asp Val Thr
385                 390                 395                 400
Ser Pro Arg Ser Arg Asp Cys Val Ala Ile Leu Asn Gly Met Ile Phe
                405                 410                 415
Ser Lys Asp Cys Lys Glu Leu Lys Arg Cys Val Cys Glu Arg Arg Ala
                420                 425                 430
Gly Met Val Lys Pro Glu Ser Leu His Val Pro Pro Glu Thr Leu Gly
                435                 440                 445
Glu Gly Asp
    450

<210> SEQ ID NO 53
<211> LENGTH: 321
<212> TYPE: DNA
<213> ORGANISM: artificial sequence
<220> FEATURE:
<223> OTHER INFORMATION: Synthetic sequence

<400> SEQUENCE: 53
gacatccaga tgacacagtc tccttccagc ctgagcgcct ctgtgggcga tagggtgacc      60
atcacatgcc gggcctccga gagcatctac tcctatctgg cttggtacca gcagaagccc    120
ggcaaggccc ctaagttcct gatctataat gccaagaccc tggcttcggg agtgccatcc    180
aggttctccg gaagcggctc tggcacagac tttaccctga caatctcttc cctgcagcca    240
gaggattttg ctacctacta ttgtcagcac catttcggca ccccccctga catttggcca g    300 ggcacaaagc tggagatcaa g                                                321

<210> SEQ ID NO 54
<211> LENGTH: 33
<212> TYPE: DNA
<213> ORGANISM: artificial sequence
<220> FEATURE:
<223> OTHER INFORMATION: Synthetic sequence

<400> SEQUENCE: 54
cgggcctccg agagcatcta ctcctatctg gct                                    33

<210> SEQ ID NO 55
<211> LENGTH: 18
<212> TYPE: DNA
<213> ORGANISM: artificial sequence
<220> FEATURE:
<223> OTHER INFORMATION: Synthetic sequence

<400> SEQUENCE: 55
gagagcatct actcctat                                                     18

<210> SEQ ID NO 56
<211> LENGTH: 21
<212> TYPE: DNA
<213> ORGANISM: artificial sequence
<220> FEATURE:
<223> OTHER INFORMATION: Synthetic sequence

<400> SEQUENCE: 56
aatgccaaga ccctggcttc g                                                 21

<210> SEQ ID NO 57
<211> LENGTH: 18
```

<212> TYPE: DNA
<213> ORGANISM: artificial sequence
<220> FEATURE:
<223> OTHER INFORMATION: Synthetic sequence

<400> SEQUENCE: 57
gagagcatct actcctat                                                    18

<210> SEQ ID NO 58
<211> LENGTH: 27
<212> TYPE: DNA
<213> ORGANISM: artificial sequence
<220> FEATURE:
<223> OTHER INFORMATION: Synthetic sequence

<400> SEQUENCE: 58
cagcaccatt tcggcacccc cctgaca                                          27

<210> SEQ ID NO 59
<211> LENGTH: 27
<212> TYPE: DNA
<213> ORGANISM: artificial sequence
<220> FEATURE:
<223> OTHER INFORMATION: Synthetic sequence

<400> SEQUENCE: 59
cagcaccatt tcggcacccc cctgaca                                          27

<210> SEQ ID NO 60
<211> LENGTH: 333
<212> TYPE: DNA
<213> ORGANISM: artificial sequence
<220> FEATURE:
<223> OTHER INFORMATION: Synthetic sequence

<400> SEQUENCE: 60
gagatcgtgc tgacccagtc cccagccaca ctgtctctgt ccccaggaga gagggccacc      60
ctgtcttgcc gggctagcca gtctgtggac aaccacggct tctcctttat gaattggttc     120
cagcagaagc ccggccaggc tcctagactg ctgatctacg ctgcttccaa cagaggaaca     180
ggaatccctg ctaggttctc cggaagcgga tctggcacag actttaccct gaccatctcc     240
agcatggagc tgaggatttt cgctgtgtat tactgtcagc agtctaagga ggtgccatgg     300
acctttggcg gcggcacaaa ggtggagatc aag                                  333

<210> SEQ ID NO 61
<211> LENGTH: 45
<212> TYPE: DNA
<213> ORGANISM: artificial sequence
<220> FEATURE:
<223> OTHER INFORMATION: Synthetic sequence

<400> SEQUENCE: 61
cgggctagcc agtctgtgga caaccacggc ttctccttta tgaat                      45

<210> SEQ ID NO 62
<211> LENGTH: 31
<212> TYPE: DNA
<213> ORGANISM: artificial sequence
<220> FEATURE:
<223> OTHER INFORMATION: Synthetic sequence

<400> SEQUENCE: 62
cagtctgtgg acaaccacgg cttctccttt a                                     31

<210> SEQ ID NO 63
<211> LENGTH: 21
<212> TYPE: DNA
<213> ORGANISM: artificial sequence
<220> FEATURE:
<223> OTHER INFORMATION: Synthetic sequence

<400> SEQUENCE: 63
gctgcttcca acagaggaac a                                          21

<210> SEQ ID NO 64
<211> LENGTH: 9
<212> TYPE: DNA
<213> ORGANISM: artificial sequence
<220> FEATURE:
<223> OTHER INFORMATION: Synthetic sequence

<400> SEQUENCE: 64 gctgcttcc                                                         9

<210> SEQ ID NO 65
<211> LENGTH: 27
<212> TYPE: DNA
<213> ORGANISM: artificial sequence
<220> FEATURE:
<223> OTHER INFORMATION: Synthetic sequence

<400> SEQUENCE: 65
cagcagtcta aggaggtgcc atggacc                                    27

<210> SEQ ID NO 66
<211> LENGTH: 27
<212> TYPE: DNA
<213> ORGANISM: artificial sequence
<220> FEATURE:
<223> OTHER INFORMATION: Synthetic sequence

<400> SEQUENCE: 66
cagcagtcta aggaggtgcc atggacc                                    27

<210> SEQ ID NO 67
<211> LENGTH: 318
<212> TYPE: DNA
<213> ORGANISM: artificial sequence
<220> FEATURE:
<223> OTHER INFORMATION: Synthetic sequence

<400> SEQUENCE: 67
gacatccaga tgacccagag cccatccagc ctgagcgcct ctgtgggcga tagggtgacc    60
atcacatgcc acgcttccca gaacatcaac gtgtggctga gctggtacca gcagaagccc   120
ggcaaggccc ctaagctgct gctgtataag gcttctaacc tgcataccgg agtgccatcc   180
cggttctccg gaagcggatc tggaacagac tttacccctga caatctcttc cctgcagccc   240
gaggacatcg ccacatacta ttgtcagcag ggccagtctt actggacctt cggcggcggc   300
acaaaggtgg agatcaag                                                 318

<210> SEQ ID NO 68
<211> LENGTH: 33
<212> TYPE: DNA
<213> ORGANISM: artificial sequence
<220> FEATURE:
<223> OTHER INFORMATION: Synthetic sequence

<400> SEQUENCE: 68
cacgcttccc agaacatcaa cgtgtggctg agc                                    33

<210> SEQ ID NO 69
<211> LENGTH: 18
<212> TYPE: DNA
<213> ORGANISM: artificial sequence
<220> FEATURE:
<223> OTHER INFORMATION: Synthetic sequence

<400> SEQUENCE: 69
cagaacatca acgtgtgg                                                     18

<210> SEQ ID NO 70
<211> LENGTH: 21
<212> TYPE: DNA
<213> ORGANISM: artificial sequence
<220> FEATURE:
<223> OTHER INFORMATION: Synthetic sequence

<400> SEQUENCE: 70
aaggcttcta acctgcatac c                                                 21

<210> SEQ ID NO 71
<211> LENGTH: 9
<212> TYPE: DNA
<213> ORGANISM: artificial sequence
<220> FEATURE:
<223> OTHER INFORMATION: Synthetic sequence

<400> SEQUENCE: 71 aaggcttct                                                                9

<210> SEQ ID NO 72
<211> LENGTH: 24
<212> TYPE: DNA
<213> ORGANISM: artificial sequence
<220> FEATURE:
<223> OTHER INFORMATION: Synthetic sequence

<400> SEQUENCE: 72
cagcagggcc agtcttactg gacc                                              24

<210> SEQ ID NO 73
<211> LENGTH: 24
<212> TYPE: DNA
<213> ORGANISM: artificial sequence
<220> FEATURE:
<223> OTHER INFORMATION: Synthetic sequence

<400> SEQUENCE: 73
cagcagggcc agtcttactg gacc                                              24

<210> SEQ ID NO 74
<211> LENGTH: 351
<212> TYPE: DNA
<213> ORGANISM: artificial sequence
<220> FEATURE:
<223> OTHER INFORMATION: Synthetic sequence

<400> SEQUENCE: 74
cagatccagc tggtgcagag cggctctgag ctgaagaagc caggcgcctc tgtgaaggtg      60
tcctgcaagg ctagcggcta caccttcaca aactttggca tgaattgggt gaggcaggct     120
ccaggacagg gcctggagtg gatgggctgg atcaacacca atacaggcga gcctacctac     180

```
gccgacgatt tcaagggccg gttcgtgttt tctctggaca cctccgtgag cacagcttat    240
ctgcagatct ccagcctgaa ggccgaggat accgctacat acttctgtgc caggggcgcc    300
cccgcttggt ttacctattg gggccagggc accacagtga cagtgtcttc c             351
```

```
<210> SEQ ID NO 75
<211> LENGTH: 15
<212> TYPE: DNA
<213> ORGANISM: artificial sequence
<220> FEATURE:
<223> OTHER INFORMATION: Synthetic sequence

<400> SEQUENCE: 75
aactttggca tgaat                                                     15
```

```
<210> SEQ ID NO 76
<211> LENGTH: 24
<212> TYPE: DNA
<213> ORGANISM: artificial sequence
<220> FEATURE:
<223> OTHER INFORMATION: Synthetic sequence

<400> SEQUENCE: 76
ggctacacct tcacaaactt tggc                                           24
```

```
<210> SEQ ID NO 77
<211> LENGTH: 51
<212> TYPE: DNA
<213> ORGANISM: artificial sequence
<220> FEATURE:
<223> OTHER INFORMATION: Synthetic sequence

<400> SEQUENCE: 77
tggatcaaca ccaatacagg cgagcctacc tacgccgacg atttcaaggg c              51
```

```
<210> SEQ ID NO 78
<211> LENGTH: 27
<212> TYPE: DNA
<213> ORGANISM: artificial sequence
<220> FEATURE:
<223> OTHER INFORMATION: Synthetic sequence

<400> SEQUENCE: 78
tggatcaaca ccaatacagg cgagcct                                        27
```

```
<210> SEQ ID NO 79
<211> LENGTH: 24
<212> TYPE: DNA
<213> ORGANISM: artificial sequence
<220> FEATURE:
<223> OTHER INFORMATION: Synthetic sequence

<400> SEQUENCE: 79
ggcgcccccg cttggtttac ctat                                           24
```

```
<210> SEQ ID NO 80
<211> LENGTH: 33
<212> TYPE: DNA
<213> ORGANISM: artificial sequence
<220> FEATURE:
<223> OTHER INFORMATION: Synthetic sequence

<400> SEQUENCE: 80
tgtgccaggg gcgcccccgc ttggtttacc tat                                 33
```

```
<210> SEQ ID NO 81
<211> LENGTH: 351
<212> TYPE: DNA
<213> ORGANISM: artificial sequence
<220> FEATURE:
<223> OTHER INFORMATION: Synthetic sequence

<400> SEQUENCE: 81
caggttcagc tggttcagtc tggcgccgaa gtgaagaaac ctggctcctc cgtgaagatg        60
tcctgcaagg cttccggcta cacctttacc gactacgtga tctcctgggt ccgacaggct       120
cctggacaag gcctggaatg gatgggcgag atctatcctg ctccggcaa cacctactac        180 aaccagaagt tccagggcag agtgaccctg accgccgaca gtctacctc caccgcttac        240 atggagctgt ccagcctgag atctgaggac accgccgtgt actactgtgc tggcggcgga      300
tcttcccact cgattattg gggccagggc accaccgtga ccgtttcttc t                 351

<210> SEQ ID NO 82
<211> LENGTH: 15
<212> TYPE: DNA
<213> ORGANISM: artificial sequence
<220> FEATURE:
<223> OTHER INFORMATION: Synthetic sequence

<400> SEQUENCE: 82
gactacgtga tctcc                                                          15

<210> SEQ ID NO 83
<211> LENGTH: 24
<212> TYPE: DNA
<213> ORGANISM: artificial sequence
<220> FEATURE:
<223> OTHER INFORMATION: Synthetic sequence

<400> SEQUENCE: 83
ggctacacct ttaccgacta cgtg                                                24

<210> SEQ ID NO 84
<211> LENGTH: 51
<212> TYPE: DNA
<213> ORGANISM: artificial sequence
<220> FEATURE:
<223> OTHER INFORMATION: Synthetic sequence

<400> SEQUENCE: 84
gagatctatc ctggctccgg caacacctac tacaaccaga gttccaggg c                  51

<210> SEQ ID NO 85
<211> LENGTH: 21
<212> TYPE: DNA
<213> ORGANISM: artificial sequence
<220> FEATURE:
<223> OTHER INFORMATION: Synthetic sequence

<400> SEQUENCE: 85
tatcctggct ccggcaacac c                                                   21

<210> SEQ ID NO 86
<211> LENGTH: 24
<212> TYPE: DNA
<213> ORGANISM: artificial sequence
<220> FEATURE:
<223> OTHER INFORMATION: Synthetic sequence

<400> SEQUENCE: 86
```
ggcggatctt cccacttcga ttat                                              24

<210> SEQ ID NO 87
<211> LENGTH: 30
<212> TYPE: DNA
<213> ORGANISM: artificial sequence
<220> FEATURE:
<223> OTHER INFORMATION: Synthetic sequence

<400> SEQUENCE: 87
gctggcggcg gatcttccca cttcgattat                                        30

<210> SEQ ID NO 88
<211> LENGTH: 354
<212> TYPE: DNA
<213> ORGANISM: artificial sequence
<220> FEATURE:
<223> OTHER INFORMATION: Synthetic sequence

<400> SEQUENCE: 88
caggtgcagc tggtggagtc cggaggagga gtggtgcagc aggcaggtc cctgcggctg         60 agctgcgcca tctctggctt caccctgacc acatacggca tccactgggt gaggcaggct       120
cctggcaagg gctggagtg gtcgccgtc atctggagcg atgcctctac catctatgcc         180
tctagcctga agtccagatt caccatcagc aaggacaact ctaagaatac agtgtacctg       240
cagatgacca gcctgagagc cgaggataca gctatctact attgtgctcg ccatggcggc       300
tactataatt actttgacta ttggggccag ggcaccctgg tgacagtgtc cagc             354

<210> SEQ ID NO 89
<211> LENGTH: 15
<212> TYPE: DNA
<213> ORGANISM: artificial sequence
<220> FEATURE:
<223> OTHER INFORMATION: Synthetic sequence

<400> SEQUENCE: 89
acatacggca tccac                                                        15

<210> SEQ ID NO 90
<211> LENGTH: 24
<212> TYPE: DNA
<213> ORGANISM: artificial sequence
<220> FEATURE:
<223> OTHER INFORMATION: Synthetic sequence

<400> SEQUENCE: 90
ggcttcaccc tgaccacata cggc                                              24

<210> SEQ ID NO 91
<211> LENGTH: 48
<212> TYPE: DNA
<213> ORGANISM: artificial sequence
<220> FEATURE:
<223> OTHER INFORMATION: Synthetic sequence

<400> SEQUENCE: 91
gtcatctgga gcgatgcctc taccatctat gcctctagcc tgaagtcc                    48

<210> SEQ ID NO 92
<211> LENGTH: 21
<212> TYPE: DNA
<213> ORGANISM: artificial sequence
<220> FEATURE:
<223> OTHER INFORMATION: Synthetic sequence

<400> SEQUENCE: 92
tggagcgatg cctctaccat c                                              21

<210> SEQ ID NO 93
<211> LENGTH: 30
<212> TYPE: DNA
<213> ORGANISM: artificial sequence
<220> FEATURE:
<223> OTHER INFORMATION: Synthetic sequence

<400> SEQUENCE: 93
catggcggct actataatta ctttgactat                                     30

<210> SEQ ID NO 94
<211> LENGTH: 33
<212> TYPE: DNA
<213> ORGANISM: artificial sequence
<220> FEATURE:
<223> OTHER INFORMATION: Synthetic sequence

<400> SEQUENCE: 94
cgccatggcg gctactataa ttactttgac tat                                 33

<210> SEQ ID NO 95
<211> LENGTH: 354
<212> TYPE: DNA
<213> ORGANISM: artificial sequence
<220> FEATURE:
<223> OTHER INFORMATION: Synthetic sequence

<400> SEQUENCE: 95
caggtgcagc tggtggagtc cggaggagga gtggtgcagc caggcaggtc cctgcggctg     60
agctgcgcca tctctggctt caccctgacc acatacggca tccactgggt gaggcaggct    120
cctggcaagg gcctggagtg ggtcgccgtc atctggagcg atgcctctac catctatgcc    180
tctagcctga agtccagatt caccatcagc aaggacaaca ccaagaatac agtgtacctg    240
cagatgacca gcctgagagc cgaggataca gctgtgtact attgtgctcg ccatggcggc    300
tactataatt actttgacta ttggggccag ggcacccctgg tgacagtgtc cagc         354

<210> SEQ ID NO 96
<211> LENGTH: 324
<212> TYPE: DNA
<213> ORGANISM: artificial sequence
<220> FEATURE:
<223> OTHER INFORMATION: Synthetic sequence

<400> SEQUENCE: 96
cgtacggtgg ctgcaccatc tgtcttcatc ttcccgccat ctgatgagca gttgaaatct     60
ggaactgcct ctgttgtgtg cctgctgaat aacttctatc ccagagaggc caaagtacag    120
tggaaggtgg ataacgccct ccaatcgggt aactcccagg agagtgtcac agagcaggac    180
agcaaggaca gcacctacag cctcagcagc accctgacgc tgagcaaagc agactacgag    240
aaacacaaag tctacgcctg cgaagtcacc catcagggcc tgagctcgcc cgtcacaaag    300
agcttcaaca ggggagagtg ttag                                           324

<210> SEQ ID NO 97
<211> LENGTH: 330
<212> TYPE: PRT
<213> ORGANISM: artificial sequence
<220> FEATURE:

<223> OTHER INFORMATION: Synthetic sequence

<400> SEQUENCE: 97

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 98
<211> LENGTH: 993
<212> TYPE: DNA
<213> ORGANISM: artificial sequence
<220> FEATURE:
<223> OTHER INFORMATION: Synthetic sequence

<400> SEQUENCE: 98
gctagcacca agggcccatc ggtcttcccc ctggcaccct cctccaagag cacctctggg      60

```
ggcacagcgg cccctgggctg cctggtcaag gactacttcc ccgaaccggt gacggtgtcg    120
tggaactcag gcgccctgac cagcggcgtg cacaccttcc cggctgtcct acagtcctca    180
ggactctact ccctcagcag cgtggtgacc gtgccctcca gcagcttggg cacccagacc    240
tacatctgca acgtgaatca caagcccagc aacaccaagg tggacaagaa agttgagccc    300
aaatcttgtg acaaaactca cacatgccca ccgtgcccag cacctgaact cctgggggga    360
ccgtcagtct tcctcttccc cccaaaaccc aaggacaccc tcatgatctc ccggacccct    420
gaggtcacat gcgtggtggt ggacgtgagc cacgaagacc ctgaggtcaa gttcaactgg    480
tacgtggacg gcgtggaggt gcataatgcc aagacaaagc cgcgggagga gcagtacgcc    540
agcacgtacc gtgtggtcag cgtcctcacc gtcctgcacc aggactggct gaatggcaag    600
gagtacaagt gcaaggtctc caacaaagcc ctcccagccc ccatcgagaa aaccatctcc    660
aaagccaaag ggcagccccg agaaccacag gtgtacaccc tgcccccatc ccgggaggag    720
atgaccaaga accaggtcag cctgacctgc ctggtcaaag gcttctatcc cagcgacatc    780
gccgtggagt gggagagcaa tgggcagccg gagaacaact acaagaccac gcctcccgtg    840
ctggactccg acggctcctt cttcctctac agcaagctca ccgtggacaa gagcaggtgg    900
cagcagggga acgtcttctc atgctccgtg atgcatgagg ctctgcacaa ccactacacg    960
cagaagagcc tctccctgtc tccgggtaaa tga                                 993
```

<210> SEQ ID NO 99
<211> LENGTH: 984
<212> TYPE: DNA
<213> ORGANISM: artificial sequence
<220> FEATURE:
<223> OTHER INFORMATION: Synthetic sequence

<400> SEQUENCE: 99

```
gctagcacca agggcccatc ggtcttcccc ctggcgccct gctccaggag cacctccgag     60
agcacagccg ccctgggctg cctggtcaag gactacttcc ccgaaccggt gacggtgtcg    120
tggaactcag gcgccctgac cagcggcgtg cacaccttcc cggctgtcct acagtcctca    180
ggactctact ccctcagcag cgtggtgacc gtgccctcca gcagcttggg cacgaagacc    240
tacacctgca acgtagatca caagcccagc aacaccaagg tggacaagag agttgagtcc    300
aaatatggtc cccatgccca ccatgccca gcacctgagt tcctggggg accatcagtc      360 ttcctgttcc cccaaaaccc aaggacact ctcatgatct cccggacccc tgaggtcacg      420
tgcgtggtgg tggacgtgag ccaggaagac cccgaggtcc agttcaactg gtacgtggat    480
ggcgtggagg tgcataatgc caagacaaag ccgcgggagg agcagttcaa cagcacgtac    540
cgtgtggtca gcgtcctcac cgtcctgcac caggactggc tgaacggcaa ggagtacaag    600
tgcaaggtct ccaacaaagg cctcccgtcc tccatcgaga aaaccatctc caaagccaaa    660
gggcagcccc gagagccaca ggtgtacacc ctgcccccat cccaggagga gatgaccaag    720
aaccaggtca gcctgacctg cctggtcaaa ggcttctacc cagcgacat cgccgtggag     780 tgggagagca atgggcagcc ggagaacaac tacaagacca cgcctcccgt gctggactcc    840
gacggctcct tcttcctcta cagcaggcta ccgtggaca agagcaggtg gcaggagggg    900
aatgtcttct catgctccgt gatgcatgag gctctgcaca accactacac acagaagagc    960
ctctccctgt ctccgggtaa atga                                           984
```

<210> SEQ ID NO 100
<211> LENGTH: 330

```
<212> TYPE: PRT
<213> ORGANISM: artificial sequence
<220> FEATURE:
<223> OTHER INFORMATION: Synthetic sequence

<400> SEQUENCE: 100
```

| | | | | | | | | | | | | | | | |
|---|---|---|---|---|---|---|---|---|---|---|---|---|---|---|---|
| Ala | Ser | Thr | Lys | Gly | Pro | Ser | Val | Phe | Pro | Leu | Ala | Pro | Ser | Ser | Lys |
| 1 | | | | 5 | | | | | 10 | | | | | 15 | |
| Ser | Thr | Ser | Gly | Gly | Thr | Ala | Ala | Leu | Gly | Cys | Leu | Val | Lys | Asp | Tyr |
| | | | 20 | | | | | 25 | | | | | 30 | | |
| Phe | Pro | Glu | Pro | Val | Thr | Val | Ser | Trp | Asn | Ser | Gly | Ala | Leu | Thr | Ser |
| | | 35 | | | | | 40 | | | | | 45 | | | |
| Gly | Val | His | Thr | Phe | Pro | Ala | Val | Leu | Gln | Ser | Ser | Gly | Leu | Tyr | Ser |
| | 50 | | | | | 55 | | | | | 60 | | | | |
| Leu | Ser | Ser | Val | Val | Thr | Val | Pro | Ser | Ser | Ser | Leu | Gly | Thr | Gln | Thr |
| 65 | | | | | 70 | | | | | 75 | | | | | 80 |
| Tyr | Ile | Cys | Asn | Val | Asn | His | Lys | Pro | Ser | Asn | Thr | Lys | Val | Asp | Lys |
| | | | | 85 | | | | | 90 | | | | | 95 | |
| Lys | Val | Glu | Pro | Lys | Ser | Cys | Asp | Lys | Thr | His | Thr | Cys | Pro | Pro | Cys |
| | | | 100 | | | | | 105 | | | | | 110 | | |
| Pro | Ala | Pro | Glu | Ala | Ala | Gly | Gly | Pro | Ser | Val | Phe | Leu | Phe | Pro | Pro |
| | | 115 | | | | | 120 | | | | | 125 | | | |
| Lys | Pro | Lys | Asp | Thr | Leu | Met | Ile | Ser | Arg | Thr | Pro | Glu | Val | Thr | Cys |
| | 130 | | | | | 135 | | | | | 140 | | | | |
| Val | Val | Val | Asp | Val | Ser | His | Glu | Asp | Pro | Glu | Val | Lys | Phe | Asn | Trp |
| 145 | | | | | 150 | | | | | 155 | | | | | 160 |
| Tyr | Val | Asp | Gly | Val | Glu | Val | His | Asn | Ala | Lys | Thr | Lys | Pro | Arg | Glu |
| | | | | 165 | | | | | 170 | | | | | 175 | |
| Glu | Gln | Tyr | Asn | Ser | Thr | Tyr | Arg | Val | Val | Ser | Val | Leu | Thr | Val | Leu |
| | | | 180 | | | | | 185 | | | | | 190 | | |
| His | Gln | Asp | Trp | Leu | Asn | Gly | Lys | Glu | Tyr | Lys | Cys | Lys | Val | Ser | Asn |
| | | 195 | | | | | 200 | | | | | 205 | | | |
| Lys | Ala | Leu | Pro | Ala | Pro | Ile | Glu | Lys | Thr | Ile | Ser | Lys | Ala | Lys | Gly |
| | 210 | | | | | 215 | | | | | 220 | | | | |
| Gln | Pro | Arg | Glu | Pro | Gln | Val | Tyr | Thr | Leu | Pro | Pro | Ser | Arg | Glu | Glu |
| 225 | | | | | 230 | | | | | 235 | | | | | 240 |
| Met | Thr | Lys | Asn | Gln | Val | Ser | Leu | Thr | Cys | Leu | Val | Lys | Gly | Phe | Tyr |
| | | | | 245 | | | | | 250 | | | | | 255 | |
| Pro | Ser | Asp | Ile | Ala | Val | Glu | Trp | Glu | Ser | Asn | Gly | Gln | Pro | Glu | Asn |
| | | | 260 | | | | | 265 | | | | | 270 | | |
| Asn | Tyr | Lys | Thr | Thr | Pro | Pro | Val | Leu | Asp | Ser | Asp | Gly | Ser | Phe | Phe |
| | | 275 | | | | | 280 | | | | | 285 | | | |
| Leu | Tyr | Ser | Lys | Leu | Thr | Val | Asp | Lys | Ser | Arg | Trp | Gln | Gln | Gly | Asn |
| | 290 | | | | | 295 | | | | | 300 | | | | |
| Val | Phe | Ser | Cys | Ser | Val | Met | His | Glu | Ala | Leu | His | Asn | His | Tyr | Thr |
| 305 | | | | | 310 | | | | | 315 | | | | | 320 |
| Gln | Lys | Ser | Leu | Ser | Leu | Ser | Pro | Gly | Lys | | | | | | |
| | | | | 325 | | | | | 330 | | | | | | |

```
<210> SEQ ID NO 101
<211> LENGTH: 330
<212> TYPE: PRT
<213> ORGANISM: artificial sequence
<220> FEATURE:
<223> OTHER INFORMATION: Synthetic sequence

<400> SEQUENCE: 101
```

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Gly Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 102
<211> LENGTH: 107
<212> TYPE: PRT
<213> ORGANISM: artificial sequence
<220> FEATURE:
<223> OTHER INFORMATION: Synthetic sequence

<400> SEQUENCE: 102

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Ser Ile Tyr Ser Tyr
            20                  25                  30

```
Leu Ala Trp Tyr Gln Gln Lys Pro Gly Lys Ser Pro Lys Phe Leu Ile
            35                  40                  45

Tyr Asn Ala Lys Thr Leu Ala Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Phe Gly Thr Pro Leu
                85                  90                  95

Thr Phe Gly Gln Gly Thr Lys Leu Glu Ile Lys
                100                 105

<210> SEQ ID NO 103
<211> LENGTH: 117
<212> TYPE: PRT
<213> ORGANISM: artificial sequence
<220> FEATURE:
<223> OTHER INFORMATION: Synthetic sequence

<400> SEQUENCE: 103

Gln Val Gln Leu Val Gln Ser Gly Ala Glu Val Lys Lys Pro Gly Ser
1               5                   10                  15

Ser Val Lys Met Ser Cys Lys Ala Ser Gly Tyr Thr Phe Thr Asp Tyr
                20                  25                  30

Val Ile Ser Trp Val Arg Gln Ala Pro Gly Gln Gly Leu Glu Trp Met
            35                  40                  45

Gly Glu Ile Tyr Pro Gly Ser Gly Asn Thr Tyr Tyr Asn Gln Lys Phe
    50                  55                  60

Gln Gly Arg Val Thr Leu Thr Ala Asp Lys Ser Thr Ser Thr Ala Tyr
65                  70                  75                  80

Ile Glu Leu Ser Ser Leu Arg Ser Glu Asp Thr Ala Val Tyr Tyr Cys
                85                  90                  95

Ala Gly Gly Gly Ser Ser His Phe Asp Tyr Trp Gly Gln Gly Thr Thr
                100                 105                 110

Val Thr Val Ser Ser
            115

<210> SEQ ID NO 104
<211> LENGTH: 111
<212> TYPE: PRT
<213> ORGANISM: artificial sequence
<220> FEATURE:
<223> OTHER INFORMATION: Synthetic sequence

<400> SEQUENCE: 104

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asp Asn His
                20                  25                  30

Gly Phe Ser Phe Met Asn Trp Phe Gln Gln Lys Pro Gly Gln Pro Pro
            35                  40                  45

Lys Leu Leu Ile Tyr Ala Ala Ser Asn Arg Gly Thr Gly Ile Pro Ala
    50                  55                  60

Arg Phe Ser Gly Ser Gly Ser Gly Thr Asp Phe Thr Leu Thr Ile Ser
65                  70                  75                  80
```

```
Ser Met Glu Pro Glu Asp Phe Ala Val Tyr Tyr Cys Gln Gln Ser Lys
            85                  90                  95

Glu Val Pro Trp Thr Phe Gly Gly Gly Thr Lys Val Glu Ile Lys
            100             105                 110
```